United States Patent
Wouhaybi et al.

(10) Patent No.: US 12,228,909 B2
(45) Date of Patent: Feb. 18, 2025

(54) METHODS AND APPARATUS FOR TIME-SENSITIVE NETWORKING COORDINATED TRANSFER LEARNING IN INDUSTRIAL SETTINGS

(71) Applicant: Intel Corporation, Santa Clara, CA (US)

(72) Inventors: Rita Wouhaybi, Portland, OR (US); Samudyatha C. Kaira, Portland, OR (US); Rajesh Poornachandran, Portland, OR (US); Francesc Guim Bernat, Barcelona (ES); Kevin Stanton, Hillsboro, OR (US)

(73) Assignee: Imtel Corporation, Santa Clara, CA (US)

( * ) Notice: Subject to any disclaimer, the term of this patent is extended or adjusted under 35 U.S.C. 154(b) by 712 days.

(21) Appl. No.: 17/359,184

(22) Filed: Jun. 25, 2021

(65) Prior Publication Data

US 2021/0325855 A1    Oct. 21, 2021

Related U.S. Application Data

(60) Provisional application No. 63/182,547, filed on Apr. 30, 2021.

(51) Int. Cl.
*G05B 19/4155* (2006.01)
*G06N 20/00* (2019.01)

(52) U.S. Cl.
CPC ......... *G05B 19/4155* (2013.01); *G06N 20/00* (2019.01); *G05B 2219/31368* (2013.01)

(58) Field of Classification Search
CPC .......... G05B 19/4155; G05B 19/41845; G05B 2219/31368; G05B 13/0265;
(Continued)

(56) References Cited

U.S. PATENT DOCUMENTS 6,907,369 B1    6/2005  Markle et al.
2016/0288280 A1*  10/2016  Lin ......................... B25J 5/007
(Continued)

FOREIGN PATENT DOCUMENTS

EP    3778142    2/2021

OTHER PUBLICATIONS

European Patent Office, "Extended European Search Report," issued in connection with EP Application No. 22151922.6, dated Jun. 22, 2022, 9 pages.

*Primary Examiner* — Chun Cao
(74) *Attorney, Agent, or Firm* — HANLEY, FLIGHT & ZIMMERMAN, LLC

(57) ABSTRACT

Methods and apparatus for Time-Sensitive Networking Coordinated Transfer Learning in industrial settings are disclosed. An example apparatus includes at least one memory, instructions in the apparatus, and processor circuitry to execute the instructions to cause performance of an operation by a first machine according to a first configuration, process a performance metric of the performance of the operation by the first machine to determine whether the performance metric is within a threshold range, and in response to a determination that the performance metric is not within the threshold range, cause performance of the operation by a second machine according to a second configuration different from the first configuration.

25 Claims, 25 Drawing Sheets

(58) Field of Classification Search
CPC .... G05B 19/41875; G05B 2219/31264; G05B 2219/31336; G05B 2219/32018; G05B 2219/32019; G05B 2219/32053; G06N 20/00; H04L 2209/42; H04L 9/0643; H04L 9/0825; H04L 9/0833; H04L 9/0869; H04L 9/3066; H04L 9/3073; H04L 9/321; Y02P 90/02; Y02P 90/80
USPC ......................................................... 700/95
See application file for complete search history.

(56) References Cited

U.S. PATENT DOCUMENTS

| | | |
|---|---|---|
| 2017/0277173 A1 | 9/2017 | Bonomi et al. |
| 2017/0308052 A1 | 10/2017 | Kajiyama |
| 2018/0339456 A1* | 11/2018 | Czinger ................. B33Y 30/00 |
| 2020/0296155 A1 | 9/2020 | McGrath et al. |
| 2021/0046639 A1* | 2/2021 | Ravi .................. G05B 19/4182 |

* cited by examiner

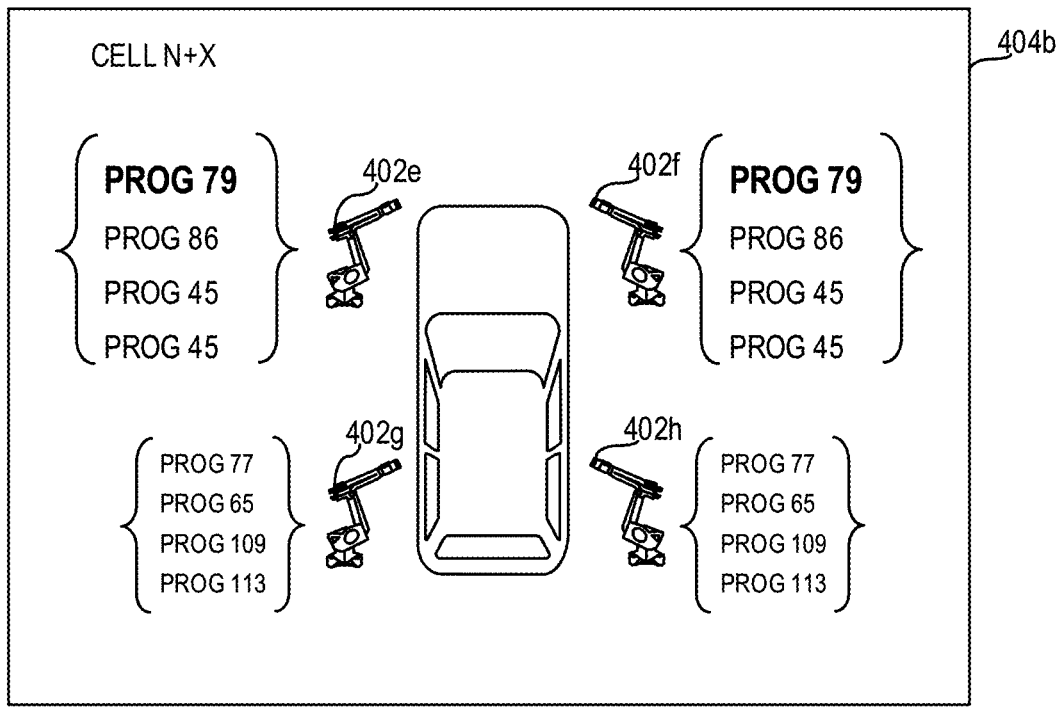
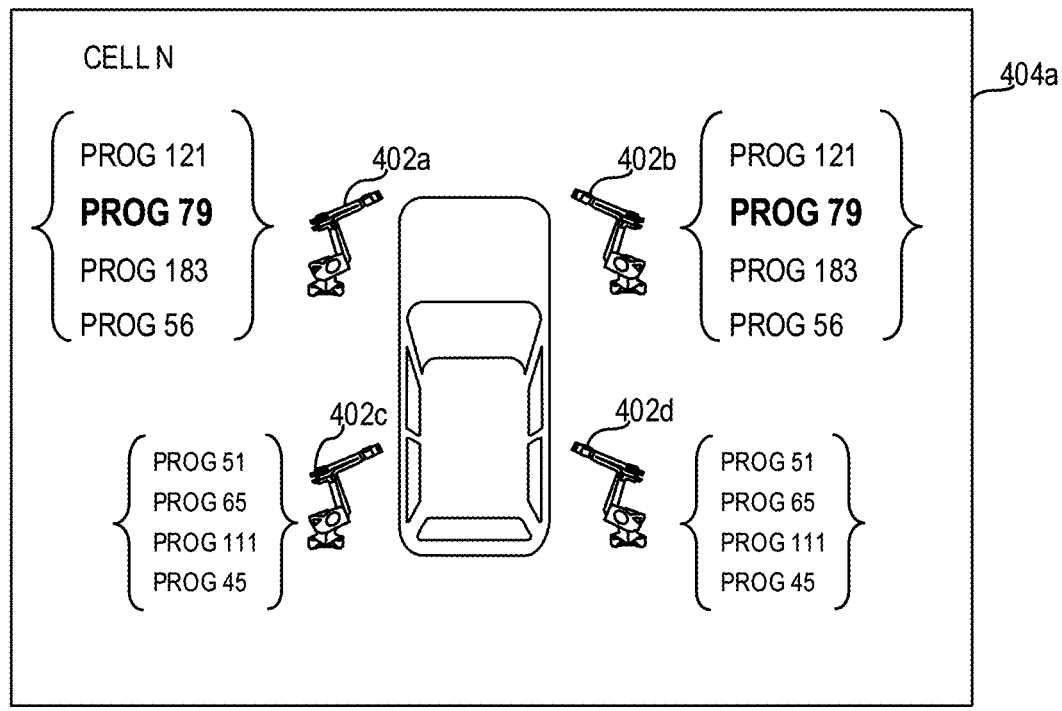
FIG. 7

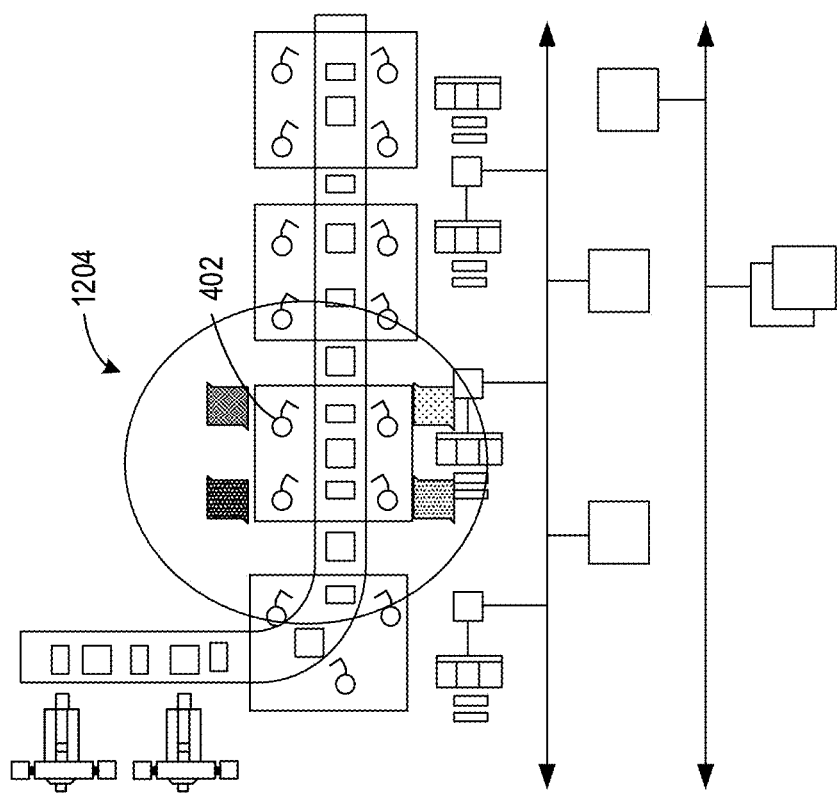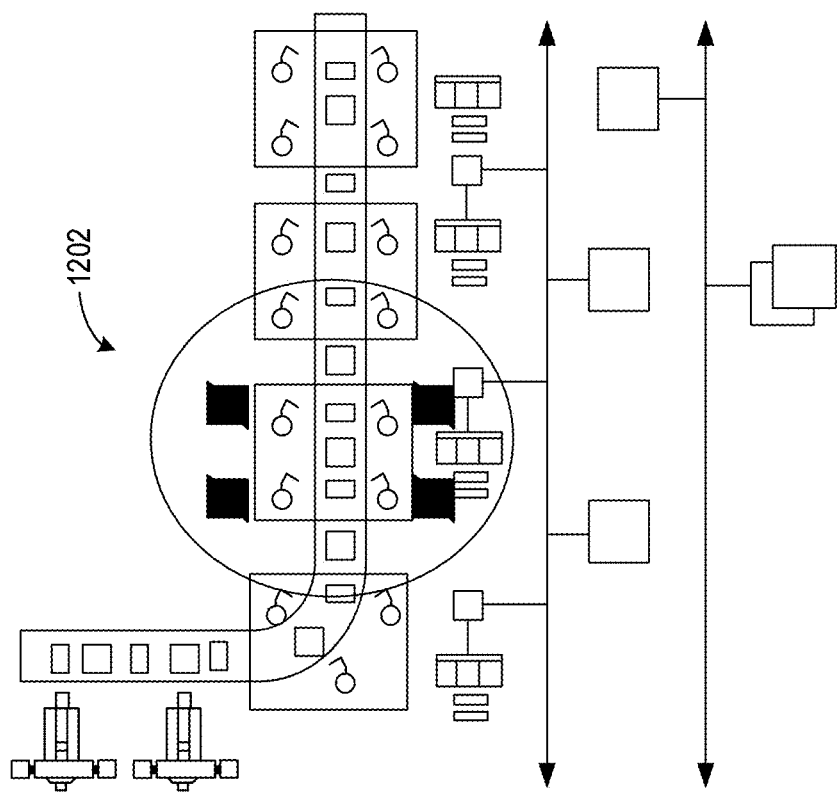
FIG. 12

METHODS AND APPARATUS FOR TIME-SENSITIVE NETWORKING COORDINATED TRANSFER LEARNING IN INDUSTRIAL SETTINGS

RELATED APPLICATION

This patent arises from U.S. Patent Application Ser. No. 63/182,547, which was filed on Apr. 30, 2021. U.S. Patent Application No. 63/182,547 is hereby incorporated herein by reference in its entirety. Priority to U.S. Patent Application No. 63/182,547 is hereby claimed.

FIELD OF THE DISCLOSURE

This disclosure relates generally to automated production, and, more particularly, to methods and apparatus for Time-Sensitive Networking (TSN) coordinated transfer learning in industrial settings.

BACKGROUND

In industrial settings, it is often empirical to run similar processes in a cell in parallel in order to minimize the time a product spends in a cell. This is especially important in auto manufacturing. Existing mechanisms involve generation of multiple homogenous and static configurations for all controllers and autonomous agents involved in spot operation (e.g., welding, gluing, painting, etc.) without factoring in the dynamic variations of the operation, environment, or effect of other processes. This results in poor quality and defeats the purpose of using autonomous agents with machine learning.

BRIEF DESCRIPTION OF THE DRAWINGS

FIG. 7 is a block diagram of an example implementation of transfer learning between the example cell and other example cells within the example factory setting of FIG. 4.

FIG. 12 is a block diagram illustrating example differences between existing and proposed mechanisms disclosed herein.

Figure 1:
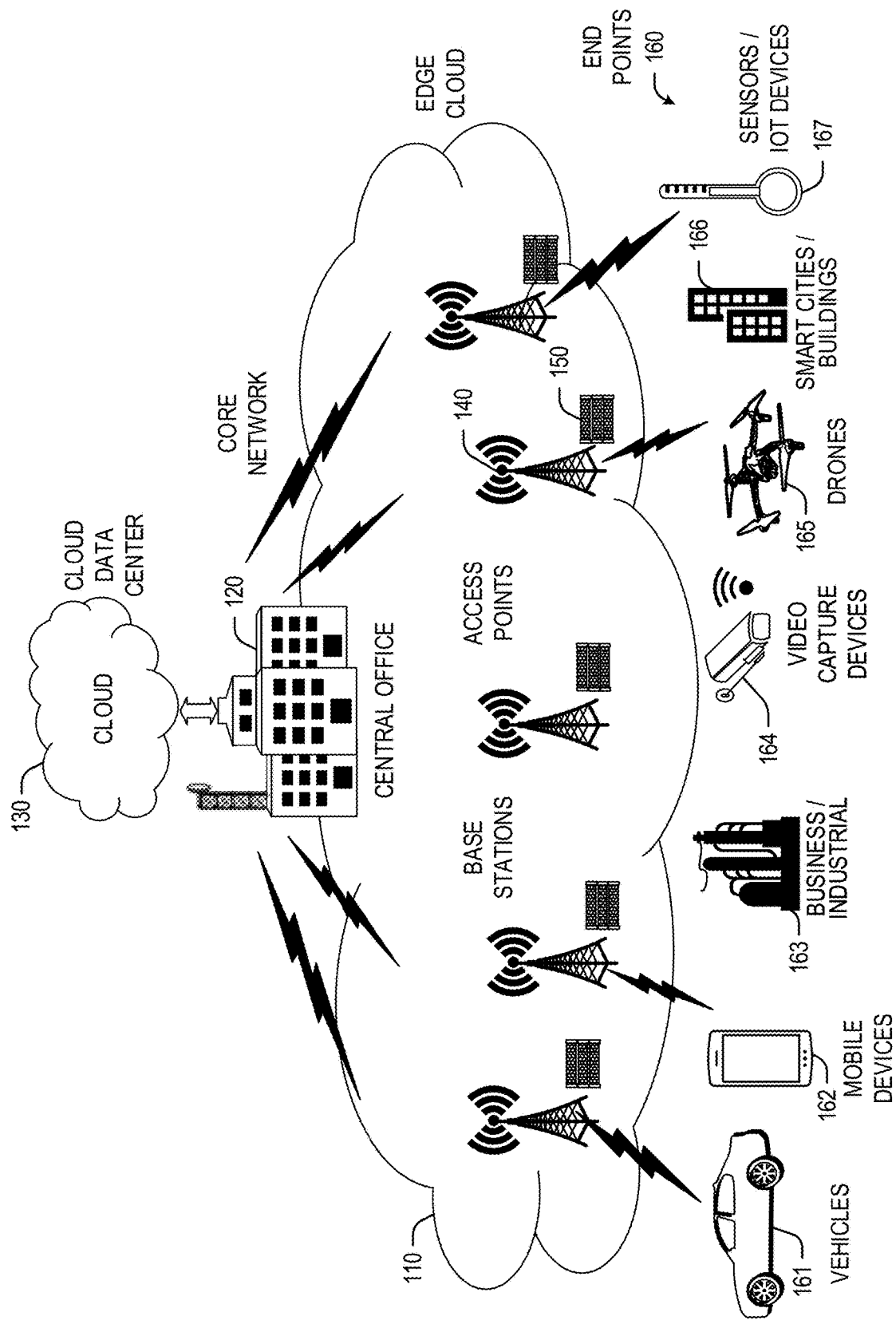
FIG. 1 illustrates an overview of an edge cloud configuration for edge computing.

The figures are not to scale. In general, the same reference numbers will be used throughout the drawing(s) and accompanying written description to refer to the same or like parts. Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

As used herein, data is information in any form that may be ingested, processed, interpreted and/or otherwise manipulated by processor circuitry to produce a result. The produced result may itself be data.

As used herein, the term "configuration" encompasses a set of instructions, a collection of information, and/or data that may be ingested, processed, interpreted, and/or otherwise manipulated by processor circuitry to setup or participate in a control of systems, parts of systems, devices, robots, etc. For example, a configuration can specify a set of parameters, such as temporal and/or electrical settings, associated with performance of an operation. Further, a configuration can specify a utilization and/or an arrangement of hardware associated with performance of an operation. Accordingly, a configuration contains information that can be stored, updated, moved, and/or used to direct manufacturing operations, compute operations, and/or any other form of operations.

As used herein, the term "threshold" is defined to be data such as a numerical value represented in any form, that may be used by processor circuitry as a reference for a comparison operation.

As used herein, the phrase "performance metric" encompasses data resulting from an operation. For example, a performance metric can be a numerical value represented in any form, that may be used by processor circuitry in an analysis and/or a comparison operation.

As used herein, the term "condition" encompasses encountered circumstances that have the capability to influence an operation and/or results of an operation. The condition may be encountered by a machine and/or a component on which the machine operates. The condition may be represented by data.

Ramp-up factories are used to configure machines and/or controllers for any new product design before moving to production, which can occur across multiple factories worldwide. However, such configuration processes today are completely independent. A key challenge/limitation of the offline-based reference configuration generation of today is, in practice, dynamic parameters such as differences between machines (e.g., age, maintenance, service routine, manufacturing SKUs, etc.), materials utilized (e.g., a thickness, a non-uniformity of the metal sheets, a weld rivet variation, etc.), environmental factors encountered (e.g., air quality, humidity, and/or temperature variation across the welding area of the factory), and/or upstream processes (e.g., previous applications that may impact the current process) cause unpredictable variations in the process and/or the associated product that are not accounted for in the offline-based reference configuration. For instance, processes often encounter environmental and/or material variations as simultaneous applications occur within a relatively close proximity, which can skew the assumptions associated with subsequent operations (e.g., subsequent welding, three-dimensional (3-D) printing, computer numerical control (CNC) machining, etc.). For instance, when manufacturing a product, such variations can reduce preciseness and/or introduce artifacts (e.g., bubbles of error), which, in turn, reduces a quality of the product.

For instance, during manufacturing, raw parts often go through various processes that cause physical changes thereto and/or environmental changes within the associated setting (e.g., a factory). Such physical and/or environmental changes affect the parts and/or the subsequent manufacturing processes and, thus, need to be accounted for when the subsequent processes are performed. For example, before a process, such as welding, on a car begins, the car often starts as metal parts, which go through several processes prior to welding, such as machining and/or coupling. Environmental changes in the factory (e.g., temperature, a humidity, an air quality, etc.) will affect these processes and cause physical changes to the parts that need to be accounted for during welding (e.g., an amount of glue used, a type or rivet used, a screw tightness, etc.). In general, ramp-up factories do not have an inline quality check process. Instead, when a manufacturing process is performed, inspection can be manual, human-operated, and slow. As a result, some sub-optimal products may go undetected as the inspection cannot scale to the entire factory.

Examples disclosed herein utilize 'Self-Learning TSN Gossip Based Autonomous Agents for Industrial Automation 4.0.' The example methodology leverages community based TSN wherein, instead of all agents (e.g., machines) performing operations (e.g., welding, printing, drilling, material handling, machining, bonding, painting, etc.) synchronously, start times of the agents are staggered such that a first agent starts earlier than a second agent (e.g. 50 ms. earlier, 100 ms. earlier, 200 ms. earlier, etc.) programmed to utilize a same, or a similar, configuration as the first agent.

In examples disclosed herein, a machine learning algorithm reads information from a machine and generates a prediction as to whether an operation performed by the machine meets a predetermined criteria that corresponds to an acceptable quality of the associated product. That is, the machine learning algorithm can analyze a performance metric associated with the operation performed by the machine (e.g., a voltage, a current, and/or a power utilized by the first agent, a resistance encountered by the machine, a rate of the operation, a statistic associated with the result, etc.) and compare the performance metric to a threshold range associated with acceptable (e.g., desired or expected) results from previous operations. For example, the comparison can yield a percentage correlation (e.g., a matching score) between the performance metric associated with the operation performed by the machine and a desired or expected performance metric based on previous operations. In turn, the matching score can be compared to a confidence level (e.g., 90%, 95%, 97.5%, etc.) associated with the performance metric, which enables a determination to be made as to whether the performance metric is within the threshold range. In response to the performance metric not being within the threshold range (e.g., the matching score being less than the confidence level), the machine learning algorithm can adjust a configuration of the associated machine and/or indicate an adjustment to another machine performing a same, or similar, operation(s). As such, the machine learning algorithm dynamically accounts for encountered circumstances and adjusts the configuration according to which the operation is performed to obtain desired performance metrics. Accordingly, the machine learning algorithm minimizes or otherwise reduces errors that would result from a same configuration being utilized in various circumstances and/or delayed adjustments thereto. Additionally, the machine learning algorithm avoids overreactive adjustments to the configuration by utilizing a confidence level associated with a deviation from the desired or expected performance metric that has a notable effect on an outcome of the operation performed by the machine.

For example, unique and temporal characteristics associated with a work environment (e.g., a humidity, a temperature, an air quality, etc.) and/or a work item (e.g. a size, a shape, a material composition, etc.) can affect the result of the operation and, thus, the configuration according to which the operation should be performed. To account for such dynamic characteristics, in response to the determination that the performance metric is not within a threshold range (e.g., a matching score associated with the performance metric and the desired or expected results is less than a confidence level associated with the operation), the machines can share dynamic changes to the configuration and results associated therewith to a relevant peer(s). As such, machines can calibrate the configurations associated therewith dynamically and propagate the results associated with the configurations to other machines across the factory floor.

In examples disclosed herein, machines can communicate configuration adaptations to an associated edge control node to tune operations thereof accordingly. That is, the edge control node can fine-tune a machine learning model(s) associated with the operation(s) being performed by the machines to account for environmental and/or material variations and, thus, generate a model that adjusts to such variations dynamically. The edge control node can utilize a Platform Trusted Execution Environment (TEE) and/or a Wireless Credential Exchange (WCE) to provision licenses to individual autonomous agents on a granular level that determine a range of allowable configuration modifications. Specifically, TEEs can improve remote attestation, metering, and secure communication between the agents as well with the edge orchestrator node. Moreover, use of TSN enables the edge control node to (a) synchronize the actions of multiple network-attached agents (e.g. machines), via Institute of Electrical and Electronics Engineers (IEEE) standard 802.1AS, (b) schedule the agents in a way that is optimal for learning, via IEEE standard 802.1Qcc, and (c) guarantee that the latency of the parameters learned by a first agent (n) is transmitted and received by a second agent (n+1) in advance of a deadline associated with the schedule, via IEEE standard 802.1Qbv/Qbu.

Moreover, machines and/or controllers on the factory floor can be implemented as edge nodes that form dynamic communities in order to accelerate learning. Such edge nodes can self-organize and time-synchronize to orchestrate a transfer of knowledge therebetween that results in cascade effect for learning. Additionally, utilizing TEE based license provisioning with a revocation list enables peer and edge node synchronization to improve predictive analytics as well as spot-operations at run-time. As such, the edge nodes can reduce errors while also expediting the learning process. As a result, techniques disclosed herein enable real-time learning that improves the quality of manufactured goods, predictive analytics, and/or modeling.

For example, during or after welding operations, the welding gun controller generates a data object, such as a JavaScript Object Notation (JSON), including streams. Such streams include a target configuration used (e.g., as voltage and current curves) and an actual configuration encountered during the welding operation (e.g., the actual measured voltage and current curves during the operation). Specifically, the welding controller aims to reproduce the target configuration curves for each welding spot based on the physical characteristics associated with the weld. However, errors often arise as environmental changes create variations that cause the controller to deviate from the target configuration. In such instances, some of the deviations (e.g., deviations that do not cause a matching score to be less than a confidence level associated with the weld, deviations within a threshold range) result in good welds, but others (e.g., deviations that cause the matching score to be less than the confidence level associated with the weld, deviations not within the threshold range) result in faulty welds where the metal is not strongly fused together.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
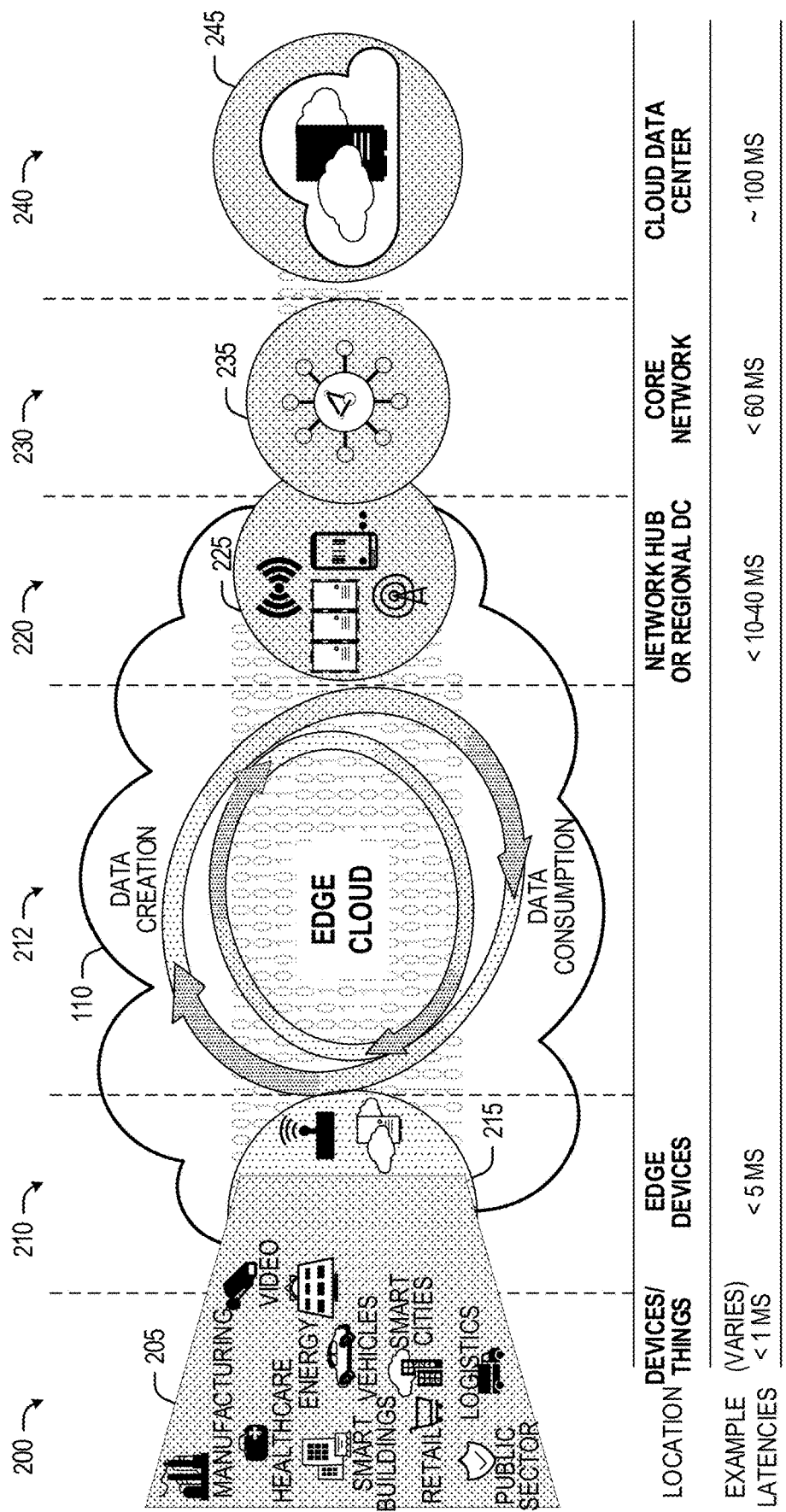
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms.) when among the endpoint layer 200, under 5 ms. at the edge devices layer 210, to even between 10 to 40 ms. when communicating with nodes at the network access layer 220. Beyond the edge cloud 110 are core network 230 and cloud data center 240 layers, each with increasing latency (e.g., between 50-60 ms. at the core network layer 230, to 100 or more ms. at the cloud data center layer). As a result, operations at a core network data center 235 or a cloud data center 245, with latencies of at least 50 to 100 ms. or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., machine arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 15. The edge cloud 110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code, or scripts.

Figure 3:
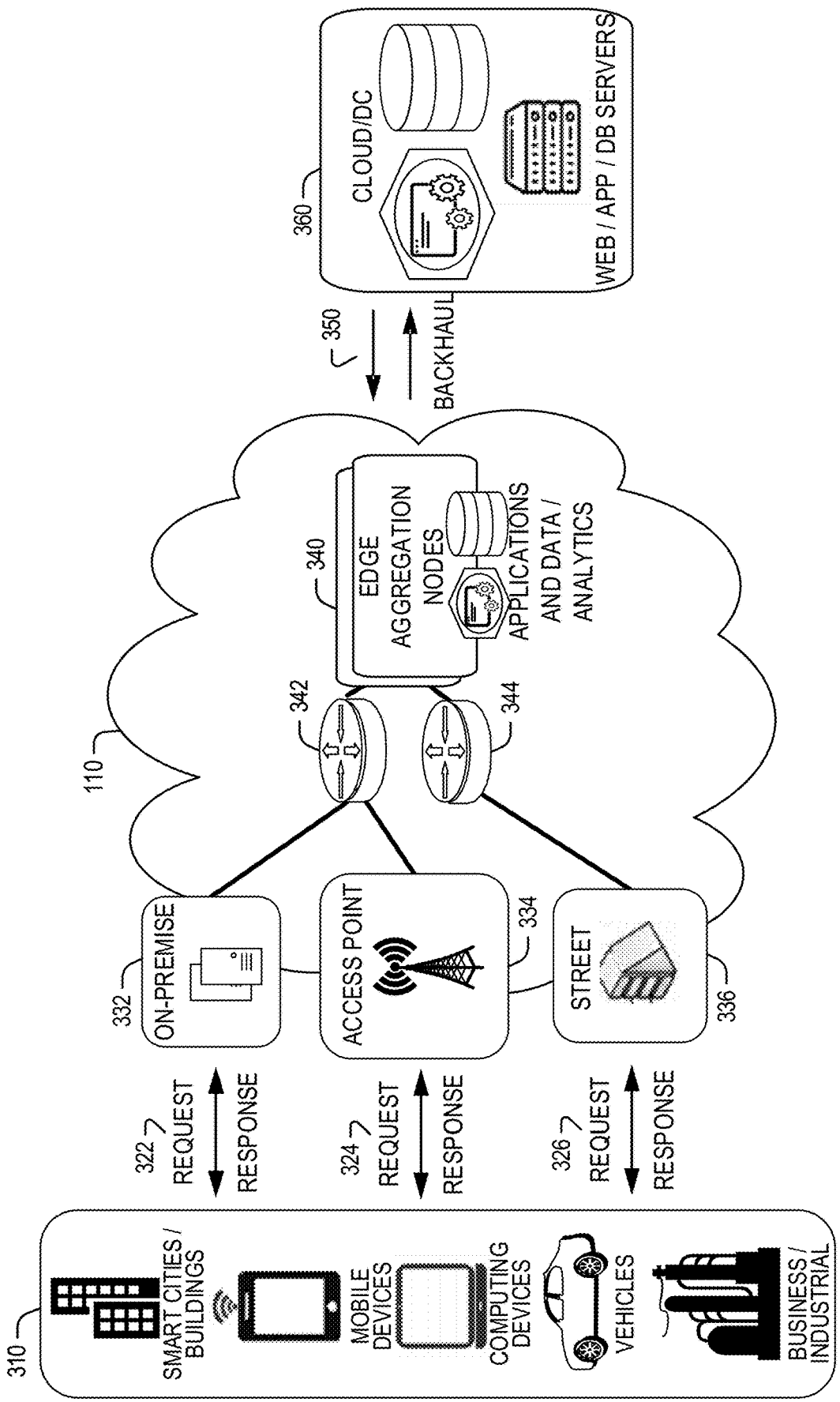
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
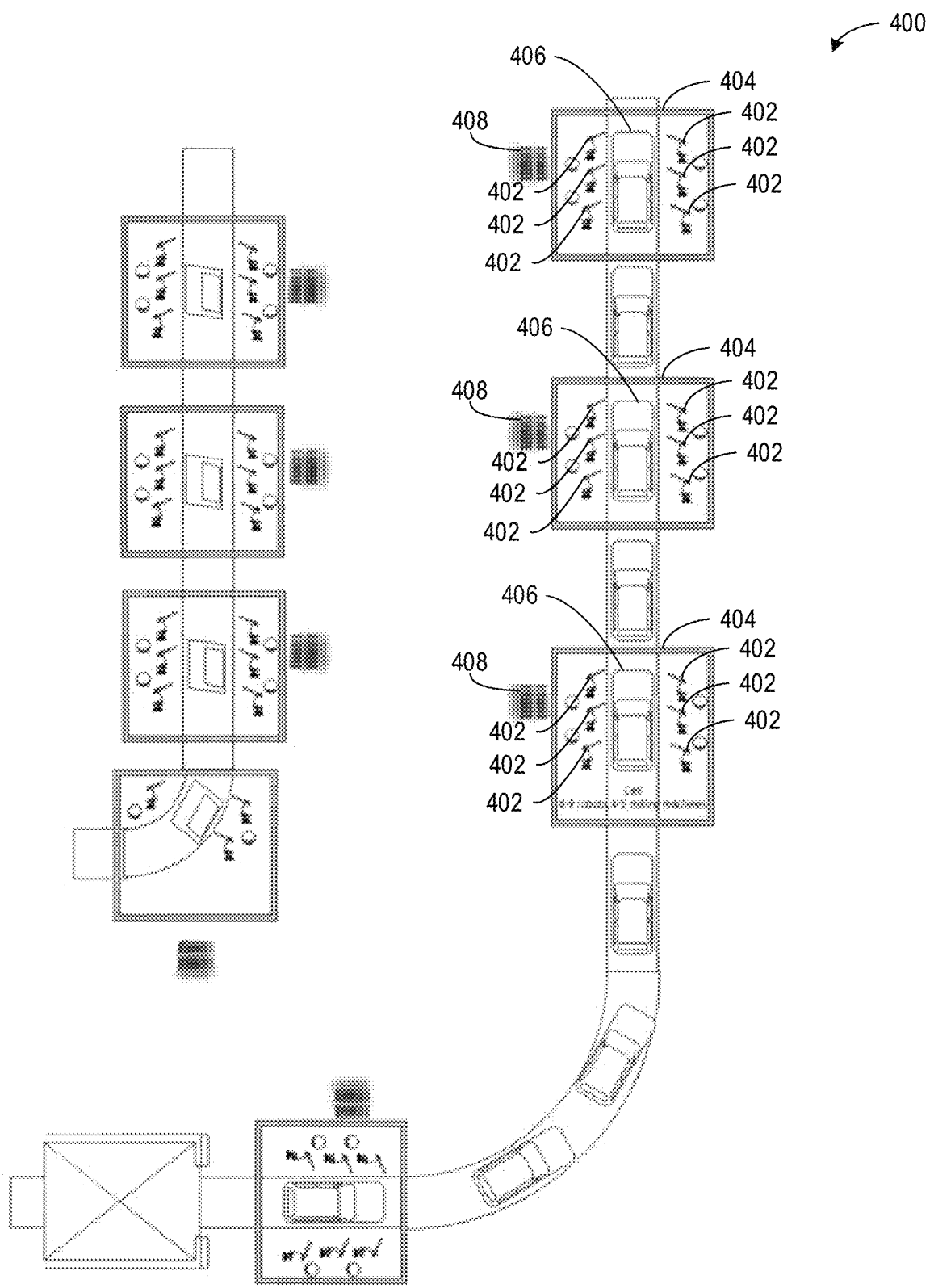
FIG. 4 is a block diagram illustrating an overview of an example factory setting in accordance with the teachings of this disclosure.

The illustrated example of FIG. 4 is a block diagram of an example factory (e.g., a ramp-up factory) 400. The factory 400 includes machines (e.g., robots, manufacturing machines, manufacturing agents, etc.) 402 within a collection of modular cells 404. In some examples, each modular cell 404 can include as few as 4 and as many as 22 of the machines 402 for a total of 2500 of the machines 402. Each of the machines 402 utilizes a tool(s) to perform an operation associated with a process (e.g., a manufacturing operation). The illustrated example of FIG. 4 and further examples disclosed herein will focus on the example machines 402 that utilize a welding gun to produce spot welds, which can include a subset of the machines 402). Specifically, the machines 402 perform spot welding on a car (e.g., a preform of a car) 406. In the illustrated example, the car 406 can receive a significant number of welds (e.g., more than 10,000 welds).

Although some examples disclosed herein are described in association with spot welding, it should be understood that the examples disclosed herein are applicable to any manufacturing process where the yield is at least partially dependent on parameters that may encounter variations. For example, the examples disclosed herein may be implemented by machines that perform additive manufacturing (e.g., 3D printers), subtractive manufacturing (e.g., computerized numerical control (CNC) machines), casting, molding, forming, painting, joining, milling, drilling, bonding, soldering, fabricating refining, chemical manufacturing, etc.

The example machines 402 utilize a configuration (e.g., a voltage over current curve, a power over time curve, a resistance over time curve, etc.) to perform the spot welding. Specifically, spot welding utilizes energy in the form of heat to join (e.g., fuse) metal parts. The heat is obtained from resistance to electric current and, thus, the energy utilized to bond the metal parts corresponds to the resistance between electrodes of the welding gun and a magnitude and duration of a current that passes through the welding gun. Accordingly, the resistance, the current, and/or other factors associated therewith, such as power, can be analyzed to determine the energy the car 406 received from the welding gun 404.

The amount of energy utilized when welding can have a significant impact on the weld. Specifically, too little energy will not melt and fuse the metal. Further, too much energy will melt too much metal, which can produce a hole instead of a weld. The machines 402 determine an amount of energy to utilize in a configuration based on a thickness and/or a type of the metal(s) that are to be welded and/or properties associated with the respective one of the machines 402. Specifically, in a car, there are around 200 different combinations of metal thicknesses and types and each combination requires a unique welding configuration. However, manufacturing tolerances, environmental factors, and/or upstream processes associated with the car 406 can vary the properties of the metal(s) being welded. In turn, the configuration associated with the thickness and/or the type of the metal(s) to be welded may produce too little or too much energy resulting in a faulty weld.

In the illustrated example, when the car 406 enters one of the cells 404, each of the machines 402 within the cell 404 spot welds approximately 12 points of the car 406. For example, the cell 404 can include 6 machines that utilize 10 distinct configurations to apply 72 (6×12) welding spots. However, when a configuration (e.g. Prog79) results in faulty welding spots (e.g., due to environmental variations), then a substantial number of the welding operations associated with the configuration (e.g. Prog79) are likely to be faulty as well. To minimize or otherwise reduce the faulty welding spots, the machines 402 utilize TSN to coordinate the operations thereof. Specifically, the machines 402 throughout the factory 400 that utilize the configuration (e.g., Prog79) can cooperate and determine a schedule of operations to systematically test variations of the configuration in response to the initial configuration producing faulty welding spots. As a result, the machines 402 can determine a configuration that produces acceptable welding spots in the instant conditions. In some examples, example controllers 408 are associated with each of the machines 402 to determine the schedule of operations and/or the configuration to be utilized by the machines 402.

Figure 5:
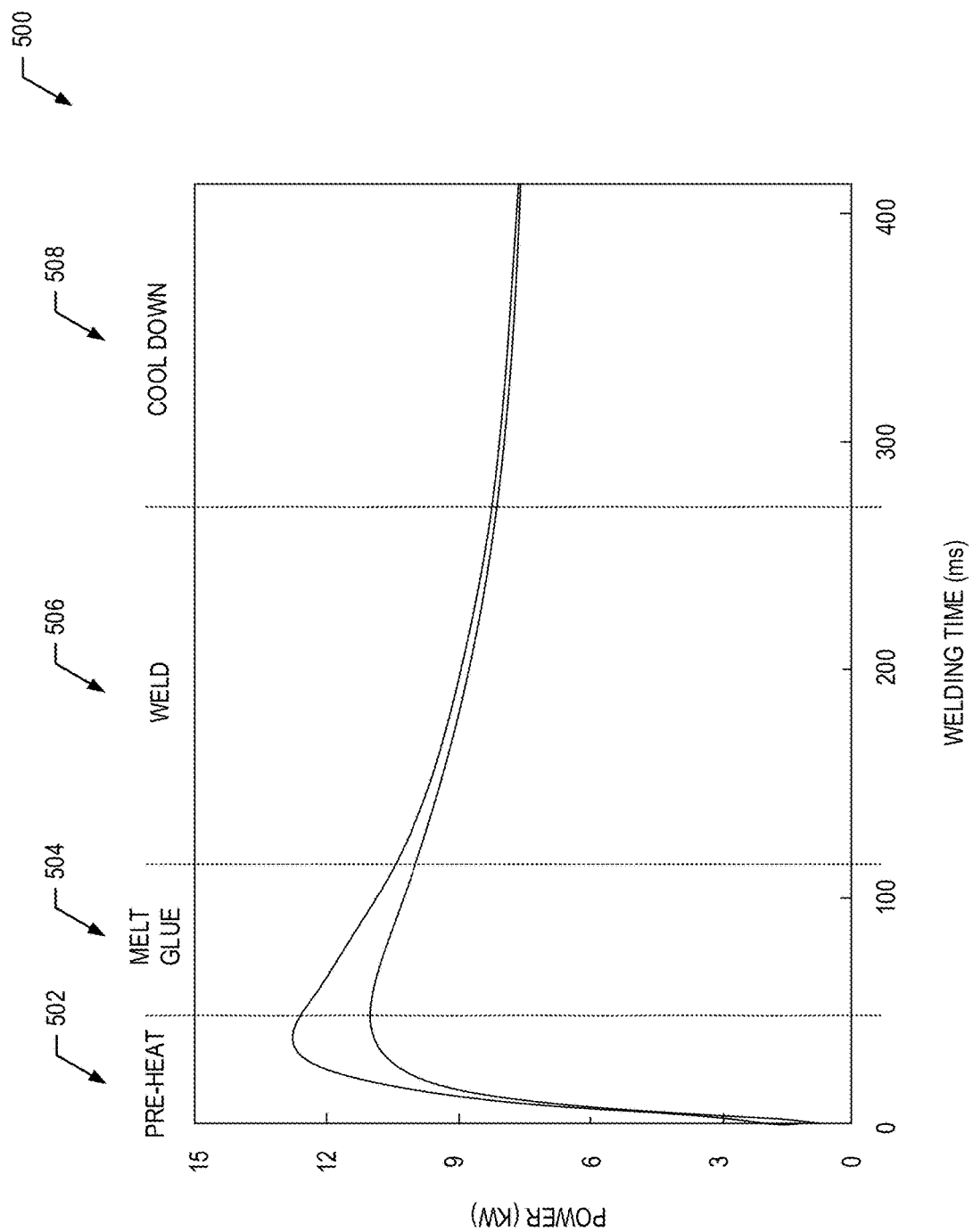
FIG. 5 is a graph illustrating phases of an example operation of an example machine associated with the factory setting of FIG. 4.

The illustrated example of FIG. 5 is an illustration of the phases of a welding operation represented in a welding curve. The example welding operation represented as a welding curve 500 includes four phases: a pre-heat phase 502, a glue melting phase 504, a welding phase 506, and a cooling phase 508. For example, the machines 402 of FIG. 4 can perform the welding operation. The phases of the welding curve 500 can be dynamic and, thus, some of the curves may have different lengths.

During the pre-heat phase 502, the welding gun is not in touch with the metal. During the pre-heat phase 502, the machine 402 can receive an indication to change the configuration thereof for the subsequent phases.

In practice, during an earlier gluing operation, glue is applied uniformly between the metal sheets due to manufacturing tolerances. As such, during the glue melting phase 504, the machine 402 melts the glue at the location associated with the spot welding location. In some examples, manufacturing variations during the earlier gluing operation causes too much glue to be applied between the metal sheets. As such, to melt the glue, the configuration of the machine 402 requires an adjustment to stretch the glue melting phase 504 longer. Likewise, when too little glue is applied between the metal sheets, the configuration of the machine 402 requires an adjustment to shorten the glue melting phase 504 accordingly.

During the welding phase 506, the machine 402 performs the spot welding operation and fuses the metal sheets in a predetermined spot. However, the initial configuration of the machine 402 does not account for variations such as impurities in the metal sheets. Accordingly, the machine 402 adjusts the amount of time and/or the amount of power in the configuration associated with the welding phase 506 when the metal sheets include impurities.

During the cooling phase 508, the machine 402 controls a pace at which the temperature of the metal sheets is reduced to prevent the metal sheets from cracking due to extreme temperature fluctuations.

Figure 6:
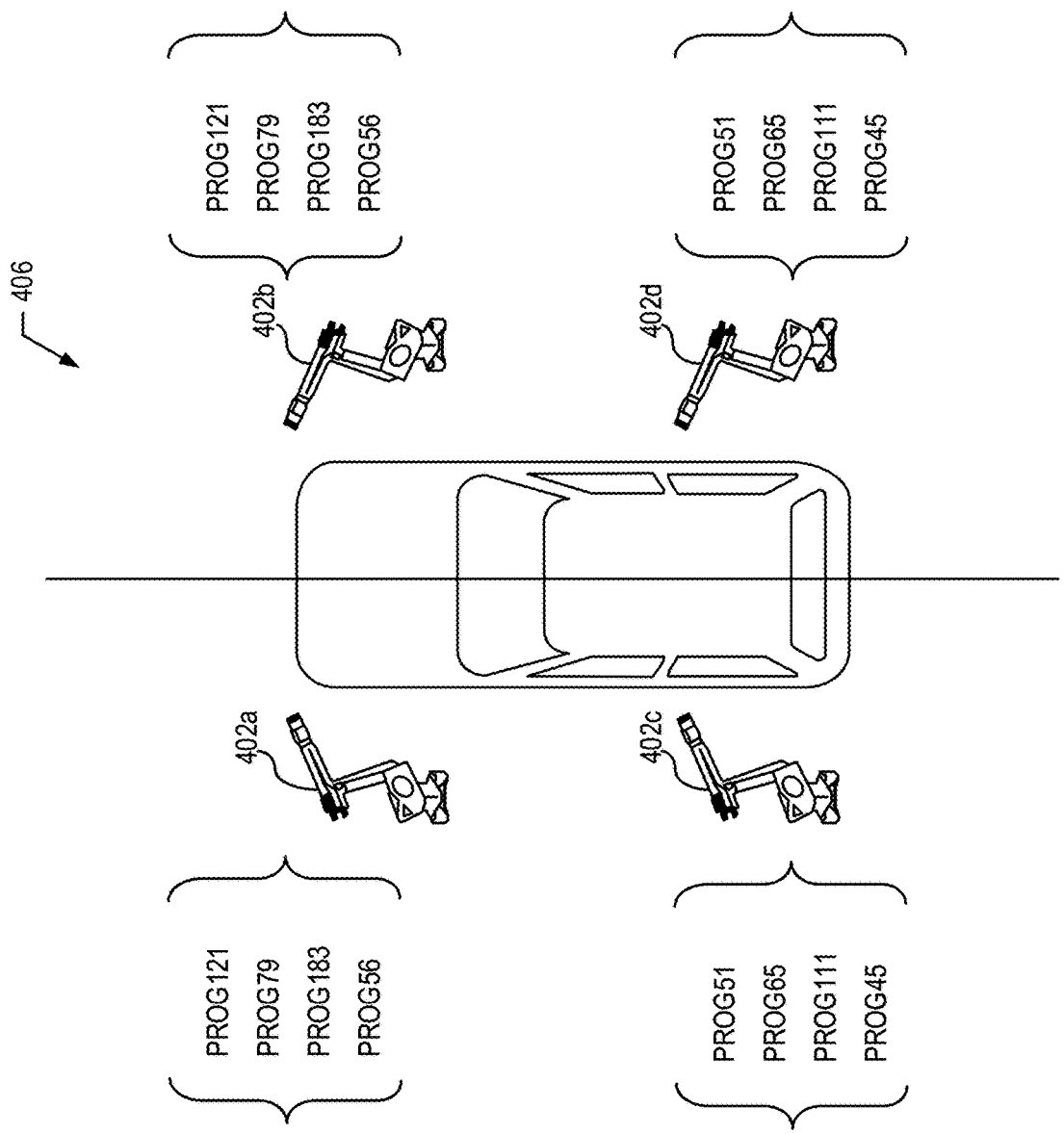
FIG. 6 is a block diagram of an example cell associated with the example factory setting of FIG. 4.

FIG. 6 is a block diagram illustrating example machines 402 within one of the example cells 404 of FIG. 4. Specifically, the illustrated example is representative of a first example cell 404a representative of one the example cells 404 of FIG. 4. Further, the first example cell 404a includes a first example machine 402a, a second example machine 402b, a third example machine 402c, and fourth example machine representative of the machines 402 of FIG. 4.

When a product preform (e.g., the car preform 406) enters the cell 404a, the configurations of the first machine 402a and the second machine 402b are the same or similar. Similarly, the configurations of the third machine 402c and the fourth machine 402d are the same or similar. In previous solutions, machines run each operation simultaneously and independently. However, in examples disclosed herein, the machines 402a, 402b, 402c, 402d stagger the operations thereof.

For example, the first machine 402a can perform operations 50 ms. in advance of the second machine 402b and the third machine 402c can perform operations 50 ms. in advance of the fourth machine 402d. As such, the first machine 402a and the third machine 402c can communicate a performance metric resulting from the operation performed thereby (e.g., an outcome of the operation) in advance of the operation being performed by the second machine 402b and the fourth machine 402d, respectively. In turn, the second machine 402b and/or the fourth machine 402d can adjust the configuration associated therewith in response to the performance metric resulting from the operations of the first machine 402a and/or the fourth machine, respectively, not being within a threshold range (e.g., a confidence level not being satisfied). That is, the machines 402a, 402b, 402c, 402d can determine the configuration associated therewith produces desired results or adjust the associated configuration accordingly.

FIG. 7 is a block diagram illustrating an example implementation of transfer learning between the cells 404 in the factory 400 of FIG. 4. In the illustrated example, transfer learning occurs between the first cell 404a (e.g., Cell N) of FIG. 6 and a second example cell (e.g., Cell N+X) 404b representative of the example cells 404 of FIG. 4. As discussed in association with FIG. 6, the first cell 404a includes the first machine 402a, the second machine 402b, the third machine 402c, and the fourth machine 402d. Further, In the illustrated example, the second cell 706 includes a fifth machine 402e, a sixth machine 402f, a seventh machine 402g, and an eighth machine 402h representative of the example machines 402 of FIG. 4. Although the illustrated example describes transfer learning between the machines 402a, 402b, 402c, 402d within the first cell 404a and the machines 402e, 402f, 402g, 402h within the second cell 404b, it should be understood that transfer learning can occur between any number of the machines 402 within any number of the cells 404 in the factory setting 400 of FIG. 4.

In the illustrated example, the first machine 402a, the second machine 402b, the fifth machine 402e, and the sixth machine 402f are in a first configuration, which utilizes Prog79 to perform an operation (e.g., spot welding on the car 406 of FIG. 4). In the illustrated example, operations are staggered such that the first cell 404a performs operations in advance of the second cell 404b. Specifically, the first machine 402a starts approximately 50 ms. before the second machine 402b. Additionally, the second machine 402b starts approximately 50 ms. before the fifth machine 402e, which starts approximately 50 ms. before the sixth machine 402f.

In the illustrated example, the first machine 402a performs the operation according to the first configuration. The first machine 402a processes a performance metric (e.g., a voltage and current curve) associated with the performance of the operation to determine whether the performance metric is within a threshold range (e.g., within a range of a reference voltage and current curve that satisfies a confidence level associated with the operation). For example, the first machine 402a can process the performance metric associated with the configuration during and/or after the performance of the operation. In response to determining that the performance metric is not within the threshold range (e.g., a matching score between the performance metric and the reference performance metric does not satisfy the confidence level associated with the operation), the first machine 402a transmits a signal to the second machine 402b, the fifth machine 402e, the sixth machine 402f, and any other machines 402 programmed to utilize the first configuration, including an instruction to adjust the configuration thereof from the first configuration to an alternative configuration. For example, the signal can include the first configuration and the performance metric resulting from the operation. Accordingly, the second machine 402b, the fifth machine 402e, and the sixth machine 402f can compare the performance metric to the associated threshold range and, thus, determine an adjustment to the first configuration is to be implemented. In some examples, the second machine 402b, the fifth machine 402e, and the sixth machine 402f compare the matching score and confidence level associated with the operation to determine the adjustment.

For example, the second machine 402b can process the results of the operation performed by the first machine 402a and determine a second configuration to utilize (e.g., Prog79'). Accordingly, the second machine 402b performs the operation according to the second configuration and processes the performance metric associated therewith. In response to determining that the performance metric is not within the threshold range (e.g., the matching score between the performance metric and the reference performance metric does not satisfy the confidence level associated with the operation), the second machine 402b transmits a signal to the first machine 402a, the fifth machine 402e, the sixth machine 402f, and any other machines in the assembly line 704 programmed to utilize the same configuration as the second machine 402b, including an instruction to adjust the configuration thereof. For example, the signal can include the second configuration and the performance metric resulting from the operation.

The fifth machine 402e can process the results of the operation performed by the second machine 402b, in addition to the results of the operation performed by the first machine 402a, to determine a third configuration to utilize (e.g., Prog79"). As such, the fifth machine 402e performs the operation according to the third configuration and processes the performance metric resulting therefrom. In the illustrated example, the performance metric associated with the operation performed by the fifth machine 402e is within the threshold range (e.g., the matching score between the performance metric and the reference performance metric satisfies the confidence level associated with the operation). As such, the fifth machine 402e transmits a signal to the first machine 402a, the second machine 402b, the sixth machine 402f, and any other machine sharing the same configuration and/or a similar configuration, including an instruction to utilize the third configuration. Accordingly, the sixth machine 402f performs the operation according to the third configuration and processes the performance metric associated therewith to determine whether the performance metric remains within the threshold range (e.g., the matching score between the performance metric and the reference performance metric remains above the confidence level associated with the operation).

Figure 8:
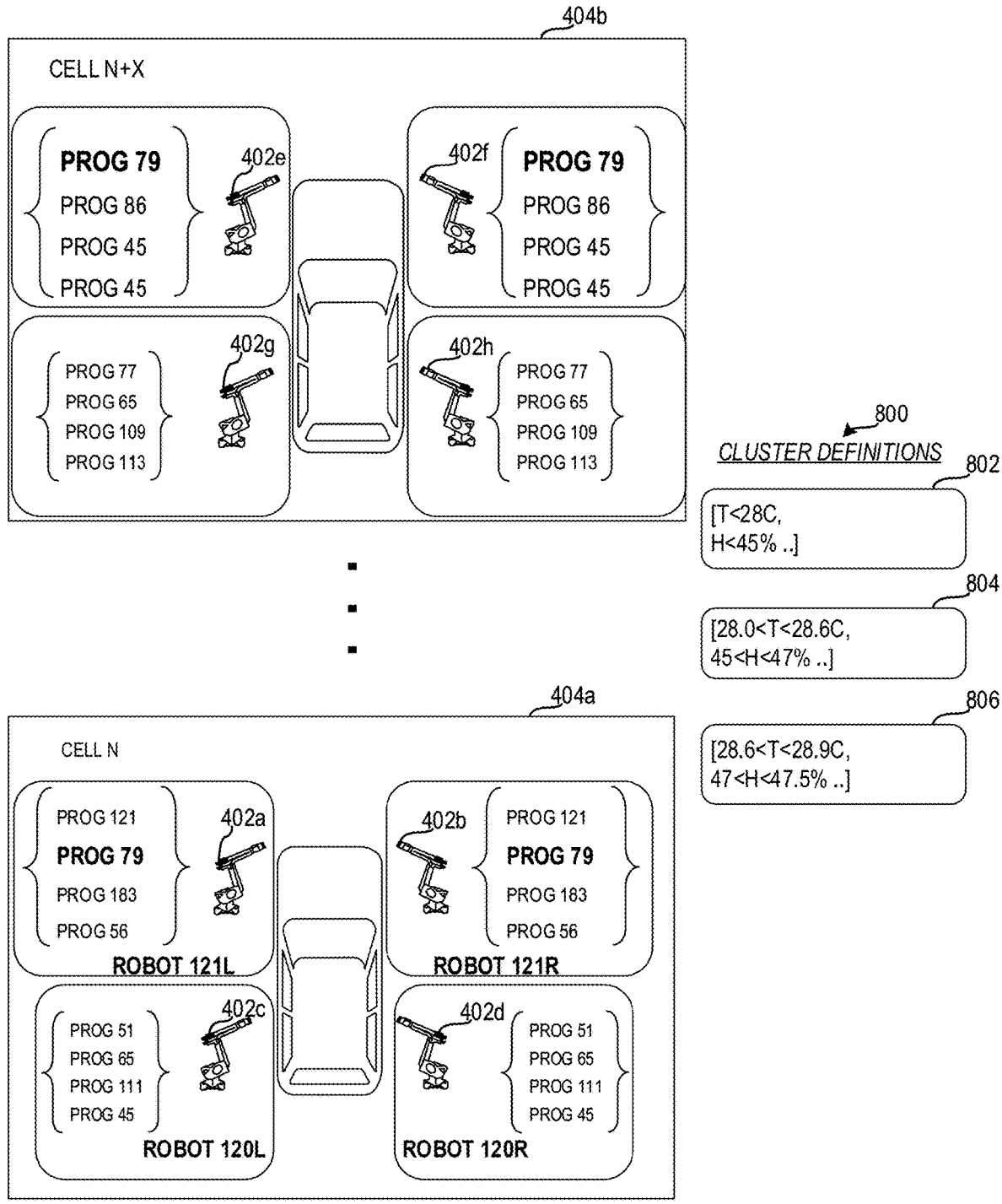
FIG. 8 is a block diagram of an example clustering of cells and/or machines of the factory setting of FIG. 4 in accordance with the teachings of this disclosure.

FIG. 8 is an illustrative example of a clustering technique utilized to group the machines 402 based on conditions (e.g., ambient conditions) associated therewith. Specifically, the machines 402 within the cluster operate similarly as a result of encountering similar ambient conditions. Accordingly, one of the machines 402 within the cluster may operate differently from one of the machines 402 outside the cluster 800 as a result of a variance between the ambient conditions encountered thereby. For example, a difference in humidity encountered by the third machine 402c compared to the fifth machine 402e can cause the third machine 402c to perform an operation differently from the fifth machine 402e. Although the illustrated example utilizes ambient conditions to define the cluster 800, it should be understood that any other parameters that vary and may be shared by a group of the machines 402 can additionally or alternatively be utilized to define the clusters.

In the illustrated example of FIG. 8, example cluster definitions (e.g., parameters to define clusters) 800 are based on the measured ambient conditions at each of the machines 402. In the illustrated example, a first example cluster definition 802 includes a temperature of less than 28 degrees Celsius and/or a humidity of less than 45%. A second example cluster definition 804 includes a temperature range between 28.0 and 28.6 degrees Celsius and/or a humidity range between 45% and 47%. Further, a third example cluster definition 806 includes a temperature range between 28.6 and 28.9 degrees Celsius and/or a humidity range between 47% and 47.5%.

In some examples, the cluster definitions 800 are based on expert criteria and/or statistical methods. For example, the expert criteria can be obtained from operators of the factory 400 and/or offline data processing performed by data-scientists. Further, a primary machine, which, In the illustrated example, is the first machine 402a, can process ambient conditions encountered by the machines 402a, 402b, 402c, 402d, 402e, 402f, 402g, 402h and apply statistical methods, such as Principal Component Analysis (PCA), k-means clustering, k-nearest neighbors (KNN), a Long Short-Term Memory (LSTM) network, a generalized method of moments (GMM), density-based spatial clustering of applications with noise (DBSCAN), and/or any other statistical method, to determine the cluster definitions 800.

In the illustrated example, clusters of the machines 402a, 402b, 402c, 402d, 402e, 402f, 402g, 402h are re-considered or re-determined after a threshold period of time (e.g., every 5 seconds, every 1 minute, etc.). In order to do so, all of the machines 402a, 402b, 402c, 402d, 402e, 402f, 402g, 402h transmit their ambient values, and/or any other data point to be considered when determining the clusters, to the primary machine 402a after the threshold period of time.

In the illustrated example, the primary machine 402a notifies each of the machines 402a, 402b, 402c, 402d, 402e, 402f, 402g, 402h of the respective cluster to which they are assigned and any of the machines 402a, 402b, 402c, 402d, 402e, 402f, 402g, 402h (e.g., peers) associated therewith. For example, the first machine 402a can assign each of the machines 402a, 402b, 402c, 402d, 402e, 402f, 402g, 402h in a respective cluster to a same machine-to-machine (M2M) communicative network (e.g., wireless communications in the industrial IoT), such as a cellular network or a low-power wide-area network (LPWAN). As such, the machines 402a, 402b, 402c, 402d, 402e, 402f, 402g, 402h in the same cluster can communicate to coordinate operations thereof and determine an optimal configuration to utilize given the ambient conditions associated therewith. Accordingly, the primary machine 402a serves as an IoT gateway.

In some other examples, all of the machines 402 transmit their ambient values, and/or any other data point to be considered when determining the clusters, to an alternative control unit, such as one of the controllers 408 of FIG. 4, which can serve as the IoT gateway that controls the connections of the machines 402a, 402b, 402c, 402d, 402e, 402f, 402g, 402h.

Figure 9:
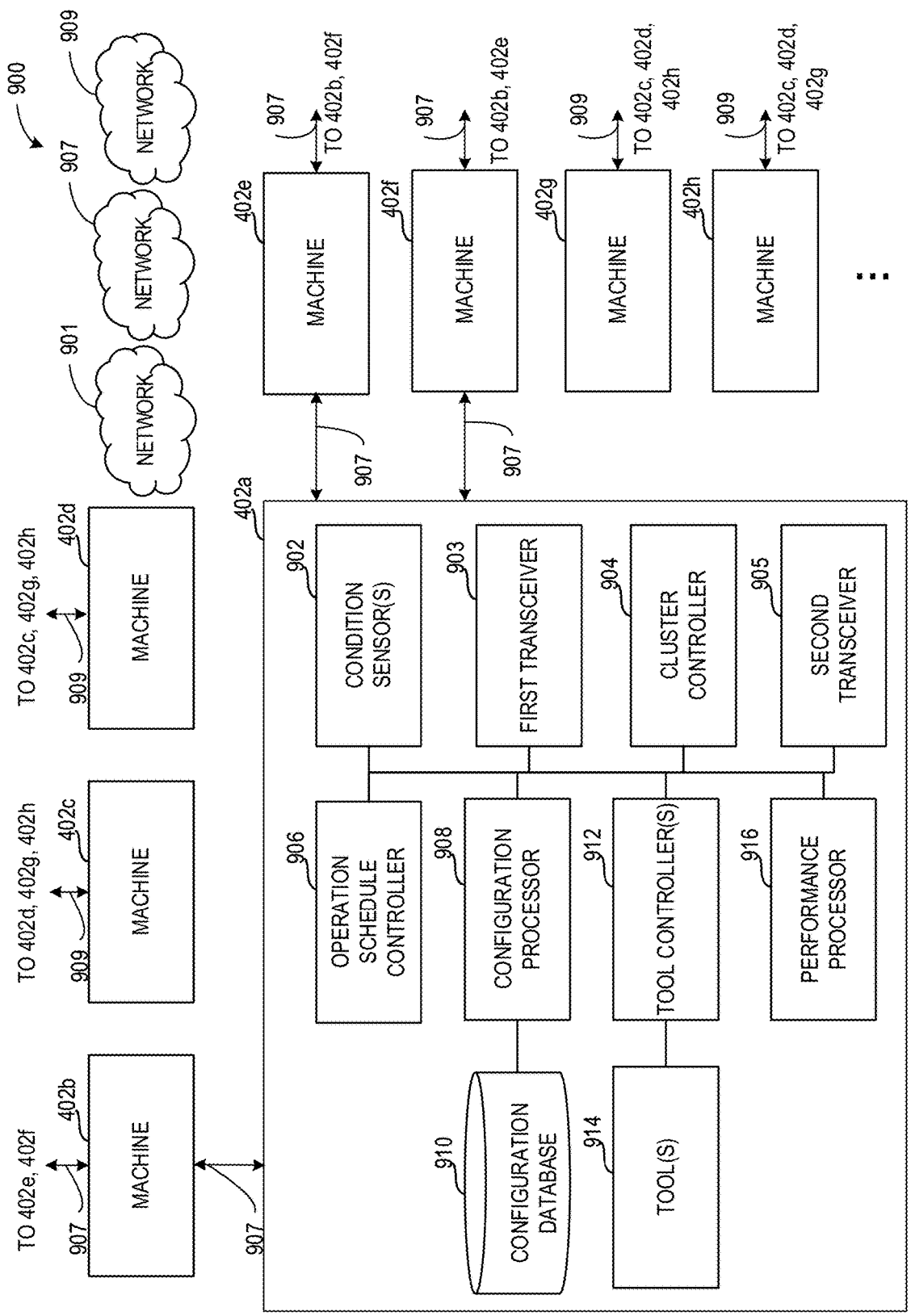
FIG. 9 is a block diagram of an example machine associated with the example factory setting of FIG. 4 and the example cells of FIGS. 4, 6, 7, and/or 8.

FIG. 9 is a block diagram 900 of the primary machine 402a in accordance with the teachings of this disclosure. In FIG. 9, the primary machine 402a includes an example condition sensor(s) 902, an example first transceiver (e.g., a factory transceiver) 903, an example cluster controller 904, an example second transceiver (e.g., a cluster transceiver) 905, an example operation timing processor 906, an example configuration processor 908, an example configuration database 910, an example tool controller(s) 912, an example tool(s) 914, and an example performance processor 916.

In FIG. 9, the condition sensor(s) 902 measures a condition(s) encountered by the first machine 402a. For example, the conditions sensor(s) 902 can include an ambient temperature sensor, a humidity sensor, an air quality meter, and/or any other sensors that measure a condition associated with the nearby surroundings of the first machine 402a. The condition sensor(s) 902 indicate the condition measurement(s) to the cluster controller 904.

In FIG. 9, the first transceiver 903 is communicatively coupled to a first M2M communication network 901. Additionally, each of the second machine 402b, the third machine 402c, the fourth machine 402d, the fifth machine 402e, the sixth machine 402f, the seventh machine 402g, the eighth machine 402h, and any other of the example machines 402 of FIG. 4 are communicatively coupled to the first M2M communication network 901. As such, the primary machine 402a is communicatively coupled to the machines (e.g., secondary machines) 402b, 402c, 402d, 402e, 402f, 402g, 402h via the first M2M communication network 901. The first transceiver 903 receives ambient conditions from the condition sensor(s) 902 and the machines (e.g., secondary machines) 402b, 402c, 402d, 402e, 402f, 402g, 402h via the first M2M communication network 901.

Figure 10:
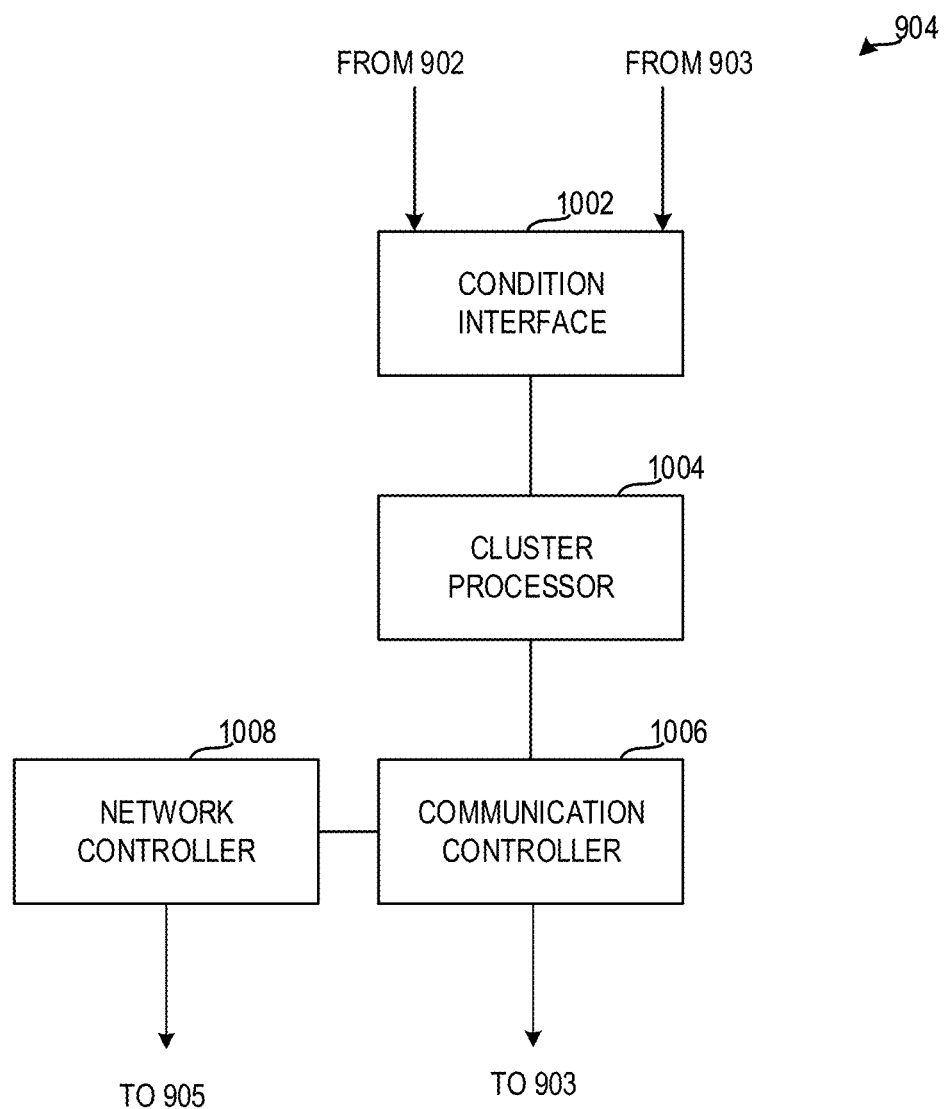
FIG. 10 is a block diagram of an example cluster controller associated with the example machine of FIG. 9.

In FIG. 9, the cluster controller 904 assigns the machines 402a, 402b, 402c, 402d, 402e, 402f, 402g, 402h to clusters, as discussed further in association with FIG. 10. The cluster controller 904 can access the ambient conditions associated with the primary machine 402a via the condition sensor(s) 902. Further, the cluster controller 904 can access the ambient conditions associated with the secondary machines 402b, 402c, 402d, 402e, 402f, 402g, 402h via the first transceiver 903. In turn, the cluster controller 904 analyzes the ambient conditions encountered by each of the machines 402a, 402b, 402c, 402d, 402e, 402f, 402g, 402h to determine clusters of the machines 402a, 402b, 402c, 402d, 402e, 402f, 402g, 402h.

In the illustrated example, the cluster controller 904 assigns the primary machine 402a, the second machine 402b, the fifth machine 402e, and the sixth machine 402f to a first cluster. Further, the cluster controller 904 assigns the third machine 402c, the fourth machine 402d, the seventh machine 402g, and the eighth machine 402h to a second cluster. For example, the cluster controller 904 can cause the first cluster (e.g., the primary machine 402a, the second machine 402b, the fifth machine 402e, and the sixth machine 402f) to utilize a second M2M communication network 907. Further, the cluster controller 904 can cause the second cluster (e.g., the third machine 402c, the fourth machine 402d, the seventh machine 402g, and the eighth machine 402h) to utilize a third M2M communication network 909. Accordingly, the cluster controller 904 can cause the machines 402a, 402b, 402c, 402d, 402e, 402f, 402g, 402h in the respective clusters to be communicatively coupled in response to the machines 402a, 402b, 402c, 402d, 402e, 402f, 402g, 402h encountering ambient conditions within a threshold range.

In the illustrated example, the cluster controller 904 configures the second transceiver 905 to utilize the second M2M communication network 907 and, thus, communicatively couples the primary machine 402a to the second M2M communication network 907. Further, the cluster controller 904 transmits a signal indicative of the second M2M communication network 907 and the secondary machines 402b, 402e, 402f within the first cluster to the first transceiver 903. In turn, the first transceiver 903 transmits a signal indicative of the second M2M communication network 907 to the secondary machines 402b, 402e, 402f within the first cluster via the first M2M communication network 901. Accordingly, in response to receiving the signal indicative of the second M2M communication network 907, the secondary machines 402b, 402e, 402f assigned to the first cluster can configure an associated transceiver (e.g., the second transceiver 905) to utilize the second M2M communication network 907. Likewise, the cluster controller 904 transmits a signal indicative of the third M2M communication network 909 and the secondary machines 402c, 402d, 402g, 402h within the second cluster to the first transceiver 903, which transmits a signal indicative of the third M2M communication network 909 to the secondary machines 402c, 402d, 402g, 402h within the second cluster via the first M2M communication network 901. Accordingly, in response to receiving the signal indicative of the third M2M communication network 909, the secondary machines 402c, 402d, 402g, 402h assigned to the second cluster can configure an associated transceiver (e.g., the second transceiver 905) to utilize the second M2M communication network 907.

In FIG. 9, the second transceiver 905 pings the second machine 402b, the fifth machine 402e, and the sixth machine 402f via the second M2M communication network 907 to indicate that the primary machine 402a is in the first cluster with the respective machines 402b, 402e, 402f. Additionally, the second transceiver 905 receives a ping from the second machine 402b, the fifth machine 402e, and the sixth machine 402f via the second M2M communication network 907. Accordingly, to establish communication between each member of the first cluster, the second machine 402b, the fifth machine 402e, and the sixth machine 402f also ping each other.

In some examples, the pings include identifiers of the respective machine 402a, 402b, 402c, 402d, 402e, 402f, 402g, 402h from which the ping was transmitted. For example, the machine identifier can include a make and/or model of the machines 402a, 402b, 402c, 402d, 402e, 402f, 402g, 402h, a serial number associated with the machines 402a, 402b, 402c, 402d, 402e, 402f, 402g, 402h, and/or any other type of reference label associated with the machines 402a, 402b, 402c, 402d, 402e, 402f, 402g, 402h. In some examples, the second transceiver 905 transmits the identifiers associated with the machines 402b, 402e, 402f to the operation schedule controller 906.

In some examples, the first and second clusters begin operations a predefined period after receiving a first ping is transmitted across the associated network (e.g., the second M2M communication network 907 or the third M2M communication network 909. In some examples, the second transceiver 905 transmits a timestamp to the operation schedule controller 906 in response to receiving the first ping.

Figure 11:
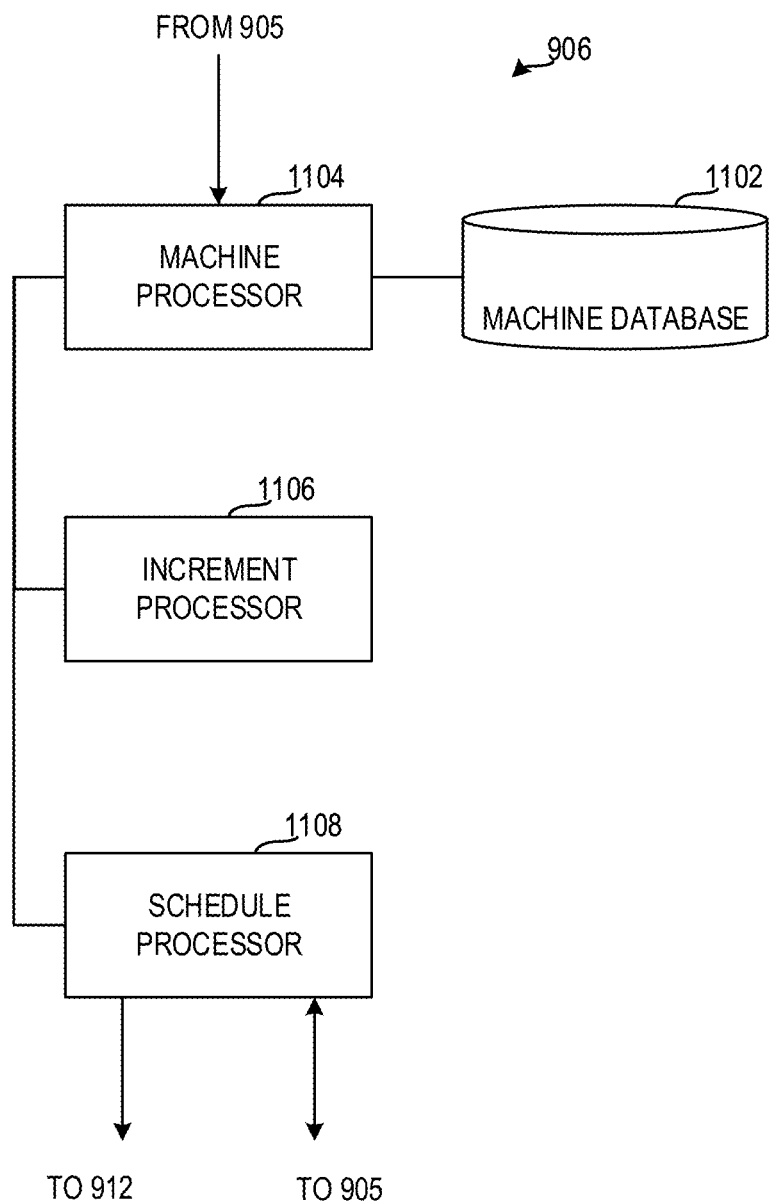
FIG. 11 is a block diagram of an example operation schedule controller associated with the example machine of FIG. 9.

In FIG. 9, the operation schedule controller 906 generates a schedule that the first machine 402a is to utilize for operations, as discussed further in association with FIG. 11. For example, the operation schedule controller 906 can determine a schedule that staggers operations of the primary machine 402a with operations of the secondary machines 402b, 402e, 402f in the first cluster. The operation schedule controller 906 obtains the identifiers associated with the secondary machines 402b, 402e, 402f in the first cluster via the second transceiver 905. In turn, the operation schedule controller 906 can identify a size of the first cluster (e.g., a quantity of the machines 402 within the first cluster) based on a quantity of the identifiers. Further, the operation timing processor 906 can determine an interval according to which the operations of the machines 402a, 402b, 402e, 402f are to be staggered based on the size of the first cluster.

In some examples, the operation timing processor 906 determines an order according to which the machines 402a, 402b, 402e, 402f within the first cluster are to operate based on the identifiers associated therewith. In some examples, the operation schedule controller 906 determines a start time for the operations of the primary machine 402a based on the timestamp associated with the first ping received by the second transceiver 905 and the determined order according to which the machines 402*a*, 402*b*, 402*e*, 402*f* within the first cluster are to operate. In turn, the operation schedule controller 906 determines a schedule for the primary machine 402*a* that enables the operations thereof to be staggered with the operations of the second machine 402*b*, the fifth machine 402*e*, and the sixth machine 402*f*, respectively. In the illustrated example, the operation timing processor 906 transmits a signal indicative of the schedule of operations for the first machine 402*a* to the tool controller(s) 912.

In some examples, the operation timing processor 906 indicates the schedule of operations for the primary machine 402*a* to the second transceiver 905, which can transmit the schedule to the second machine 402*b*, the fifth machine 402*e*, and the sixth machine 402*f* via the second M2M communication network 907. As such, the second machine 402*b*, the fifth machine 402*e*, and the sixth machine 402*f* can process the schedule associated with the primary machine 402*a* to determine a schedule therefor and/or verify that a schedule determined therefor is staggered with the operations of the primary machine 402*a*. Likewise, the second transceiver 905 can receive operation schedules from the second machine 402*b*, the fifth machine 402*e*, and the sixth machine 402*f*, which the operation timing processor 906 can process to ensure that the scheduled operations of the secondary machines 402*b*, 402*e*, 402*f* are staggered with respect to the scheduled operations associated therewith.

In FIG. 9, the configuration processor 908 determines a configuration according to which the primary machine 402*a* is to perform the operation. In some examples, the configuration processor 908 determines a first configuration to utilize for the operation based on an initial configuration setting and/or predefined parameters associated with the operation. In some examples, the configuration processor 908 transmits the first configuration to the tool controller(s) 912 and/or the performance processor 916.

In some examples, the configuration processor 908 adjusts the configuration according to which the primary machine 402*a* operates. For example, the second transceiver 905 can receive a signal indicating a configuration according to which one of the secondary machines 402*b*, 402*e*, 402*f* performed the operation and a performance metric resulting therefrom, which the configuration processor 908 can access. As such, the configuration processor 908 can process the performance metric associated with the operation of the secondary machines 402*b*, 402*e*, 402*f* to determine whether the performance metric is within a threshold range (e.g., satisfies a confidence level associated with the operation). In some examples, the configuration processor 908 identifies a reference performance metric and/or the threshold range based on the configuration according to which the operation was performed. In some examples, the signal received by the second transceiver 905 indicates whether the result was acceptable or unacceptable. In some such examples, when the result is unacceptable, the signal may indicate an error associated with the operation (e.g., a deviation thereof from the threshold range, a matching score). In some examples, the configuration processor 908 stores the configuration and the resulting performance metric and/or the error via the configuration database 910.

In response to the performance metric associated with the most recent operation performed by the secondary machines 402*b*, 402*e*, 402*f* within the first cluster being within the threshold range (e.g., satisfying the confidence level associated with the operation), the configuration processor 908 determines that the primary machine 402*a* is to use the same configuration. In turn, the configuration processor 908 transmits the configuration to the tool controller(s) 912. Further, in response to the performance metric associated with the most recent operation performed by the secondary machines 402*b*, 402*e*, 402*f* in the first cluster not being within the threshold range (e.g., not satisfying the confidence level associated with the operation), the configuration processor 908 can adjust the configuration according to which the primary machine 402*a* operates from the first configuration, or an alternative configuration utilized by the secondary machines 402*b*, 402*e*, 402*f*, to a second configuration that is different from the first configuration. In turn, the configuration processor 908 transmits the second configuration to the tool controller(s) 912 and/or the performance processor 916.

In some examples, the configuration processor 908 receives a performance metric and/or an error associated with the operations performed by the primary machine 402*a* via the performance processor 916. In turn, the configuration processor 908 associates the performance metric and/or the error with the configuration according to which the operation was performed and stores the association in the configuration database 910. In some examples, the configuration processor 908 accesses a condition(s) encountered by the primary machine 402*a* during the operation via the condition sensor(s) 902. Accordingly, the configuration processor 908 can associate the condition(s) with the utilized configuration and the resulting performance metric and store the association via the configuration database 910.

In FIG. 9, the configuration database 910 includes configurations utilized to execute the operation performed by the primary machine 402*a*, the second machine 402*b*, the fifth machine 402*c*, and/or the sixth machine 402*d* (e.g., the machines in the first cluster). For example, the configuration database 910 can include the first configuration, the second configuration, performance metrics resulting from the associated operation, an error resulting from the associated operation, and/or conditions encountered by the primary machine 402*a* during the associated operation.

In FIG. 9, the tool controller(s) 912 causes performance of an operation by the tool(s) 914. The tool controller(s) 912 receives a signal indicative of the configuration to be utilized by the tool(s) 914 (e.g., the first configuration, the second configuration, and/or any other configuration) via the configuration processor 908. Additionally, the tool controller(s) 912 receives a signal indicative of the schedule according to which the tool(s) 914 is to perform the operation associated therewith via the operation schedule controller 906.

In response to receiving the signal indicative of the first configuration, the tool controller(s) 912 produces and/or transmits a first drive signal associated with the first configuration to the tool(s) 914 in accordance with an operation time indicated by the received schedule. Similarly, in response to receiving the signal indicative of the second configuration, the tool controller(s) 912 produces and transmits a second drive signal associated with the second configuration to the tool(s) 914 in accordance with an operation time indicated by the schedule. However, in some example operations, environmental and/or physical variations that the tool(s) 914 encounters can cause the drive signal that the tool controller(s) 912 produces to deviate from a desired or predetermined drive signal associated with the implemented configuration.

In some examples, the tool controller(s) 912 produces and/or measures a performance metric(s) when the tool(s) 914 performs the operation. For example, the tool controller(s) 912 can produce performance metrics, such as voltage, current, and/or power associated with the drive signal, in response to causing the tool(s) 914 to perform the operation. Further, the tool controller(s) 912 can measure a performance metric, such as a resistance encountered by the drive signal, in response to causing the tool(s) 914 to perform the operation.

In FIG. 9, the tool(s) 914 performs the operation associated therewith (e.g., welding, machining, printing, painting, milling, etc.) based on the configuration set by the tool controller(s) 912. For example, the tool(s) 914 can perform the operation according to the first configuration or the second configuration in response to receiving the first drive signal or the second drive signal, respectively. In some examples, the tool(s) 914 affects signals and/or circuitry associated with the tool controller(s) 912 in response to performing the operation.

In FIG. 9, the performance processor 916 processes the performance metric associated with the performance of the operation by the tool(s) 914. The performance processor 916 obtains the configuration being implemented (e.g., the first configuration or the second configuration) by the tool controller(s) 912 via the configuration processor 908. In turn, the performance processor 916 determines the desired and/or predetermined drive signal associated with the configuration being implemented. In response to the tool controller (s) 912 causing the tool(s) 914 to perform the operation, the performance processor 916 obtains the drive signal (e.g., a performance metric) produced by the tool controller(s) 912. For example, the performance processor 916 can determine the voltage, current, and/or power produced by the tool controller(s) 912 and/or the resistance encountered by the tool controller(s) 912.

In FIG. 9, the performance processor 916 determines whether the performance metric associated with the operation is within a threshold range. The threshold range can be based on desired results of the operation and/or performance metrics that have produced acceptable results in previous operations. The performance processor 916 compares the predetermined drive signal associated with the configuration to the drive signal produced by the tool controller(s) 912 to determine a matching score (e.g., a deviation or difference) between the produced drive signal and the predetermined drive signal (e.g., a performance metric). As such, the performance processor 916 determines an error encountered by the tool controller(s) 912 in response to causing the operation according to the configuration (e.g., the first configuration or the second configuration).

In turn, the performance processor 916 analyzes the matching score and a confidence level, which corresponds to the threshold range, to determine whether the configuration implemented by the tool controller(s) 912 produced acceptable results. In some examples, the performance processor 916 determines the configuration produced acceptable results in response to the matching score between the produced drive signal and the predetermined drive signal satisfying (e.g., being greater than or equal to) the confidence level (e.g., being within the threshold range). In response to determining the configuration produced acceptable results the performance processor 916 transmits a signal indicative of an acceptable operation to the second transceiver 905. In some examples, the signal indicative of the acceptable operation indicates the drive signal produced by the tool controller(s) 912 and/or the matching score between the produced drive signal and the predetermined drive signal associated with the configuration. In some examples, the performance processor 916 determines the configuration did not produce acceptable results in response to the matching score not satisfying (e.g., being less than) the confidence level (e.g., not being within the threshold range). In response to determining that the operation did not produce acceptable results, the performance processor 916 transmits a signal indicative of an unacceptable operation to the second transceiver 905. In some examples, the performance processor 916 indicates the deviation between the produced drive signal and the predetermined drive signal in the signal indicative of the unacceptable operation.

In FIG. 9, the second transceiver 905 receives the configuration according to which the tool controller(s) 912 caused performance of the operation from the configuration processor 908. Additionally, the second transceiver 905 receives the signal indicative of the acceptable or unacceptable operation via the performance processor 916. The second transceiver 905 communicates the results of the operation with the other machines 402b, 402e, 402f in the first cluster via the second M2M communication network 907. Specifically, the second transceiver 905 transmits a signal indicative of the implemented configuration (e.g., the first configuration or the second configuration) and the acceptable results or the unacceptable results associated therewith to the second machine 402b, the fifth machine 402e, and the sixth machine 402f. In some examples, the second transceiver 905 indicates the deviation between the produced drive signal and the predetermined drive signal (e.g., the matching score) in the signal indicative of the unacceptable results.

Accordingly, the staggered operations of the first cluster allows the second machine 402b, the fifth machine 402e, and/or the sixth machine 402f to process the results of the operation performed by the first machine 402a to determine whether to use the same configuration as the first machine 402a or a different configuration. Specifically, the second machine 402b, the fifth machine 402e, and/or the sixth machine 402f can utilize the same configuration as the first machine 402a in response to receiving the signal indicative of the configuration and the acceptable results associated therewith. On the other hand, the second machine 402b, the fifth machine 402e, and/or the sixth machine 402f can utilize a different configuration in response to the signal indicative of the configuration and the unacceptable results associated therewith. In some examples, the second machine 402b, the fifth machine 402e, and/or the sixth machine 402f compare the matching score to the confidence level associated with the acceptable performance to determine the different configuration. For example, the secondary machines 402b, 402e, 402f can determine the different configuration based on the deviation between the drive signal produced by the tool controller(s) 912 of the first machine 402a and the predetermined drive signal associated with the configuration implemented thereby.

Likewise, in response to the second machine 402b, the fifth machine 402e, and/or the sixth machine 402f performing an operation, the second transceiver 905 receives the configuration utilized thereby and the results associated therewith. In turn, the configuration processor 908 can access the configuration and the associated results via the second transceiver 905 and, in turn, determine the configuration to be implemented by the primary machine 402a for a subsequent operation accordingly.

FIG. 10 is a block diagram of the example cluster controller 904 of the example primary machine 402a. In FIG. 10, the cluster controller 904 includes a condition interface 1002, a cluster processor 1004, a communication controller 1006, and a network controller 1008. In FIG. 10, the example cluster controller 904 is communicatively coupled to the first M2M channel 901.

In FIG. 10, the condition interface 1002 receives ambient conditions of the machines 402a, 402b, 402c, 402d, 402e, 402f, 402g, 402h. For example, the condition sensor(s) 902 of the first machine 402a of FIG. 9 can transmit an ambient condition(s) encountered by the machine to the condition interface 1002. Similarly, condition sensors of the secondary machines 402b, 402c, 402d, 402e, 402f, 402g, 402h similar to the condition sensor(s) 902 of the first machine 402a can measure ambient conditions associated with the respective machines 402b, 402c, 402d, 402e, 402f, 402g, 402h. Further, transceivers of the secondary machines 402b, 402c, 402d, 402e, 402f, 402g, 402h can transmit the ambient conditions associated therewith to the first transceiver 903 via the first M2M communication network 901. In the illustrated example, the condition interface 1002 can access the ambient conditions associated with the secondary machines 402b, 402c, 402d, 402e, 402f, 402g, 402h via the first transceiver 903. The condition interface 1002 can transmit the ambient conditions associated with the machines 402a, 402b, 402c, 402d, 402e, 402f, 402g, 402h to the cluster processor 1004.

In FIG. 10, the cluster processor 1004 processes the ambient conditions of the machines 402a, 402b, 402c, 402d, 402e, 402f, 402g, 402h and/or other parameters associated therewith (e.g., a make and model, an operation performed thereby, etc.) to determine clusters of the machines 402a, 402b, 402c, 402d, 402e, 402f, 402g, 402h that have similar operating conditions and, thus, may perform the associated operations similarly. For example, the cluster processor 1004 can obtain the ambient conditions of the machines 402a, 402b, 402c, 402d, 402e, 402f, 402g, 402h via the condition interface 1002. In some examples, the cluster processor 1004 analyzes the ambient conditions to identify similarities according to which the clusters can be defined. In some examples, the cluster processor 1004 assigns the machines 402a, 402b, 402c, 402d, 402e, 402f, 402g, 402h to clusters that are evenly distributed.

In some examples, parameters defining the clusters (e.g., the cluster definitions 800 of FIG. 8) are predefined based on an effect of the or parameters on the operations of the machines 402a, 402b, 402c, 402d, 402e, 402f, 402g, 402h. In such examples, the cluster processor 1004 sorts the machines 402a, 402b, 402c, 402d, 402e, 402f, 402g, 402h into the clusters based on the ambient conditions and/or other parameters associated therewith and the predefined parameters defining the clusters.

In the illustrated example of FIG. 10, the cluster processor 1004 determines the first machine 402a, the second machine 402b, the fifth machine 402e, and the sixth machine 402f are to be assigned to a first cluster based on the ambient conditions and/or other parameters associated therewith. Further, the cluster processor 1004 determines the third machine 402c, the fourth machine 402d, the seventh machine 402g, and the eighth machine 402h are to be assigned to a second cluster. The cluster processor 1004 transmits a signal(s) to the communication controller 1006 indicative of the clusters to which each of the machines 402a, 402b, 402c, 402d, 402e, 402f, 402g, 402h are to be assigned.

In FIG. 10, the communication controller 1006 determines communication networks (e.g., the second M2M communication network 907, the third M2M communication network 909) that the machines 402a, 402b, 402c, 402d, 402e, 402f, 402g, 402h are to utilize to communicate with their respective cluster. For example, the communication controller 1006 determines that the first cluster (e.g., the primary machine 402a, the second machine 402b, the fifth machine 402e, and the sixth machine 402f) is to utilize the second M2M communication network 907 to communicate utilized configurations and associated results. Further, the communication controller 1006 determines that the second cluster (e.g., the third machine 402c, the fourth machine 402d, the seventh machine 402g, and the eighth machine 402h) is to utilize the third M2M communication network 909 to communicate utilized configurations and associated results. In some examples, the communication controller 1006 indicates the communication networks to be utilized by the secondary machines 402b, 402c, 402d, 402e, 402f, 402g, 402h to the first transceiver 903. Accordingly, the first transceiver 903 can utilize the first M2M communication network 901 to indicate the associated network to the respective secondary machines 402b, 402c, 402d, 402e, 402f, 402g, 402h. Additionally, the communication controller 1006 indicates the network associated with the primary machine 1006 to the network controller 1008.

In FIG. 10, the network controller 1008 enables the primary machine 402a to communicate with the secondary machines 402b, 402e, 402f in the first cluster. In the illustrated example, the network controller 1008 configures the second transceiver 905 to be communicatively coupled to the second M2M communication network 907.

FIG. 11 is a block diagram of the example operation schedule controller 906 of the example primary machine 402a of FIG. 9. In FIG. 11, the operation schedule controller 906 includes a machine database 1102, a machine processor 1104, an increment processor 1106, and a schedule processor 1108.

In FIG. 11, the machine database 1102 includes information associated with the machines 402. For example, the machine database 1102 can include identifiers of the machines 402, an operation(s) performed by the machines 402, a duration of the operation(s) performed by the machines 402, the cells 404 associated with the machines 402, the locations of the machines 402 in the factory 400, an order according to which the machines 402 operate, a duration of the operations of the machines 402, and/or any other information associated with the machines 402.

In FIG. 11, the machine processor 1104 processes the machines 402 in the same cluster as the first machine 402a. In some examples, in response to the primary machine 402a, the second machine 402b, the fifth machine 402e, and the sixth machine 402f being assigned to the first cluster, the machine processor 1104 obtains identifiers associated with the second machine 402b, the fifth machine 402e, and the sixth machine 402f via the second transceiver 905. In some examples, the machine processor 1104 analyzes the identifiers of the machines 402a, 402b, 402e, 402f and information associated therewith in the machine database 1102. In turn, the machine processor 1104 can determine the order according to which the machines 402a, 402b, 402e, 402f operate based on the information associated with the machines 402a, 402b, 402e, 402f in the machine database 1102. In some examples, the order according to which the machines 402a, 402b, 402e, 402f operate is based on the location of the machines 402a, 402b, 402e, 402f, the operation(s) being performed by the machines 402a, 402b, 402e, 402f, and/or the duration of the operation(s).

In the illustrated example, the machine processor 1104 transmits the order according to which the machines 402a, 402b, 402e, 402f operate to the schedule processor 1106. Further, the machine processor 1104 transmits a quantity of the obtained machine identifiers (e.g., a size of the cluster), the operation(s) performed by the machines 402a, 402b, 402e, 402f, and/or the duration of the operation(s) of the machines 402a, 402b, 402e, 402f to the increment processor 1106.

In FIG. 11, the increment processor 1106 determines an increment between the operations of the machines 402a, 402b, 402e, 402f in the cluster. For example, the increment processor 1106 can determine the increments between the start times of the operations of the machines 402a, 402b, 402e, 402f based on the size of the cluster and/or the duration of the operation(s) of the machines 402a, 402b, 402e, 402f In some examples, the increment processor 1106 determines an operation(s) for which the machines 402a, 402b, 402e, 402f are to communicate configurations based on the operation(s) that the machines 402a, 402b, 402e, 402f have in common. As such, the increment processor 1106 can determine a minimal increment between the operation(s) of the machines 402a, 402b, 402e, 402f that prevents an overlap of the common operation(s) and enables the machines 402a, 402b, 402e, 402f to communicate a utilized configuration(s) and associated results therein. The increment processor 1106 transmits the increment between the operations of the machines 402a, 402b, 402e, 402f in the cluster to the schedule processor 1108.

In FIG. 11, the schedule processor 1108 determines an operation schedule according to which the primary machine 402a (e.g., the tool(s) 914) operates. In the illustrated example, the schedule processor 1108 receives a signal indicative of a start time of the operations of the cluster via the second transceiver 905. For example, the schedule processor 1108 can receive a timestamp associated with a first ping received by the second transceiver 905 (e.g., from the second machine 402b, the fifth machine 402e, or the sixth machine 402f) and determine the start time of the cluster to be a predetermined period after the timestamp. Accordingly, the schedule processor 1108 determines the operation schedule of the first machine 402a based on the start time of the cluster, the order according to which the machines 402a, 402b, 402e, 402f operate, and the increment between the operation(s) thereof. For example, when the first machine 402a is to operate after the second machine 402b and before the fifth machine 402e and the sixth machine 402f, the schedule processor 1108 schedules a first operation of the first machine 402a to begin one increment after the start time for the cluster. Further, the schedule processor 1108 schedules the second operation of the first machine 402a to begin five increments after the start time of the cluster as a result of the size of the cluster. In turn, the schedule processor 1108 transmits the operation schedule to the tool controller(s) 912.

In some examples, the schedule processor 1108 transmits the operation schedule of the first machine 402a to the second transceiver 905, which communicates the schedule with the secondary machines 402b, 402e, 402f in the first cluster. Similarly, the schedule processor 1108 can receive the operation schedule of the second machine 402b, the fifth machine 402e, and/or the sixth machine 402f via the second transceiver 905. As such, the schedule processor 1108 can ensure that the operations of the first machine 402a, the second machine 402b, the fifth machine 402e, and the sixth machine 402f are staggered to enable transfer learning therebetween.

The second machine 402b, the third machine 402c, the fourth machine 402d, the fifth machine 402e, the sixth machine 402f, the seventh machine 402g, and the eighth machine 402h are substantially similar to the first machine 402a. Specifically, the second machine 402b, the third machine 402c, the fourth machine 402d, the fifth machine 402e, the sixth machine 402f, the seventh machine 402g, and the eighth machine 402h can implement some of the same components to the first machine 402a, such as the condition sensor(s) 902, the first transceiver 903, parts of the cluster controller 904 (e.g., the network interface 1008), the second transceiver 905 the operation schedule controller 906, the configuration processor 908, the configuration database 910, the tool controller(s) 912, the tool(s) 914, and the performance processor 916. In the other machines 402b, 402c, 402d, 402e, 402f, 402g, 402h, the condition sensor(s) 902 is communicatively coupled to the second transceiver 905 instead of the cluster controller 904, which enables the secondary machines 402b, 402c, 402d, 402e, 402f, 402g, 402h to transmit ambient conditions associated therewith to the first machine 402a via the first M2M channel 901. In addition, the network controller 1008 of the secondary machines 402b, 402c, 402d, 402e, 402f, 402g, 402h has access to the first transceiver 903 in addition to the second transceiver 905. As such, the network controller 1008 of the secondary machines 402b, 402c, 402d, 402e, 402f, 402g, 402h can access the signal indicative of the network to be utilized by the second transceiver 905 for cluster communications (e.g., the second M2M communication network 907, the third M2M communication network 909) via the first transceiver 903 and configures the second transceiver 905 accordingly.

In some examples, the controllers 408 of FIG. 4 implement the components of the machines 402a, 402b, 402c, 402d, 402e, 402f, 402g, 402h other than the tool(s) 914. For example, one of the controllers (e.g., a primary controller 408a) 408 can implement the condition sensor(s), 902, the first transceiver 903, the cluster controller 904, the second transceiver 905, the operation schedule controller 906, the configuration processor 908, the configuration database 910, the tool controller(s) 912, and the performance processor 916 similar to the primary machine 402a. Further, others of the controllers (e.g., secondary controllers) 408 can implement the condition sensor(s) 902, the first transceiver 903, parts of the cluster controller 904 (e.g., the network interface 1008), the second transceiver 905 the operation schedule controller 906, the configuration processor 908, the configuration database 910, the tool controller(s) 912, and the performance processor 916 similar to the secondary machines 402b, 402c, 402d, 402e, 402f, 402g, 402h. In such examples, the tool controllers 912 of the controllers 408 are communicatively coupled to the respective tools 914 of the machines 402.

FIG. 12 is an illustrative example of a difference between existing mechanisms 1202 and example mechanisms disclosed herein 1204. In the illustrated example of FIG. 12, the machines 402 utilize GOSSIP/TSN to align operations with other machines 402 dynamically. In turn, the machines 402 determine optimal configurations that are scalable amongst the machines 402 and account for condition variations (e.g., in environmental conditions, material conditions, etc.). The illustrated example of FIG. 12 displays the lack of scalability and flexibility of existing configuration management systems 1202.

Figure 13:
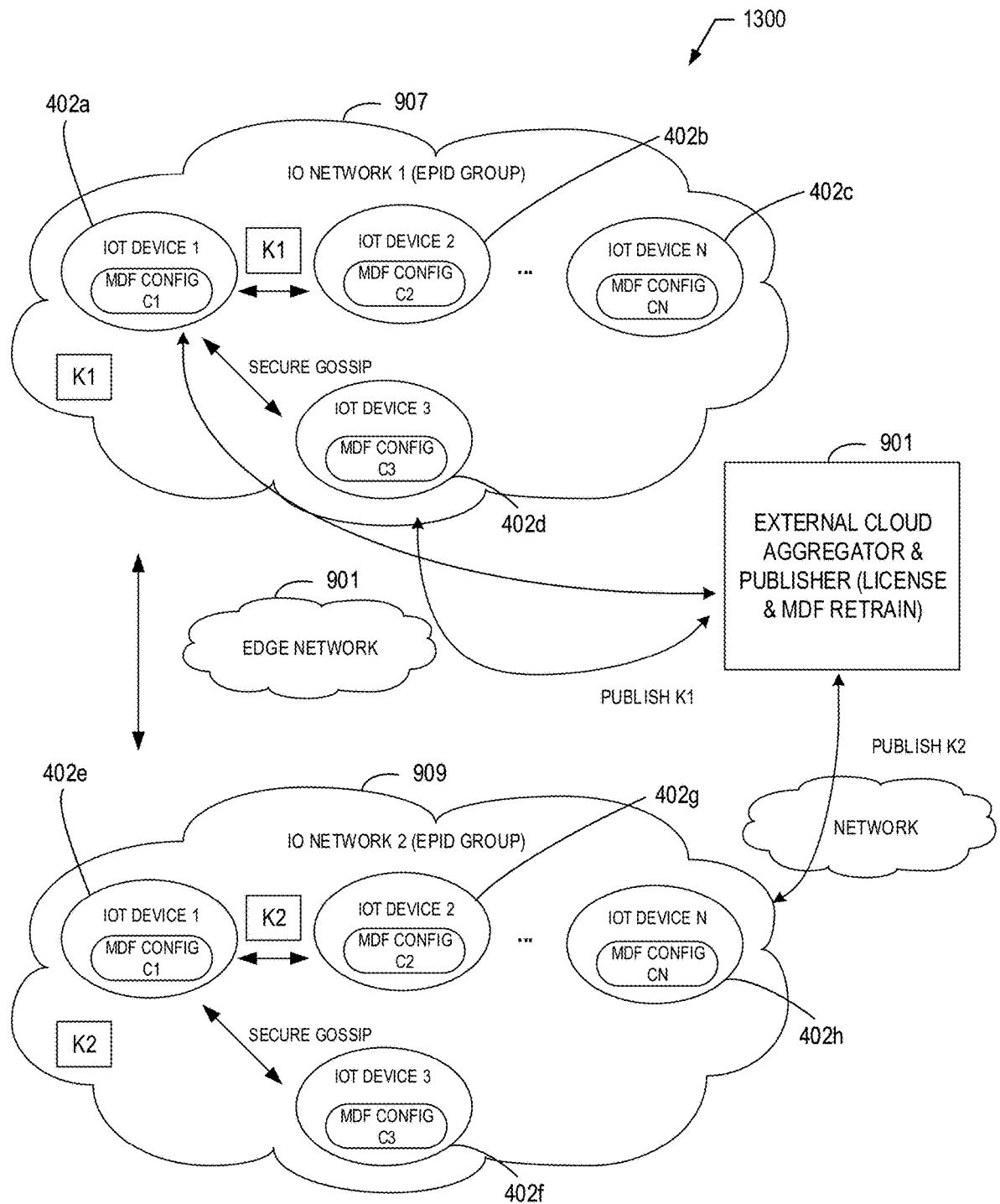
FIG. 13 is a block diagram of an example high-level system architecture involving Internet of Things Edge Devices, Edge Server, and Cloud server to facilitate the Secure TSN based Gossip protocol for efficient synchronization between the autonomous agents, different edge & cloud servers.

FIG. 13 is an illustrative example of the high-level system architecture 1300 involving IoT edge devices, such as the autonomous machines 402a, 402b, 402c, 402d, 402e, 402f, 402g, 402h, an edge server (on-premise, regional office or far edge in core network), such as the M2M communication networks 901, 907, 9009, and a Cloud server that helps to facilitate the Secure TSN based Gossip protocol for efficient synchronization between the edge devices (e.g., the machines 402) among different edge & cloud servers.

In the illustrated example of FIG. 13, the system 1300 utilizes Enhanced Privacy Identification (EPID), which is an implementation that addresses two disadvantages associated with PKI Security Scheme: anonymity and membership revocation. One improvement over PKI provides a user or device "Direct Anonymous Attestation" which provides the ability to authenticate a device for a given level of access while allowing the device to remain anonymous. This is accomplished by introducing the concept of a Group level membership authentication scheme. Instead of a 1:1 public to private key assignment for an individual user, EPID allows a group of membership private keys to be associated together and linked to one public group key. This public EPID group public key can be used to verify the signature produced by any EPID member private key in the group. Most importantly, no one, including the issuer, has any way to know the identity of the user. Only the member device has access to the private key, which can only be validated using a properly provisioned EPID signature.

Another security improvement that EPID provides is the ability to revoke an individual device by detecting a compromised signature or key. If the private key used by a device has been compromised or stolen, allowing the EPID ecosystem to recognize this enables the device to be revoked, and, thus, prevents any future forgery. During a security exchange, the EPID protocol requires that members perform mathematical proofs to indicate that they could not have created any of the signatures that have been flagged on a signature revocation list. This built in revocation feature allows devices or even entire groups of devices to be instantly flagged for revocation, instantly being denied service. It allows anonymous devices to be revoked on the basis of a signature alone, which allows an issuer to ban a device from a group without ever knowing which device was banned.

Figure 14:
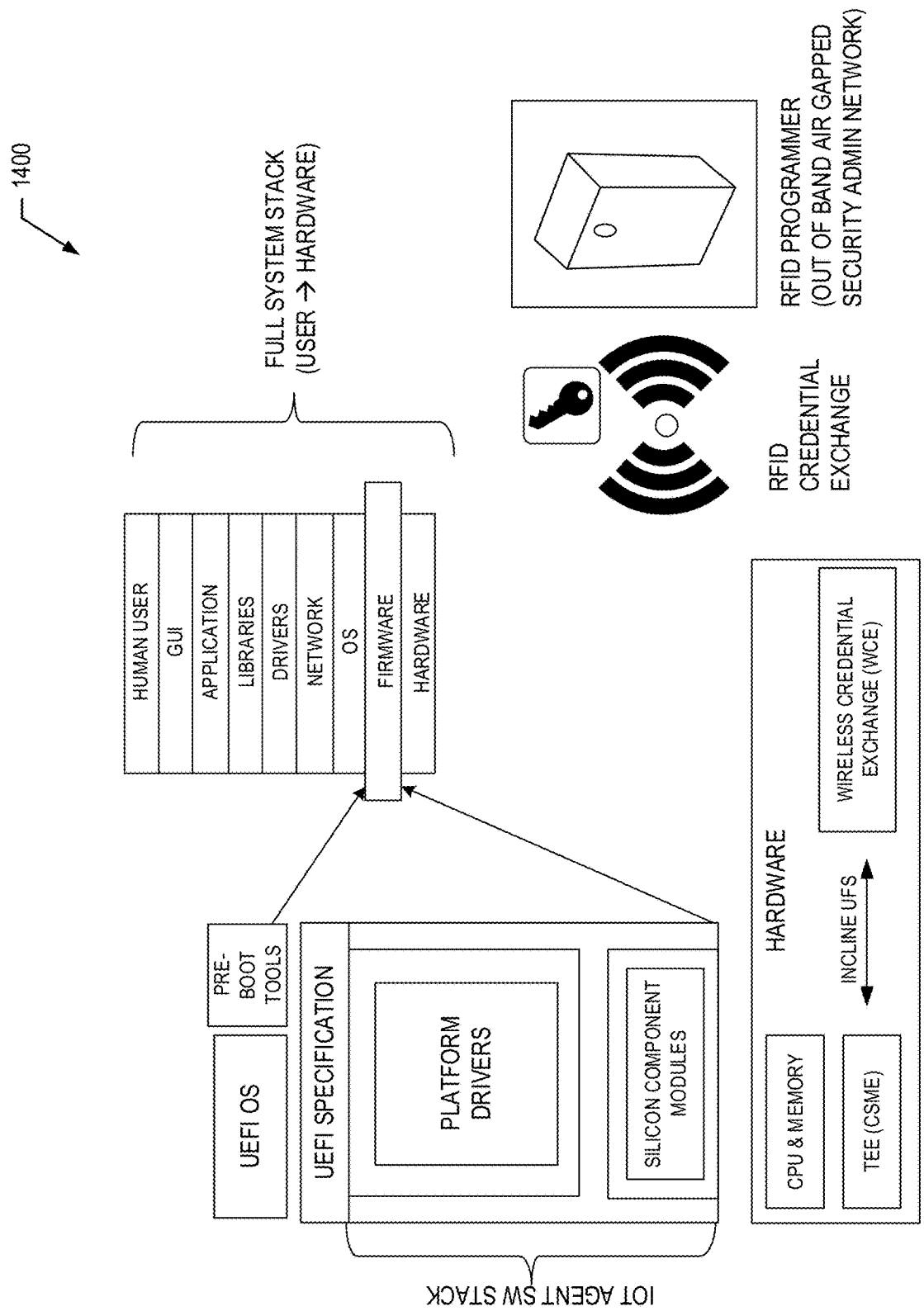
FIG. 14 is a block diagram of an example system architecture for a TSN based Gossip Sync using Platform Wireless Credential Exchange (WCE) & Trusted Execution Environment.

FIG. 14 is an illustrative example of the System Arch 1400 for Proposed TSN based Gossip Sync using Platform WCE & TEE. WCE provides air-gapped secure wireless (e.g., radio frequency (RF) ID) based mechanisms to securely provision and manage policies for TEE dynamically based on deployment scenarios. A TEE implementation enables secure sharing of configuration updates and associated data to be provisioned and validated within and across cells for improved production quality.

Figure 15:
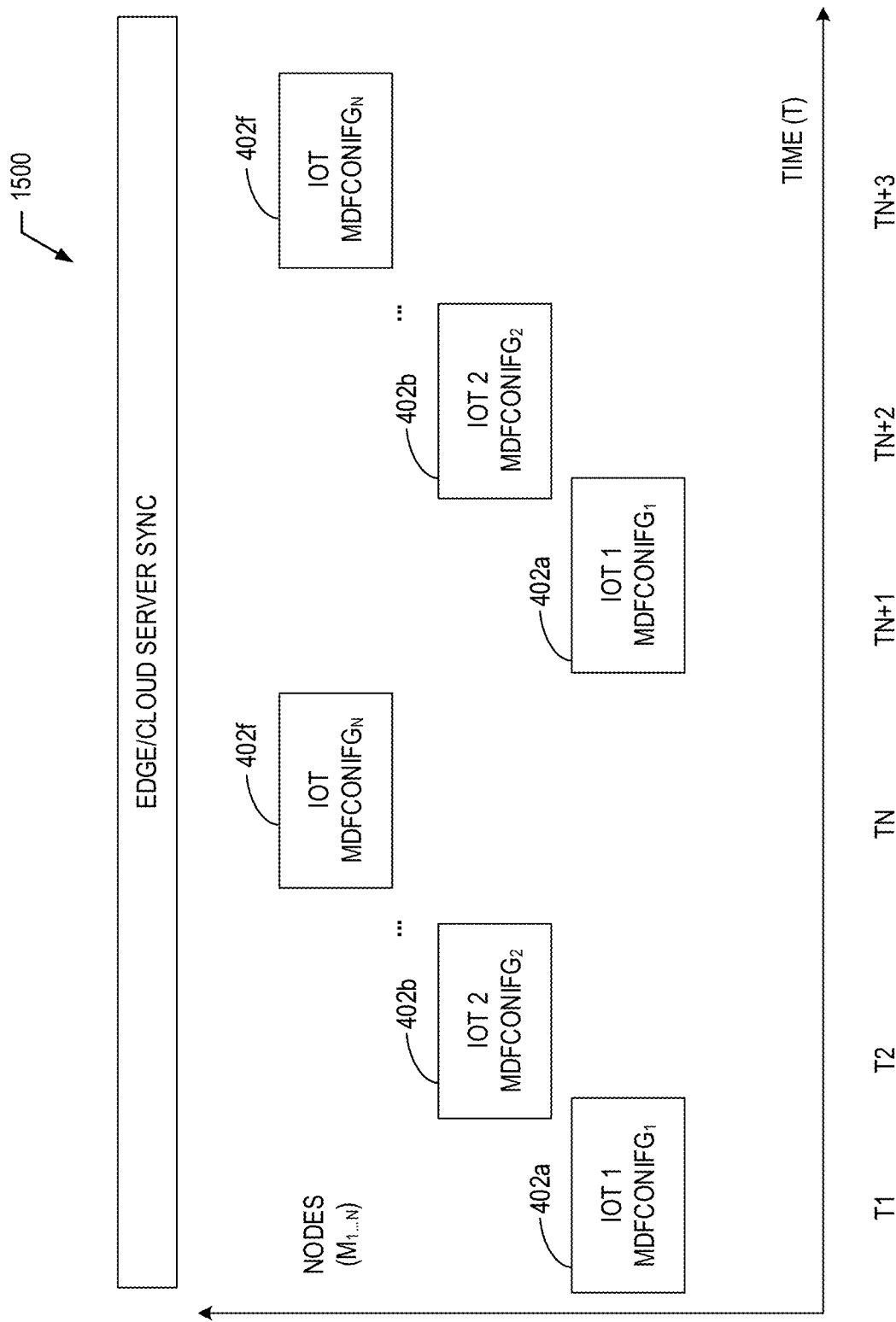
FIG. 15 is a graph illustrating an example Community based TSN.

FIG. 15 is an illustrative example of the Community based TSN 1500 wherein instead of all the machines 402a, 402b, 402e, 402f, synchronously operating (e.g., on the car 406 of FIG. 4), the primary machine 402a starts early (e.g. 50 ms early) to determine the quality of the weld dynamically and share configuration tweaks required to neighboring peer(s) in the same cell or across cells, so agents can calibrate their configuration dynamically. By sharing configuration tweaks to neighboring peers, weld quality can be improved dynamically by peers within or across cells during manufacturing of the product, resulting in improved welding characteristics throughout production.

Figure 16:
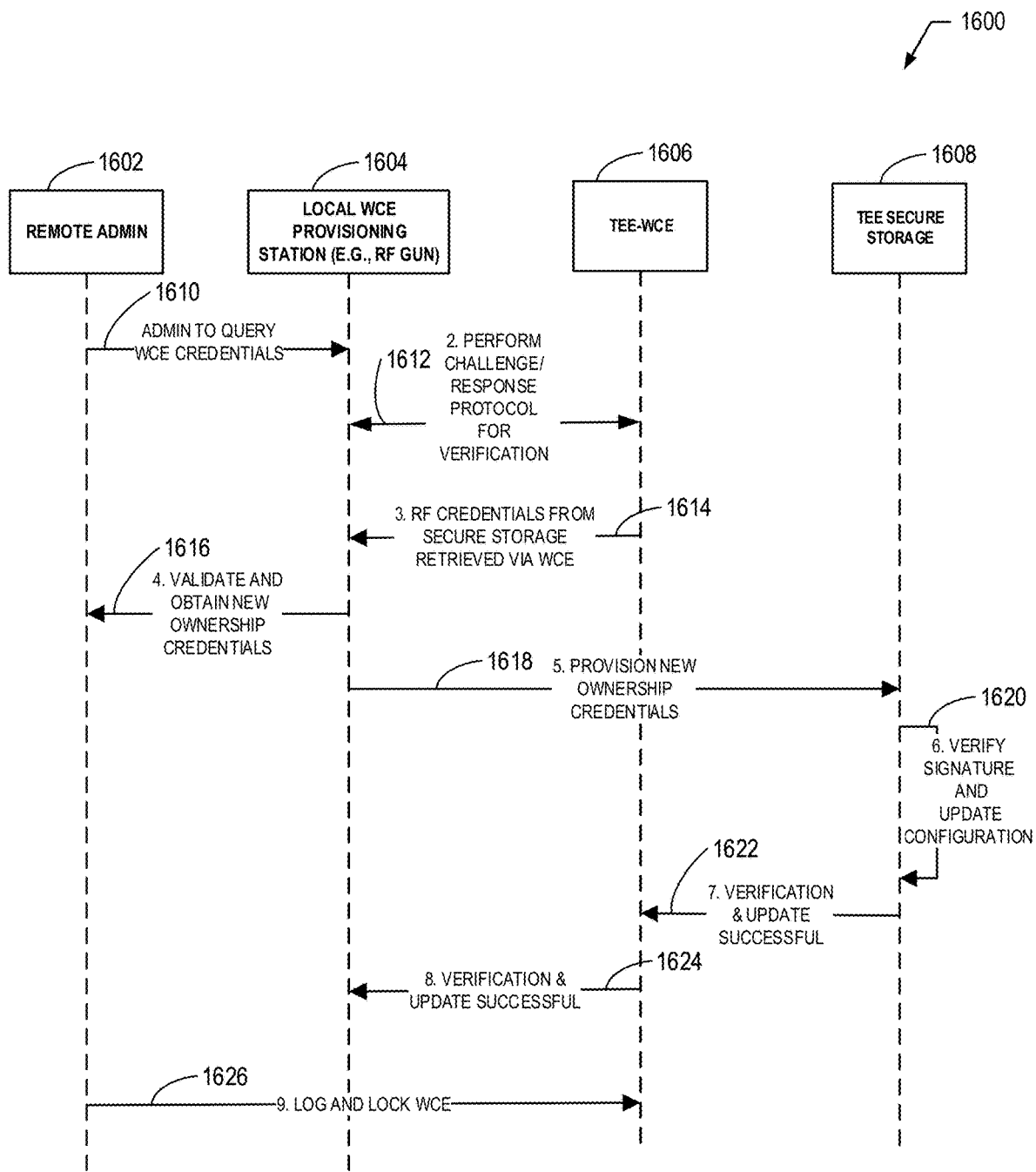
FIG. 16 is a flowchart representative of example machine-readable instructions that may be executed by example processor circuitry to implement the system architecture of FIG. 14 to configure and operate secure provisioning and validation of platform Trusted Execution Environment credentials to be used for TSN Gossip Sync between peer Internet of Things (IoT) agents and with Edge & Cloud Server using Wireless Credential Exchange (WCE) with TEE.

FIG. 16 is an illustrative example of the configuration and operational flow 1600 that secure provisioning and validation of platform TEE credentials to be used for TSN Gossip Sync between peer IoT agents and with Edge & Cloud Server using Wireless Credential Exchange (WCE) with Trusted Execution Environment (TEE). The illustrative example of FIG. 16 enables credentialled and secured exchange of weld data and configuration updates within and across cells. The operational flow 1600 of FIG. 16 illustrates secure implementation of the mechanisms discussed above and disclosed herein. In FIG. 16, the operation flow 1600 occurs between a remote administrator 1602, a local WCE provisioning station (e.g., a RF scanner) 1604, a TEE-WCE 1606, and a TEE secure storage 1608.

The operation flow 1600 begins at step 1610, at which the remote administrator 1602 queries for WCE credentials. At step 1612, the local WCE provisioning station 1604 performs a challenge/response protocol for verification. At step 1614, the TEE-WCE 1606 retrieves RF credentials from a secure storage via the TEE-WCE 1606. At step 1616, the local WCE provision station 1604 obtains and validates new ownership credentials via the remote administrator 1602. At step 1618, the local WCE provisioning station 1604 provisions new ownership credentials to the TEE-WCE 1606. At step 1620, the TEE secure storage 1608 verifies a signature from the TEE-WCE 1606 and updates a configuration thereof. At step 1622, the TEE secure storage 1608 alerts the TEE-WCE 1606 that the verification and update occurred successfully. At step 1624, the TEE-WCE 1606 alerts the local WCE provisioning station that the verification and update occurred successfully. At step 1626, the remote administrator logs and locks the TEE-WCE 1606.

While an example manner of implementing the machines 402 of FIGS. 4, 6, 7, 8, 13, and/or 15 is illustrated in FIGS. 9, 10, and 11, one or more of the elements, processes and/or devices illustrated in FIGS. 9, 10, and/or 11 may be combined, divided, re-arranged, omitted, eliminated and/or implemented in any other way. Further, the example condition sensor(s) 902, the example first transceiver 903, the example cluster controller 904, the example second transceiver 905, the example operation schedule processor 906, the example configuration processor 908, the example configuration database 910, the example tool controller(s) 912, the example tool(s) 914, the example performance processor 916, the example condition interface 1002, the example cluster processor 1004, the example communication controller 1006, the example network controller 1008, the example machine database 1102, the example machine processor 1104, the example increment processor 1106, the example schedule processor 1108, and/or, more generally, the example machines 402 of FIGS. 4, 6, 7, 8, 13, and/or 15 may be implemented by hardware, software, firmware and/or any combination of hardware, software and/or firmware. Thus, for example, any of the example condition sensor(s) 902, the example first transceiver 903, the example cluster controller 904, the example second transceiver 905, the example operation schedule processor 906, the example configuration processor 908, the example configuration database 910, the example tool controller(s) 912, the example tool(s) 914, the example performance processor 916, the example condition interface 1002, the example cluster processor 1004, the example communication controller 1006, the example network controller 1008, the example machine database 1102, the example machine processor 1104, the example increment processor 1106, the example schedule processor 1108, and/or, more generally, the example machines 402 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)) such as Field Programmable Gate Arrays (FPGAs). When reading any of the apparatus or system claims of this patent to cover a purely software and/or firmware implementation, at least one of the example condition sensor(s) 902, the example first transceiver 903, the example cluster controller 904, the example second transceiver 905, the example operation schedule processor 906, the example configuration processor 908, the example configuration database 910, the example tool controller(s) 912, the example tool(s) 914, the example performance processor 916, the example condition interface 1002, the example cluster processor 1004, the example communication controller 1006, the example network controller 1008, the example machine database 1102, the example machine processor 1104, the example increment processor 1106, and the example schedule processor 1108 is/are hereby expressly defined to include a non-transitory computer readable storage device or storage disk such as a memory, a digital versatile disk (DVD), a compact disk (CD), a Blu-ray disk, etc. including the software and/or firmware. Further still, the example machines 402 of FIGS. 4, 6, 7, 8, 13, and/or 15 may include one or more elements, processes and/or devices in addition to, or instead of, those illustrated in FIGS. 9, 10, and 11, and/or may include more than one of any or all of the illustrated elements, processes, and devices.

Figure 17:
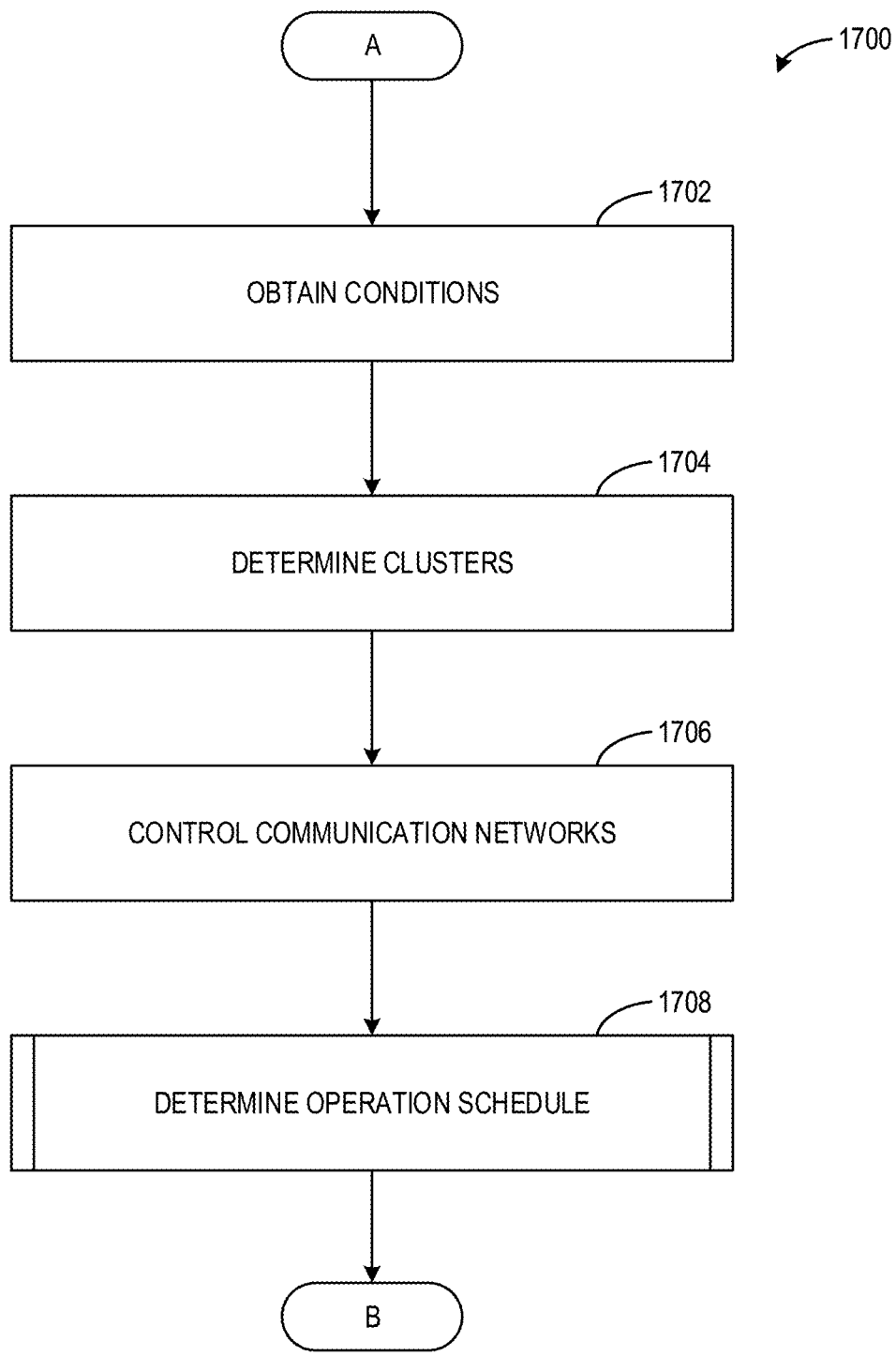
FIG. 17 is a flowchart representative of example machine-readable instructions that may be executed by example processor circuitry to implement the example cluster controller of FIGS. 9 and 10 and/or the example operation schedule controller of FIGS. 9 and 11 of the example machine of FIGS. 4, 6-13, and 15.
Figure 18:
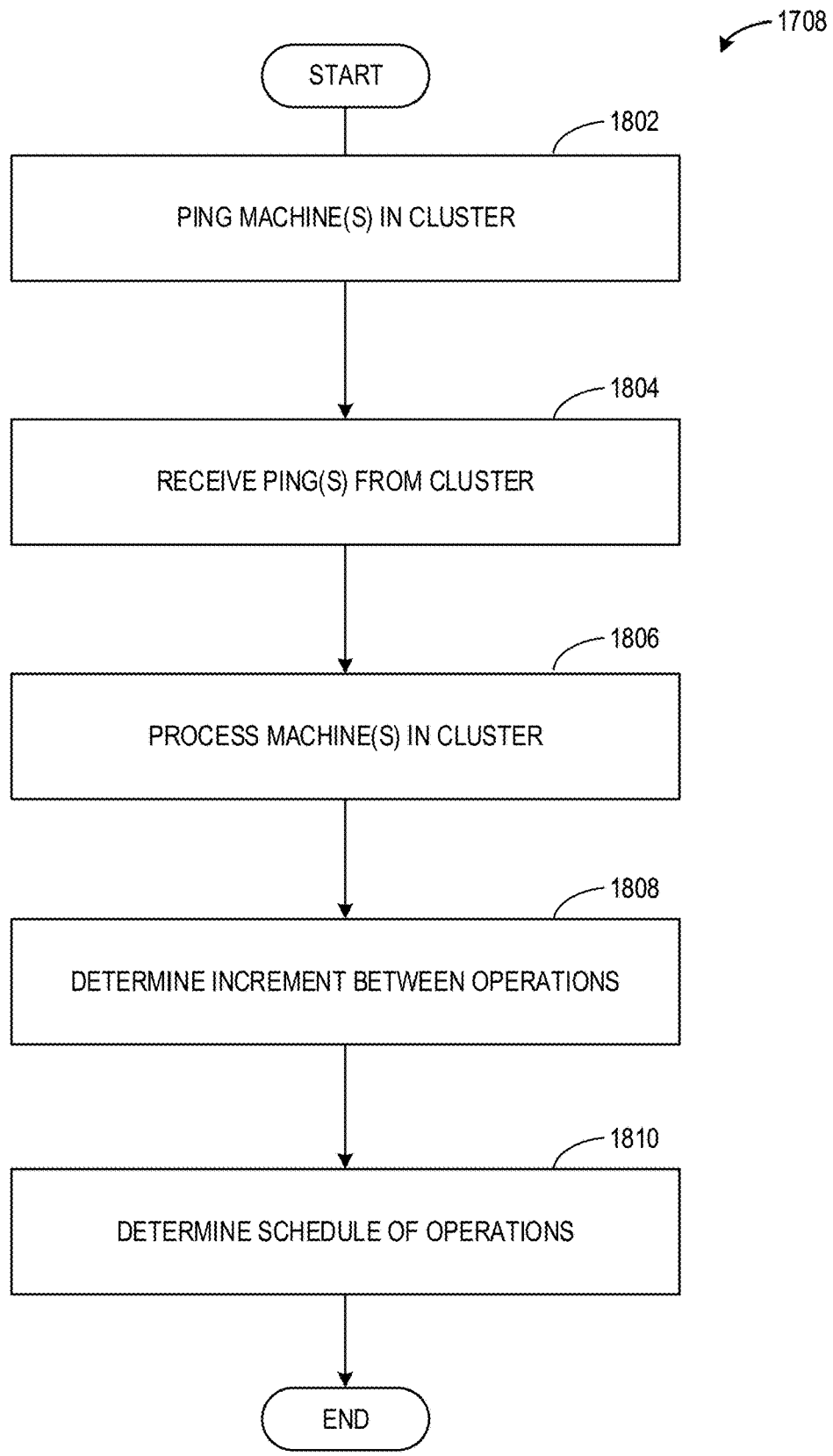
FIG. 18 is a flowchart representative of machine-readable instructions which may be executed to implement the example operation schedule controller of FIGS. 9 and 11 of the example machine of FIGS. 4, 6-13, and 15.
Figure 19:
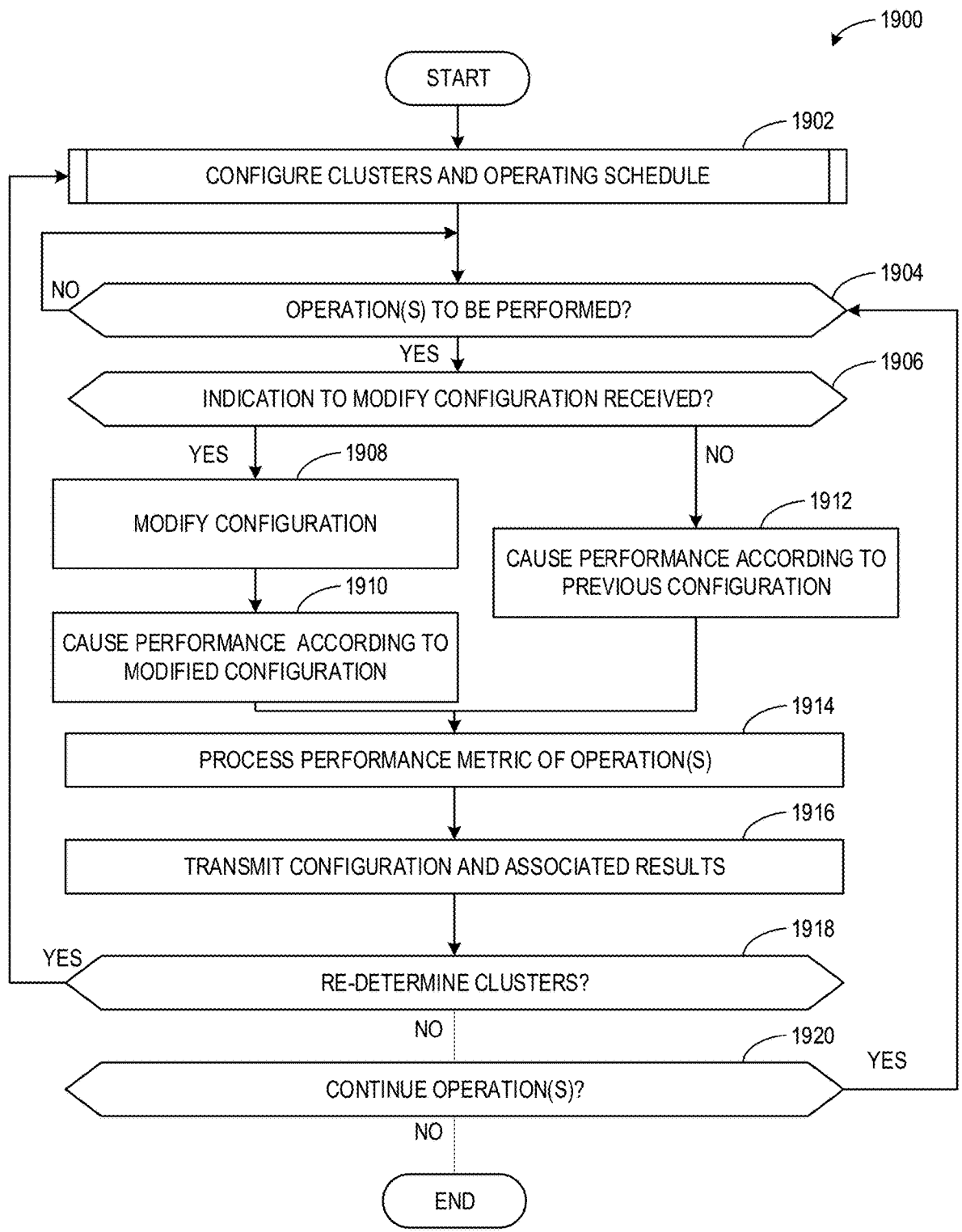
FIG. 19 is a flowchart representative of machine-readable instructions which may be executed to implement the example machine of FIGS. 4, 6-13, and 15.

Flowcharts representative of example hardware logic circuitry, machine readable instructions, hardware implemented state machines, and/or any combination thereof for implementing the primary machine 402a of FIGS. 9, 10, and 11 are shown in FIGS. 17, 18, and 19. The machine readable instructions may be one or more executable programs or portion(s) of an executable program for execution by processor circuitry, such as the processor 2012 shown in the example processor platform 2000 discussed below in connection with FIG. 20 and/or the example processor circuitry discussed below in connection with FIGS. 24 and/or 25. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with the processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 17, 18, and/or 19, many other methods of implementing the example machines 402 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 17, 18, and/or 19 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 17 is a first flowchart representative of example machine executable instructions and/or example operations 1700 that may be executed and/or instantiated by processor circuitry to determine clusters of the example machines 402 and/or schedule operations of the example primary machine 402a of FIGS. 6-13, and/or 15. The machine executable instructions 1700 begin at block 1702, at which the primary machine 402a obtains conditions associated with the machines 402 in the factory 400 of FIG. 4 (e.g., the first machine 402a, the second machine 402b, the third machine 402c, and the fourth machine 402d of FIG. 5, the fifth machine 402e, the sixth machine 402f, the seventh machine 402g, and the eighth machine 402h of FIG. 6). For example, the condition sensor(s) 902 of FIG. 9 can measure ambient conditions associated with the machine 402a. In turn, the condition interface 1002 of FIG. 10 of the cluster controller 904 of FIG. 9 can obtain the ambient conditions measured by the condition sensor(s) 902. Similarly, the secondary machines 402b, 402c, 402d, 402e, 402f, 402g, 402h can measure the ambient conditions associated therewith via a sensor(s) substantially similar to the condition sensor(s) 902. In turn, the secondary machines 402b, 402c, 402d, 402e, 402f, 402g, 402h can transmit the ambient conditions associated therewith to the condition interface 1002 via a transceiver substantially similar to the first transceiver 903 of FIG. 9. In some examples, the secondary machines 402b, 402c, 402d, 402e, 402f, 402g, 402h transmit the ambient conditions associated therewith to the first transceiver 903 via the first M2M communication network 901 of FIG. 9. In turn, the condition interface 902 can access the ambient conditions associated with the secondary machines 402b, 402c, 402d, 402e, 402f, 402g, 402h through the first transceiver 903. Further, the cluster processor 1004 of FIG. 10 of the cluster controller 904 can obtain the ambient conditions associated with the machines 402a, 402b, 402c, 402d, 402e, 402f, 402g, 402h via the condition interface 1002.

At block 1704, the primary machine 402a determines clusters that systematize the machines 402a, 402b, 402c, 402d, 402e, 402f, 402g, 402h. For example, the cluster controller 904 can determine the clusters based on the conditions associated with the machines 402a, 402b, 402c, 402d, 402e, 402f, 402g, 402h. In some examples, the cluster processor 1004 assigns the machines 402a, 402b, 402c, 402d, 402e, 402f, 402g, 402h to the clusters based on the ambient conditions associated with the machines 402a, 402b, 402c, 402d, 402e, 402f, 402g, 402h.

At block 1706, the first machine 402a controls communication networks to which the clusters of the machines 402a, 402b, 402c, 402d, 402e, 402f, 402g, 402h are communicatively coupled. For example, the cluster controller 904 can control the communication networks that the machines 402a, 402b, 402c, 402d, 402e, 402f, 402g, 402h utilize to communicate with the other machines 402a, 402b, 402c, 402d, 402e, 402f, 402g, 402h that are assigned to a same cluster. In some examples, the communication controller 1006 of FIG. 10 indicates the communication networks to be utilized by the secondary machines 402b, 402c, 402d, 402e, 402f, 402g, 402h to the first transceiver 903. Accordingly, the first transceiver 903 can utilize the first M2M communication network 901 to indicate the network associated with the respective secondary machines 402b, 402c, 402d, 402e, 402f, 402g, 402h thereto. In turn, the secondary machines 402b, 402c, 402d, 402e, 402f, 402g, 402h can receive the network to be utilized via a first transceiver (e.g., the first transceiver 903) and configure, via a network controller (e.g., the network controller 1008 of FIG. 10) a second transceiver (e.g., the second transceiver 905) to utilize the network. Additionally, the communication controller 1006 indicates the network associated with the primary machine 1006 to the network controller 1008, which configures the second transceiver 905 to utilize the associated network.

At block 1708, the first machine 402a determines an operation schedule to utilize. For example, the operation schedule controller 906 can determine the operation schedule for the first machine 402a, as discussed further in association with FIG. 18.

FIG. 18 is a second flowchart representative of example machine executable instructions 1708 that may be executed to schedule operations to implement the first example machine 402a of FIGS. 6-13, and/or 15. The machine executable instructions begin at block 1802, at which the first machine 402a transmits a ping(s) to the secondary machines 402b, 402c, 402d, 402e, 402f, 402g, 402h assigned to a same cluster as the first machine 402a. For example, the second transceiver 905 can transmit a ping(s) across the communication network assigned to the cluster (e.g., the second M2M communication network 907, the third M2M communication network 909) associated with the first machine 402a. In some examples, the second transceiver 905 transmits the ping(s) in response to being configured to utilize the associated communication network via the cluster controller 904. In some examples, the network controller 1008 causes the second transceiver 905 to wait a predetermined period of time after being configured to utilize the network before transmitting the ping(s) to enable the other machines in the same cluster to join the network in advance of the ping(s). In some examples, the ping(s) includes an identifier (e.g., an identification value) associated with the primary machine 402a to enable the secondary machines 402b, 402c, 402d, 402e, 402f, 402g, 402h to identify that the primary machine 402a is assigned to the same cluster associated therewith.

At block 1804, the primary machine 402a receives a ping(s) from one or more of the secondary machines 402b, 402c, 402d, 402e, 402f, 402g, 402h assigned to the same cluster as the primary machine 402a. For example, one or more of the secondary machines 402b, 402c, 402d, 402e, 402f, 402g, 402h can transmit a ping(s) to the primary machine 402a in response to being configured to utilize the communication network associated with the cluster. Similarly, the ping(s) from the secondary machines 402b, 402c, 402d, 402e, 402f, 402g, 402h include identifiers associated therewith.

At block 1806, the primary machine 402a processes the machines 402b, 402c, 402d, 402e, 402f, 402g, 402h in the cluster associated therewith. For example, the operation schedule controller 906 of FIGS. 9 and 11 can process the secondary machines 402b, 402c, 402d, 402e, 402f, 402g, 402h that are assigned to the cluster associated therewith. In some examples, the operation schedule controller 906 accesses the identifiers associated with the secondary machines 402b, 402c, 402d, 402e, 402f, 402g, 402h assigned to the same cluster as the first machine 402a in response to the second transceiver 905 receiving the identifiers via the communication network associated with the cluster. In such examples, the machine processor 1104 of FIG. 11 identifies a size of the cluster (e.g., a quantity of the secondary machines 402b, 402c, 402d, 402e, 402f, 402g, 402h assigned to the same cluster as the first machine 402a) based on a quantity of the received identifiers. In turn, the machine processor 1104 can transmit the size of the cluster to the increment processor 1106 of FIG. 11.

Additionally, the machine processor 1104 can perform a look up of the identifiers in the machine database 1102 of FIG. 11. Further, the machine processor 1104 can determine an order according to which the machines 402a, 402b, 402c, 402d, 402e, 402f, 402g, 402h within the cluster are to operate based on the predetermined information stored in the machine database 1102. In turn, the machine processor 1104 transmits the order to the schedule processor 1108 of FIG. 11.

At block 1808, the primary machine 402a determines an increment (e.g., an amount of time) between the operations of the machines 402a, 402b, 402c, 402d, 402e, 402f, 402g, 402h within the cluster. For example, the operation schedule processor 906 can determine a time increment that staggers the operations of the cluster such that the machines 402a, 402b, 402c, 402d, 402e, 402f, 402g, 402h within the cluster can communicate results of the operation performed thereby and/or modify the configuration thereof accordingly within the time increment. In some examples, the interval processor 1106 determines a time interval to implement between the operations of the machines 402a, 402b, 402c, 402d, 402e, 402f, 402g, 402h within the cluster based on the size of the cluster and the operation(s) being performed thereby. In such examples, the interval processor 1108 transmits the time interval that appropriately staggers the operations of the machines 402a, 402b, 402c, 402d, 402e, 402f, 402g, 402h within the cluster to the schedule processor 1108.

At block 1810, the primary machine 402a determines a schedule for the operations thereof. For example, the operation schedule controller 906 can determine the schedule for operations to be performed by the tool(s) 914 of FIG. 9. In some examples, the schedule processor 1108 determines the schedule based on the determined order according to which the machines 402a, 402b, 402c, 402d, 402e, 402f, 402g, 402h within the cluster are to operate and the determined time increment that staggers the operations thereof. In such examples, the schedule processor 1108 transmits the schedule to the tool controller(s) 912 and/or the second transceiver 905.

In some examples, the second transceiver 905 transmits a signal indicative of the schedule to the secondary machines 402b, 402c, 402d, 402e, 402f, 402g, 402h within the same cluster and/or receives a signal indicative of the schedule(s) associated with the secondary machines 402b, 402c, 402d, 402e, 402f, 402g, 402h. In some examples, the operation schedule controller 906 accesses the schedule(s) associated with the secondary machines 402b, 402c, 402d, 402e, 402f, 402g, 402h received by the second transceiver 905. For example, the schedule processor 1108 can compare the schedule(s) associated with the secondary machines 402b, 402c, 402d, 402e, 402f, 402g, 402h in the cluster to the schedule associated with the first machine 402a to verify that the operations of the cluster are staggered such that the machines 402a, 402b, 402c, 402d, 402e, 402f, 402g, 402h within the cluster have sufficient time to communicate, and modify configurations as necessary, between operations.

FIG. 19 is a third flowchart representative of example machine executable instructions 1900 that may be executed to determine operation configurations and perform operations to implement the example primary machine 402a of FIGS. 6-13, and/or 15. The machine executable instructions 1900 begin at block 1902, at which the primary machine 402a configures clusters of the machines 402a, 402b, 402c, 402d, 402e, 402f, 402g, 402h and an operating schedule therefor. For example, the primary machine 402a can execute the machine executable instructions 1700 of FIGS. 17 and/or 18 to configure the clusters and the operating schedule associated therewith.

At block 1904, the primary machine 402a determines whether an operation is to be performed thereby. For example, the tool controller(s) 912 can determine whether an operation(s) is to be performed by the tool(s) 914 based on the schedule of operations. In response to determining the operation(s) is to be performed, the machine executable instructions 1900 proceed to block 1906. In some examples, the machine executable instructions 1900 restart block 1904 in response to determining the operation(s) is not to be performed.

At block 1906, the first machine 402a determines whether an indication to modify the configuration associated with the operation has been received. For example, the second transceiver 905 can receive a signal(s) from one or more of the secondary machines 402b, 402c, 402d, 402e, 402f, 402g, 402h indicative of a configuration utilized thereby and results of the associated operation. As such, the configuration processor 908 can access the signal(s) received by the second transceiver 905 to determine whether to implement a configuration adjustment. In some examples, in response to the configuration processor 908 determining that the signal(s) from one or more of the secondary machines 402b, 402c, 402d, 402e, 402f, 402g, 402h indicates an unacceptable operation (e.g., that a performance metric resulting from the operation was not within a threshold range, e.g., a matching score associated with the operation does not satisfy a confidence level), the machine executable instructions 1900 proceed to block 1908. Otherwise, in response to the configuration processor 908 determining that the signal(s) from one or more of the secondary machines 402b, 402c, 402d, 402e, 402f, 402g, 402h indicates an acceptable operation (e.g., that the performance metric resulting from the operation was within the threshold range, the matching score associated with the operation satisfies the confidence level), the machine executable instructions 1900 proceed to block 1912.

At block 1908, the first machine 402a modifies the configuration according to which the operation(s) is to be performed. For example, the configuration processor 908 can adjust the configuration according to which the operation is to be performed based on the signal(s) from one or more of the secondary machines 402b, 402c, 402d, 402e, 402f, 402g, 402h indicative of the configuration utilized thereby and the results of the associated operation. In some examples, the configuration processor 908 stores the configuration(s) utilized by the secondary machines 402b, 402c, 402d, 402e, 402f, 402g, 402h and the results of the associated operation via the configuration database 910. In some examples, the configuration processor 908 analyzes information in the configuration database 910, such as one or more configurations previously utilized and results associated therewith, to determine an updated configuration according to which the first machine 402a is to operate. The configuration processor 908 transmits the updated configuration to the tool controller(s) 912, the performance processor 916 of FIG. 9, and/or the second transceiver 905. In some examples, the configuration processor 908 stores the updated configuration in the configuration database 910.

At block 1910, the first machine 402a causes performance of the operation(s) associated therewith according to the modified configuration. For example, the tool controller(s) 912 causes the tool(s) 914 to perform the operation(s) according to the updated configuration determined by the configuration processor 908.

At block 1912, the primary machine 402a causes performance of the operation(s) associated therewith according to a previously utilized configuration. For example, in response to the second transceiver 905 receiving a signal indicative of a successful operation associated with the configuration, the configuration processor 908 can determine that the associated configuration is to be utilized by the primary machine 402a. As such, the configuration processor 908 can indicate the previously utilized configuration to the tool controller(s) 912. In turn, the tool controller(s) 912 can cause the tool(s) 914 to perform the operation(s) associated therewith according to the previously utilized configuration.

At block 1914, the primary machine 402a processes a performance metric associated with the operation(s) performed thereby. For example, the performance processor 916 of FIG. 9 can determine whether the performance metric associated with the operation(s) is within a threshold range. In some examples, the performance processor 916 processes a drive signal that the tool controller(s) 912 produces to cause the tool(s) 914 to perform the operation(s). For example, the performance processor 916 can determine a voltage, a current, and/or a power produced by the tool controller(s) 912 and/or a resistance encountered by the tool controller(s) 912 in response to producing the drive signal. Further, the performance processor 916 can compare the drive signal produced by the tool controller(s) 912 to a predetermined drive signal associated with the configuration being implemented to determine a matching score associated with the operation. As a result, the performance processor 916 can determine a difference or deviance between the produced drive signal and the predetermined drive signal. In turn, the performance processor 916 compares the matching score or deviance to a confidence level or threshold range to determine whether the configuration produced acceptable results. In some examples, the performance processor 916 transmits a signal indicative of the results to the configuration processor 908, which stores the results with the associated configuration via the configuration database 910. Further, the performance processor 916 transmits a signal indicative of the configuration and the associated results to the second transceiver 905.

At block 1916, the first machine 402a transmits the configuration according to which the operation(s) were performed and the results associate therewith to the secondary machines 402b, 402c, 402d, 402e, 402f, 402g, 402h within the same cluster. For example, the second transceiver 905 can transmit a signal indicative of the configuration and the results (e.g., the performance metric, the error, etc.) across the communication network associated with the cluster in response to receiving the signal indicative of the configuration and the associated results via the performance processor 916. As such, the secondary machines 402b, 402c, 402d, 402e, 402f, 402g, 402h can determine the configuration according to which an associated operation(s) is to be performed based on the configuration utilized by the first machine 402a and the results associated therewith.

At block 1918, the first machine 402a determines whether to re-determine the clusters to which the machines 402a, 402b, 402c, 402d, 402e, 402f, 402g, 402h are assigned. For example, the cluster controller 904 can determine whether a predetermined period of time has passed since the clusters were determined. In some examples, the communication controller 1006 triggers the first transceiver 904 to re-request the ambient conditions associated with the secondary machines 402b, 402c, 402d, 402e, 402f, 402g, 402h in response to the predetermined period of time associated with the clusters expiring. In some examples, the condition interface 1002 obtains the ambient conditions associated with the primary machine 402a via the condition sensor(s) 902 in response to the predetermined period of time associated with the clusters expiring. In some examples, in response to determining the machines 402a, 402b, 402c, 402d, 402e, 402f, 402g, 402h are to be re-assigned to clusters, the machine executable instructions 1900 return to block 1902.

At block 1920 the first machine 402a determines whether to continue performance the operation(s) associated therewith. For example, in response to remaining powered, the first machine 402a continues to operate and the machine executable instructions return to block 1904. Otherwise, the machine readable instructions 1900 terminate.

Figure 20:
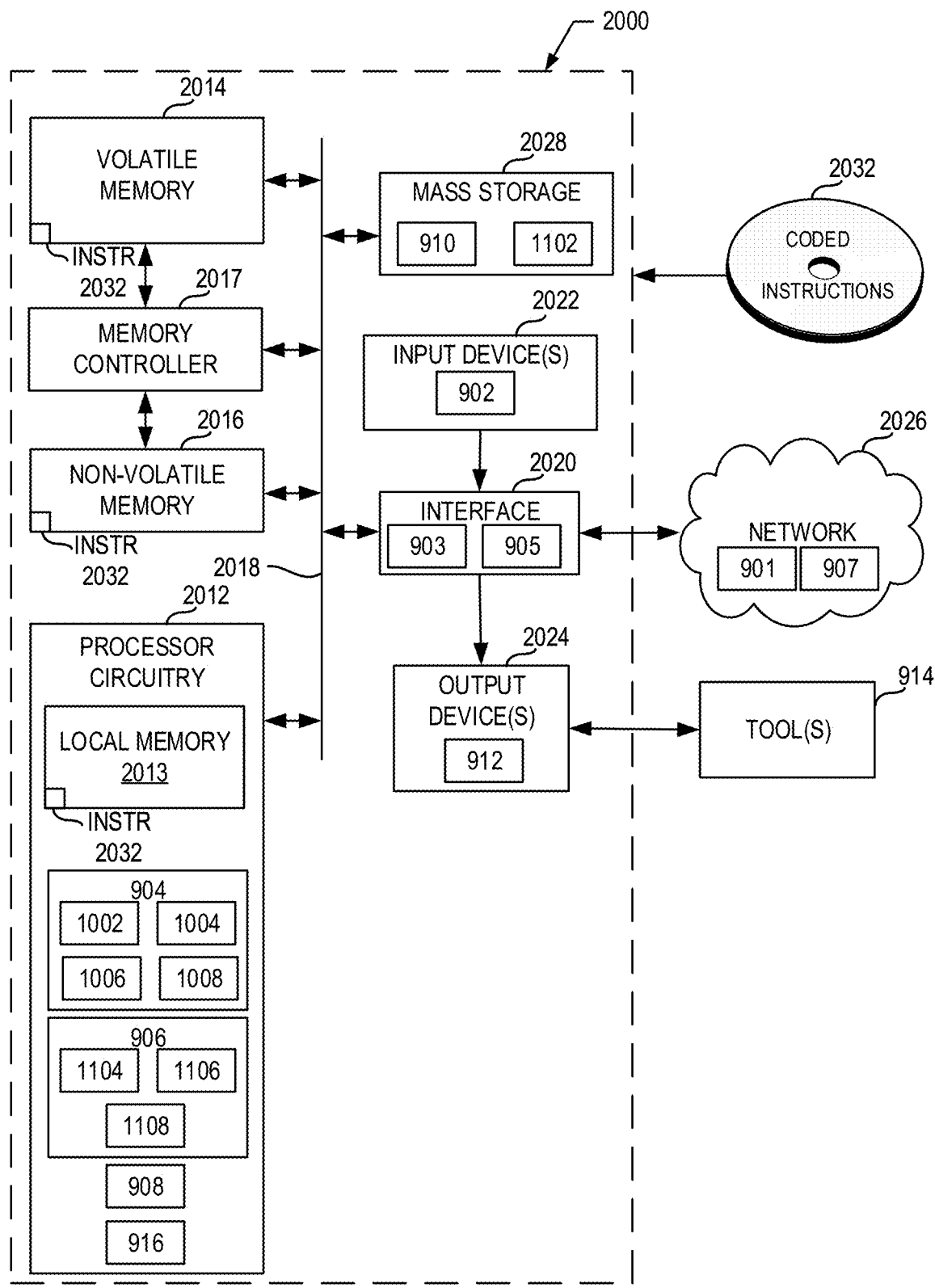
FIG. 20 is a block diagram of an example processing platform including processor circuitry structured to execute the example machine readable instructions of FIGS. 17-19 to implement the example machine of FIGS. 4, 6-13, and 15.

FIG. 20 is a block diagram of an example processor platform 2000 structured to execute and/or instantiate the machine readable instructions and/or operations of FIGS. 17, 18, and 19 to implement the primary machine 402*a* of FIGS. 6-11, 13, and 15. The processor platform 2000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 2000 of the illustrated example includes processor circuitry 2012. The processor circuitry 2012 of the illustrated example is hardware. For example, the processor circuitry 2012 can be implemented by one or more integrated circuits, logic circuits, FPGAs, microprocessors, CPUs, GPUs, DSPs, and/or microcontrollers from any desired family or manufacturer. The processor circuitry may be implemented by one or more semiconductor based (e.g., silicon based) devices. In this example, the processor circuitry 2012 implements the example cluster controller 904, the example operation schedule controller 906, the example configuration processor 908, the example tool controller(s) 912, the example performance processor 916, the example condition interface 1002, the example cluster processor 1004, the example communication controller 1006, the example network controller 1008, the example machine processor 1104, the example increment processor 1106, and the example schedule processor 1108.

The processor circuitry 2012 of the illustrated example includes a local memory 2013 (e.g., a cache, registers, etc.). The processor circuitry 2012 of the illustrated example is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAMBUS® Dynamic Random Access Memory (RDRAM®) and/or any other type of RAM device. The non-volatile memory 2016 may be implemented by flash memory and/or any other desired type of memory device. Access to the main memory 2014, 2016 of the illustrated example is controlled by a memory controller 417.

The processor platform 2000 of the illustrated example also includes interface circuitry 2020. The interface circuitry 2020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. In this example, the interface circuit 2020 implements the first transceiver 903 and the second transceiver 905.

In the illustrated example, one or more input devices 2022 are connected to the interface circuitry 2020. The input device(s) 2022 permit(s) a user to enter data and/or commands into the processor circuitry 2012. The input device(s) can be implemented by, for example, an audio sensor, a microphone, a camera (still or video), a keyboard, a button, a mouse, a touchscreen, a track-pad, a trackball, an isopoint device, and/or a voice recognition system. In this example, the input device(s) 2022 implement the example condition sensor(s) 902.

One or more output devices 2024 are also connected to the interface circuitry 2020 of the illustrated example. The output devices 2024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuitry 2020 of the illustrated example, thus, typically includes a graphics driver card, a graphics driver chip, and/or graphics processor circuitry such as a GPU. In this example, the output device(s) 2024 implement the tool controller(s) 912, which is communicatively coupled to the example tool(s) 914.

The interface circuitry 2020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network(s) 2026. The communication can be by, for example, an Ethernet connection, a digital subscriber line (DSL) connection, a telephone line connection, a coaxial cable system, a satellite system, a line-of-site wireless system, a cellular telephone system, an optical connection, etc. In this example, the network(s) 2026 implement the first M2M communication network 901 and the second M2M communication network 907. In some other examples, the network(s) 2026 implement the third M2M communication network 909.

The processor platform 2000 of the illustrated example also includes one or more mass storage devices 2028 to store software and/or data. Examples of such mass storage devices 2028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 2032, which may be implemented by the machine readable instructions of FIGS. 17, 18, and 19, may be stored in the mass storage device 2028, in the volatile memory 2014, in the non-volatile memory 2016, and/or on a removable non-transitory computer readable storage medium such as a CD or DVD.

In further examples, any of the compute nodes or devices discussed with reference to the present edge computing systems and environment may be fulfilled based on the components depicted in FIGS. 21 and 22. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 21:
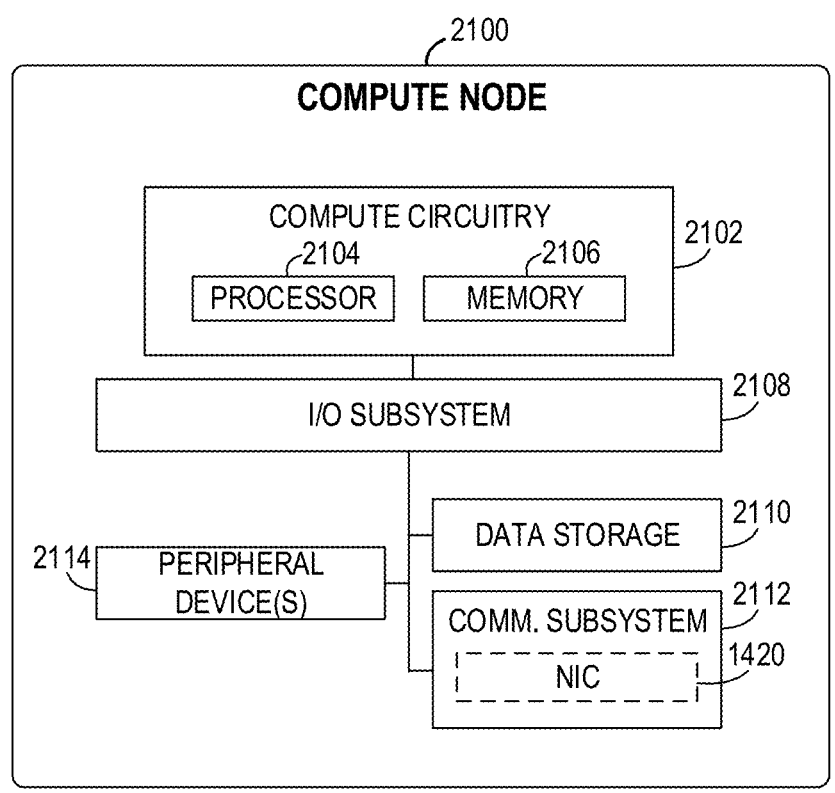
FIG. 21 provides an overview of example components for compute deployed at a compute node in an edge computing system.

In the simplified example depicted in FIG. 21, an edge compute node 2100 includes a compute engine (also referred to herein as "compute circuitry") 2102, an input/output (I/O) subsystem 2108, data storage 2110, a communication circuitry subsystem 2112, and, optionally, one or more peripheral devices 2114. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 2100 may be embodied as any type of engine, device, or collection of devices capable of performing various compute functions. In some examples, the compute node 2100 may be embodied as a single device such as an integrated circuit, an embedded system, a field-programmable gate array (FPGA), a system-on-a-chip (SOC), or other integrated system or device. In the illustrative example, the compute node 2100 includes or is embodied as a processor 2104 and a memory 2106. The processor 2104 may be embodied as any type of processor capable of performing the functions described herein (e.g., executing an application). For example, the processor 2104 may be embodied as a multi-core processor(s), a microcontroller, a processing unit, a specialized or special purpose processing unit, or other processor or processing/controlling circuit.

In some examples, the processor 2104 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing, or managing server or data center hardware, managing service meshes, or collecting and distributing telemetry), outside of the CPU or general purpose processing hardware. However, it will be understood that a xPU, a SOC, a CPU, and other variations of the processor 2104 may work in coordination with each other to execute many types of operations and instructions within and on behalf of the compute node 2100.

The memory 2106 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 2106 may be integrated into the processor 2104.

The memory 2106 may store various software and data used during operation such as one or more applications, data operated on by the application(s), libraries, and drivers.

The compute circuitry 2102 is communicatively coupled to other components of the compute node 2100 via the I/O subsystem 2108, which may be embodied as circuitry and/or components to facilitate input/output operations with the compute circuitry 2102 (e.g., with the processor 2104 and/or the main memory 2106) and other components of the compute circuitry 2102. For example, the I/O subsystem 2108 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 2108 may form a portion of a system-on-a-chip (SoC) and be incorporated, along with one or more of the processor 2104, the memory 2106, and other components of the compute circuitry 2102, into the compute circuitry 2102.

The one or more illustrative data storage devices 1410 may be embodied as any type of devices configured for short-term or long-term storage of data such as, for example, memory devices and circuits, memory cards, hard disk drives, solid-state drives, or other data storage devices. Individual data storage devices 1410 may include a system partition that stores data and firmware code for the data storage device 1410. Individual data storage devices 1410 may also include one or more operating system partitions that store data files and executables for operating systems depending on, for example, the type of compute node 2100.

The communication circuitry 1412 may be embodied as any communication circuit, device, or collection thereof, capable of enabling communications over a network between the compute circuitry 2102 and another compute device (e.g., an edge gateway of an implementing edge computing system). The communication circuitry 1412 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1412 includes a network interface controller (NIC) 1120, which may also be referred to as a host fabric interface (HFI). The NIC 2120 may be embodied as one or more add-in-boards, daughter cards, network interface cards, controller chips, chipsets, or other devices that may be used by the compute node 2100 to connect with another compute device (e.g., an edge gateway node). In some examples, the NIC 2120 may be embodied as part of a system-on-a-chip (SoC) that includes one or more processors, or included on a multichip package that also contains one or more processors. In some examples, the NIC 2120 may include a local processor (not shown) and/or a local memory (not shown) that are both local to the NIC 2120. In such examples, the local processor of the NIC 2120 may be capable of performing one or more of the functions of the compute circuitry 2102 described herein. Additionally, or alternatively, in such examples, the local memory of the NIC 2120 may be integrated into one or more components of the client compute node at the board level, socket level, chip level, and/or other levels.

Additionally, in some examples, a respective compute node 2100 may include one or more peripheral devices 2114. Such peripheral devices 2114 may include any type of peripheral device found in a compute device or server such as audio input devices, a display, other input/output devices, interface devices, and/or other peripheral devices, depending on the particular type of the compute node 2100. In further examples, the compute node 2100 may be embodied by a respective edge compute node (whether a client, gateway, or aggregation node) in an edge computing system or like forms of appliances, computers, subsystems, circuitry, or other components.

Figure 22:
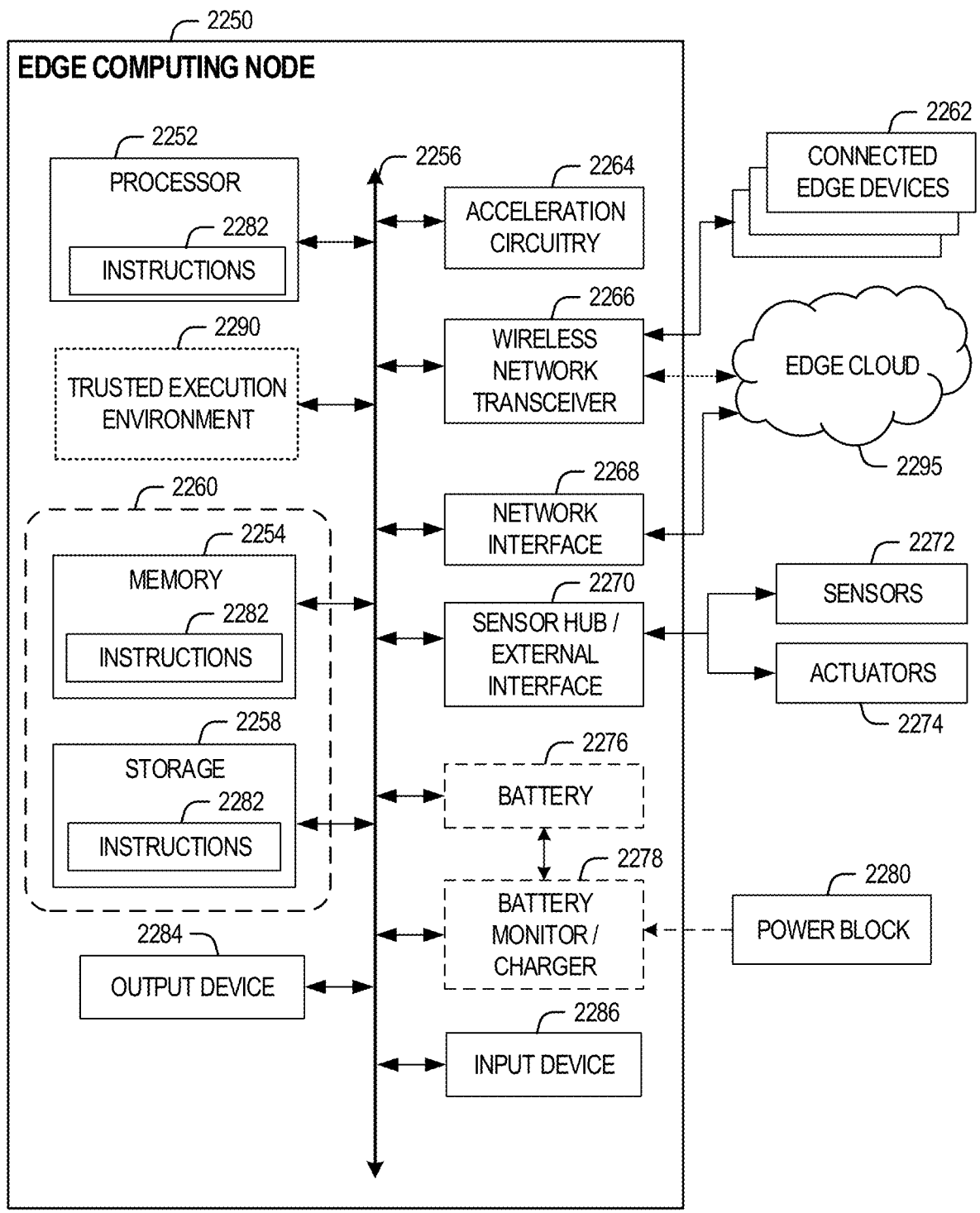
FIG. 22 provides a further overview of example components within a computing device in an edge computing system.

In a more detailed example, FIG. 22 illustrates a block diagram of an example of components that may be present in an edge computing node 2250 for implementing the techniques (e.g., operations, processes, methods, and methodologies) described herein. This edge computing node 2250 provides a closer view of the respective components of node 2100 when implemented as or as part of a computing device (e.g., as a mobile device, a base station, server, gateway, etc.). The edge computing node 2250 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 2250, or as components otherwise incorporated within a chassis of a larger system.

The edge computing device 2250 may include processing circuitry in the form of a processor 2252, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 2252 may be a part of a system on a chip (SoC) in which the processor 2252 and other components are formed into a single integrated circuit, or a single package, such as the Edison™ or Galileo™ SoC boards from Intel Corporation, Santa Clara, California. As an example, the processor 2252 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd., or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 2252 and accompanying circuitry may be provided in a single socket form factor, multiple socket form factor, or a variety of other formats, including in limited hardware configurations or configurations that include fewer than all elements shown in FIG. 22.

The processor 2252 may communicate with a system memory 2254 over an interconnect 2256 (e.g., a bus). Any number of memory devices may be used to provide for a given amount of system memory. As examples, the memory 2254 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2258 may also couple to the processor 2252 via the interconnect 2256. In an example, the storage 2258 may be implemented via a solid-state disk drive (SSDD). Other devices that may be used for the storage 2258 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 2258 may be on-die memory or registers associated with the processor 2252. However, in some examples, the storage 2258 may be implemented using a micro hard disk drive (HDD). Further, any number of new technologies may be used for the storage 2258 in addition to, or instead of, the technologies described, such resistance change memories, phase change memories, holographic memories, or chemical memories, among others.

The components may communicate over the interconnect 2256. The interconnect 2256 may include any number of technologies, including industry standard architecture (ISA), extended ISA (EISA), peripheral component interconnect (PCI), peripheral component interconnect extended (PCIx), PCI express (PCIe), or any number of other technologies. The interconnect 2256 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 2256 may couple the processor 2252 to a transceiver 2266, for communications with the connected edge devices 2262. The transceiver 2266 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 2262. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 2266 (or multiple transceivers) may communicate using multiple standards or radios for communications at a different range. For example, the edge computing node 2250 may communicate with close devices, e.g., within about 10 meters, using a local transceiver based on Bluetooth Low Energy (BLE), or another low power radio, to save power. More distant connected edge devices 2262, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 2266 (e.g., a radio transceiver) may be included to communicate with devices or services in a cloud (e.g., an edge cloud 2295) via local or wide area network protocols. The wireless network transceiver 2266 may be a low-power wide-area (LPWA) transceiver that follows the IEEE 802.15.4, or IEEE 802.15.4g standards, among others. The edge computing node 2250 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 2266, as described herein. For example, the transceiver 2266 may include a cellular transceiver that uses spread spectrum (SPA/SAS) communications for implementing high-speed communications. Further, any number of other protocols may be used, such as Wi-Fi® networks for medium speed communications and provision of network communications. The transceiver 2266 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 2268 may be included to provide a wired communication to nodes of the edge cloud 2295 or to other devices, such as the connected edge devices 2262 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 2268 may be included to enable connecting to a second network, for example, a first NIC 2268 providing communications to the cloud over Ethernet, and a second NIC 2268 providing communications to other devices over another type of network.

Given the variety of types of applicable communications from the device to another component or network, applicable communications circuitry used by the device may include or be embodied by any one or more of components 2264, 2266, 2268, or 2270. Accordingly, in various examples, applicable means for communicating (e.g., receiving, transmitting, etc.) may be embodied by such communications circuitry.

The edge computing node 2250 may include or be coupled to acceleration circuitry 2264, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 2256 may couple the processor 2252 to a sensor hub or external interface 2270 that is used to connect additional devices or subsystems. The devices may include sensors 2272, such as accelerometers, level sensors, flow sensors, optical light sensors, camera sensors, temperature sensors, global navigation system (e.g., GPS) sensors, pressure sensors, barometric pressure sensors, and the like. The hub or interface 2270 further may be used to connect the edge computing node 2250 to actuators 2274, such as power switches, valve actuators, an audible sound generator, a visual warning device, and the like.

In some optional examples, various input/output (I/O) devices may be present within or connected to, the edge computing node 2250. For example, a display or other output device 2284 may be included to show information, such as sensor readings or actuator position. An input device 2286, such as a touch screen or keypad may be included to accept input. An output device 2284 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 2250. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 2276 may power the edge computing node 2250, although, in examples in which the edge computing node 2250 is mounted in a fixed location, it may have a power supply coupled to an electrical grid, or the battery may be used as a backup or for temporary capabilities. The battery 2276 may be a lithium ion battery, or a metal-air battery, such as a zinc-air battery, an aluminum-air battery, a lithium-air battery, and the like.

A battery monitor/charger 2278 may be included in the edge computing node 2250 to track the state of charge (SoCh) of the battery 2276, if included. The battery monitor/charger 2278 may be used to monitor other parameters of the battery 2276 to provide failure predictions, such as the state of health (SoH) and the state of function (SoF) of the battery 2276. The battery monitor/charger 2278 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 2278 may communicate the information on the battery 2276 to the processor 2252 over the interconnect 2256. The battery monitor/charger 2278 may also include an analog-to-digital (ADC) converter that enables the processor 2252 to directly monitor the voltage of the battery 2276 or the current flow from the battery 2276. The battery parameters may be used to determine actions that the edge computing node 2250 may perform, such as transmission frequency, mesh network operation, sensing frequency, and the like.

A power block 2280, or other power supply coupled to a grid, may be coupled with the battery monitor/charger 2278 to charge the battery 2276. In some examples, the power block 2280 may be replaced with a wireless power receiver to obtain the power wirelessly, for example, through a loop antenna in the edge computing node 2250. A wireless battery charging circuit, such as an LTC4020 chip from Linear Technologies of Milpitas, California, among others, may be included in the battery monitor/charger 2278. The specific charging circuits may be selected based on the size of the battery 2276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2258 may include instructions 2282 in the form of software, firmware, or hardware commands to implement the techniques described herein. Although such instructions 2282 are shown as code blocks included in the memory 2254 and the storage 2258, it may be understood that any of the code blocks may be replaced with hardwired circuits, for example, built into an application specific integrated circuit (ASIC).

In an example, the instructions 2282 provided via the memory 2254, the storage 2258, or the processor 2252 may be embodied as a non-transitory, machine-readable medium 2260 including code to direct the processor 2252 to perform electronic operations in the edge computing node 2250. The processor 2252 may access the non-transitory, machine-readable medium 2260 over the interconnect 2256. For instance, the non-transitory, machine-readable medium 2260 may be embodied by devices described for the storage 2258 or may include specific storage units such as optical disks, flash drives, or any number of other hardware devices. The non-transitory, machine-readable medium 2260 may include instructions to direct the processor 2252 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 2282 on the processor 2252 (separately, or in combination with the instructions 2282 of the machine readable medium 2260) may configure execution or operation of a trusted execution environment (TEE) 2290. In an example, the TEE 2290 operates as a protected area accessible to the processor 2252 for secure execution of instructions and secure access to data. Various implementations of the TEE 2290, and an accompanying secure area in the processor 2252 or the memory 2254 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 2250 through the TEE 2290 and the processor 2252.

Figure 23:
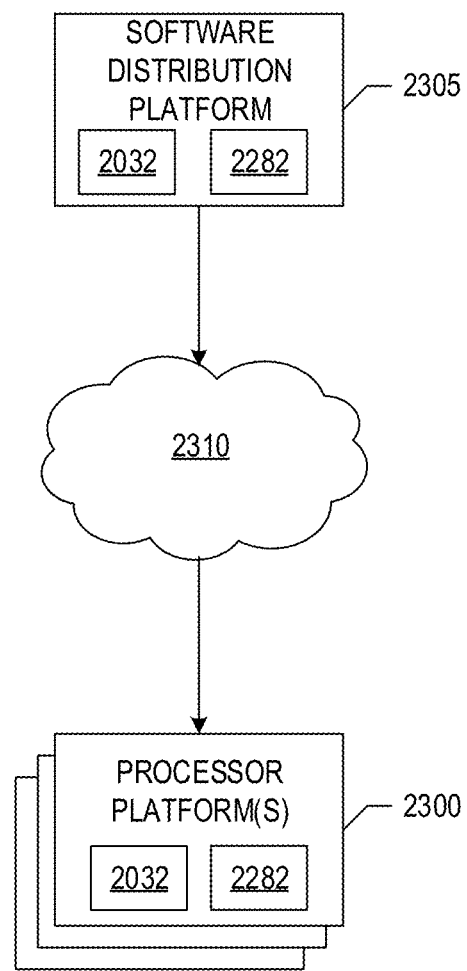
FIG. 23 is a block diagram of an example software distribution platform (e.g., one or more servers) to distribute software (e.g., software corresponding to the example machine readable instructions of FIG. 15) to client devices associated with end users and/or consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

FIG. 23 illustrates an example software distribution platform 2305 to distribute software, such as the example computer readable instructions 2032, 2282 of FIGS. 20 and 22, to one or more devices, such as example processor platform(s) 2000, 2200 and/or example connected edge devices 2262. The example software distribution platform 2305 may be implemented by any computer server, data facility, cloud service, etc., capable of storing and transmitting software to other computing devices (e.g., third parties, the example connected edge devices 2262 of FIG. 22). Example connected edge devices may be customers, clients, managing devices (e.g., servers), third parties (e.g., customers of an entity owning and/or operating the software distribution platform 2305). Example connected edge devices may operate in commercial and/or home automation environments. In some examples, a third party is a developer, a seller, and/or a licensor of software such as the example computer readable instructions 2032, 2282 of FIGS. 20 and 22. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 23, the software distribution platform 2305 includes one or more servers and one or more storage devices. The storage devices store the computer readable instructions 2032, 2282, which may correspond to the example computer readable instructions of FIGS. 17-19, as described above. The one or more servers of the example software distribution platform 2305 are in communication with a network 2310, which may correspond to any one or more of the Internet and/or any of the example networks such as the example network 110, the example first M2M communication network 901, the example second M2M communication network 907, and the example third M2M communication network 909, described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 2032, 2282 from the software distribution platform 2305. For example, the software, which may correspond to the example computer readable instructions of FIGS. 17-19, may be downloaded to the example processor platform(s) 2300 (e.g., example connected edge devices), which is/are to execute the computer readable instructions 2282 to implement time-sensitive networking coordinated transfer learning. In some examples, one or more servers of the software distribution platform 2305 are communicatively connected to one or more security domains and/or security devices through which requests and transmissions of the example computer readable instructions 2282 must pass. In some examples, one or more servers of the software distribution platform 2305 periodically offer, transmit, and/or force updates to the software (e.g., the example computer readable instructions 2032, 2282 of FIGS. 20 and 22) to ensure improvements, patches, updates, etc. are distributed and applied to the software at the end user devices.

In the illustrated example of FIG. 23, the computer readable instructions 2032, 2282 are stored on storage devices of the software distribution platform 2305 in a particular format. A format of computer readable instructions includes, but is not limited to, a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 2032, 2282 stored in the software distribution platform 2305 are in a first format when transmitted to the example processor platform(s) 2300. In some examples, the first format is an executable binary in which particular types of the processor platform(s) 2300 can execute. However, in some examples, the first format is uncompiled code that requires one or more preparation tasks to transform the first format to a second format to enable execution on the example processor platform(s) 2300. For instance, the receiving processor platform(s) 2300 may need to compile the computer readable instructions 2032, 2282 in the first format to generate executable code in a second format that is capable of being executed on the processor platform(s) 2300. In still other examples, the first format is interpreted code that, upon reaching the processor platform(s) 2300, is interpreted by an interpreter to facilitate execution of instructions.

Figure 24:
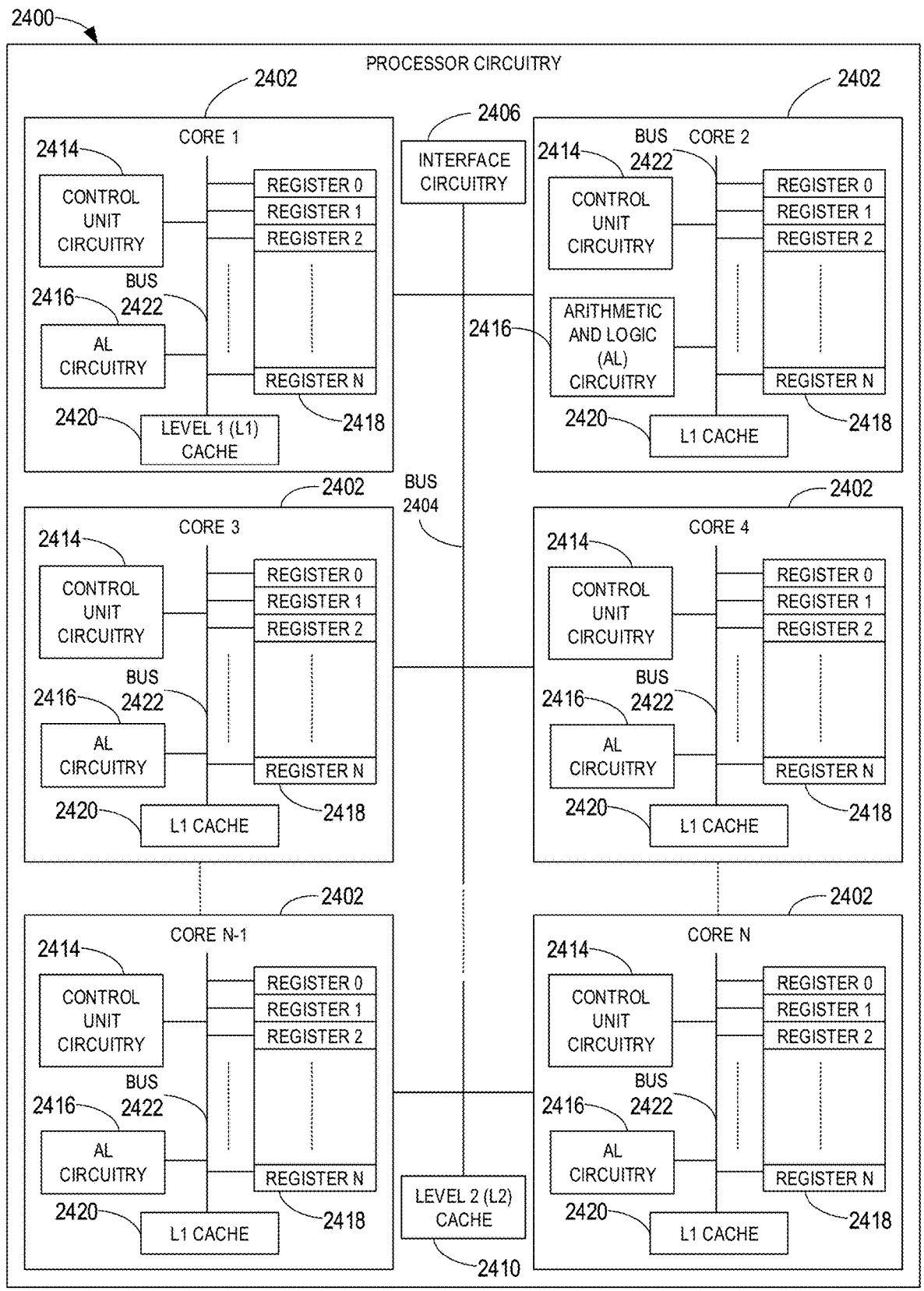
FIG. 24 is a block diagram of an example implementation of processor circuitry of FIG. 20.

FIG. 24 is a block diagram of an example implementation of the processor circuitry 2412 of FIG. 24. In this example, the processor circuitry 2412 of FIG. 24 is implemented by a microprocessor 2400. For example, the microprocessor 2400 may implement multi-core hardware circuitry such as a CPU, a DSP, a GPU, an XPU, etc. Although it may include any number of example cores 2402 (e.g., 1 core), the microprocessor 2400 of this example is a multi-core semiconductor device including N cores. The cores 2402 of the microprocessor 2400 may operate independently or may cooperate to execute machine readable instructions. For example, machine code corresponding to a firmware program, an embedded software program, or a software program may be executed by one of the cores 2402 or may be executed by multiple ones of the cores 2402 at the same or different times. In some examples, the machine code corresponding to the firmware program, the embedded software program, or the software program is split into threads and executed in parallel by two or more of the cores 2402. The software program may correspond to a portion or all of the machine readable instructions and/or operations represented by the flowcharts of FIGS. 17, 18, and 19.

The cores 2402 may communicate by an example bus 2404. In some examples, the bus 2404 may implement a communication bus to effectuate communication associated with one(s) of the cores 2402. For example, the bus 2404 may implement at least one of an Inter-Integrated Circuit (I2C) bus, a Serial Peripheral Interface (SPI) bus, a PCI bus, or a PCIe bus. Additionally or alternatively, the bus 2404 may implement any other type of computing or electrical bus. The cores 2402 may obtain data, instructions, and/or signals from one or more external devices by example interface circuitry 2406. The cores 2402 may output data, instructions, and/or signals to the one or more external devices by the interface circuitry 2406. Although the cores 2402 of this example include example local memory 2420 (e.g., Level 1 (L1) cache that may be split into an L1 data cache and an L1 instruction cache), the microprocessor 2400 also includes example shared memory 2410 that may be shared by the cores (e.g., Level 2 (L2_cache)) for high-speed access to data and/or instructions. Data and/or instructions may be transferred (e.g., shared) by writing to and/or reading from the shared memory 2410. The local memory 2420 of each of the cores 2402 and the shared memory 2410 may be part of a hierarchy of storage devices including multiple levels of cache memory and the main memory (e.g., the main memory 2014, 2016 of FIG. 20). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2402 may be referred to as a CPU, DSP, GPU, etc., or any other type of hardware circuitry. Each core 2402 includes control unit circuitry 2414, arithmetic and logic (AL) circuitry (sometimes referred to as an ALU) 2416, a plurality of registers 2418, the L1 cache 2420, and an example bus 2422. Other structures may be present. For example, each core 2402 may include vector unit circuitry, single instruction multiple data (SIMD) unit circuitry, load/store unit (LSU) circuitry, branch/jump unit circuitry, floating-point unit (FPU) circuitry, etc. The control unit circuitry 2414 includes semiconductor-based circuits structured to control (e.g., coordinate) data movement within the corresponding core 2402. The AL circuitry 2416 includes semiconductor-based circuits structured to perform one or more mathematic and/or logic operations on the data within the corresponding core 2402. The AL circuitry 2416 of some examples performs integer based operations. In other examples, the AL circuitry 2416 also performs floating point operations. In yet other examples, the AL circuitry 2416 may include first AL circuitry that performs integer based operations and second AL circuitry that performs floating point operations. In some examples, the AL circuitry 2416 may be referred to as an Arithmetic Logic Unit (ALU). The registers 2418 are semiconductor-based structures to store data and/or instructions such as results of one or more of the operations performed by the AL circuitry 2416 of the corresponding core 2402. For example, the registers 2418 may include vector register(s), SIMD register(s), general purpose register(s), flag register(s), segment register(s), machine specific register(s), instruction pointer register(s), control register(s), debug register(s), memory management register(s), machine check register(s), etc. The registers 2418 may be arranged in a bank as shown in FIG. 24. Alternatively, the registers 2418 may be organized in any other arrangement, format, or structure including distributed throughout the core 2402 to shorten access time. The bus 2420 may implement at least one of an I2C bus, a SPI bus, a PCI bus, or a PCIe bus.

Each core 2402 and/or, more generally, the microprocessor 2400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 25:
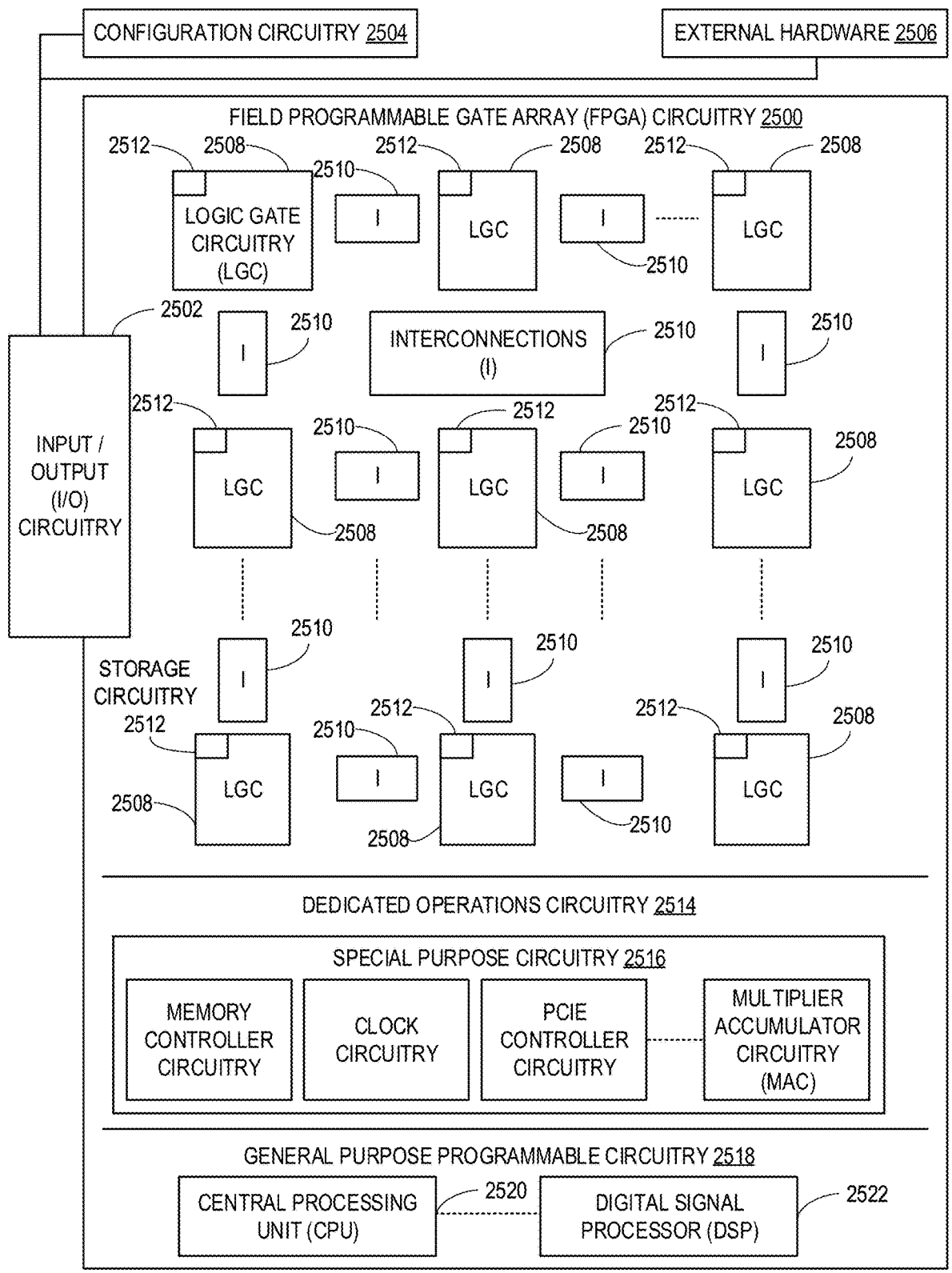
FIG. 25 is a block diagram of another example implementation of the processor circuitry of FIG. 20.

FIG. 25 is a block diagram of another example implementation of the processor circuitry 2012 of FIG. 20. In this example, the processor circuitry 2012 is implemented by FPGA circuitry 2500. The FPGA circuitry 2500 can be used, for example, to perform operations that could otherwise be performed by the example microprocessor 2400 of FIG. 24 executing corresponding machine readable instructions. However, once configured, the FPGA circuitry 2500 instantiates the machine readable instructions in hardware and, thus, can often execute the operations faster than they could be performed by a general purpose microprocessor executing the corresponding software.

More specifically, in contrast to the microprocessor 2400 of FIG. 24 described above (which is a general purpose device that may be programmed to execute some or all of the machine readable instructions represented by the flowcharts of FIGS. 17, 18, and 19 but whose interconnections and logic circuitry are fixed once fabricated), the FPGA circuitry 2500 of the example of FIG. 25 includes interconnections and logic circuitry that may be configured and/or interconnected in different ways after fabrication to instantiate, for example, some or all of the machine readable instructions represented by the flowcharts of FIGS. 17, 18, and 19. In particular, the FPGA 2500 may be thought of as an array of logic gates, interconnections, and switches. The switches can be programmed to change how the logic gates are interconnected by the interconnections, effectively forming one or more dedicated logic circuits (unless and until the FPGA circuitry 2500 is reprogrammed). The configured logic circuits enable the logic gates to cooperate in different ways to perform different operations on data received by input circuitry. Those operations may correspond to some or all of the software represented by the flowcharts of FIGS. 17, 18, and 19. As such, the FPGA circuitry 2500 may be structured to effectively instantiate some or all of the machine readable instructions of the flowcharts of FIGS. 17, 18, and 19 as dedicated logic circuits to perform the operations corresponding to those software instructions in a dedicated manner analogous to an ASIC. Therefore, the FPGA circuitry 2500 may perform the operations corresponding to the some or all of the machine readable instructions of FIG. 25 faster than the general purpose microprocessor can execute the same.

In the example of FIG. 25, the FPGA circuitry 2500 is structured to be programmed (and/or reprogrammed one or more times) by an end user by a hardware description language (HDL) such as Verilog. The FPGA circuitry 2500 of FIG. 25, includes example input/output (I/O) circuitry 2502 to obtain and/or output data to/from example configuration circuitry 2504 and/or external hardware (e.g., external hardware circuitry) 2506. For example, the configuration circuitry 2504 may implement interface circuitry that may obtain machine readable instructions to configure the FPGA circuitry 2500, or portion(s) thereof. In some such examples, the configuration circuitry 2504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2506 may implement the microprocessor 2400 of FIG. 24. The FPGA circuitry 2500 also includes an array of example logic gate circuitry 2508, a plurality of example configurable interconnections 2510, and example storage circuitry 2512. The logic gate circuitry 2508 and interconnections 2510 are configurable to instantiate one or more operations that may correspond to at least some of the machine readable instructions of FIGS. 17, 18, and 19 and/or other desired operations. The logic gate circuitry 2508 shown in FIG. 25 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2508 to enable configuration of the electrical structures and/or the logic gates to form circuits to perform desired operations. The logic gate circuitry 2508 may include other electrical structures such as look-up tables (LUTs), registers (e.g., flip-flops or latches), multiplexers, etc.

The interconnections 2510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2508 to program desired logic circuits.

The storage circuitry 2512 of the illustrated example is structured to store result(s) of the one or more of the operations performed by corresponding logic gates. The storage circuitry 2512 may be implemented by registers or the like. In the illustrated example, the storage circuitry 2512 is distributed amongst the logic gate circuitry 2508 to facilitate access and increase execution speed.

The example FPGA circuitry 2500 of FIG. 25 also includes example Dedicated Operations Circuitry 2514. In this example, the Dedicated Operations Circuitry 2514 includes special purpose circuitry 2516 that may be invoked to implement commonly used functions to avoid the need to program those functions in the field. Examples of such special purpose circuitry 2516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2500 may also include example general purpose programmable circuitry 2518 such as an example CPU 2520 and/or an example DSP 2522. Other general purpose programmable circuitry 2518 may additionally or alternatively be present such as a GPU, an XPU, etc., that can be programmed to perform other operations.

Although FIGS. 24 and 25 illustrate two example implementations of the processor circuitry 2012 of FIG. 20, many other approaches are contemplated. For example, as mentioned above, modern FPGA circuitry may include an onboard CPU, such as one or more of the example CPU 2520 of FIG. 6. Therefore, the processor circuitry 2012 of FIG. 20 may additionally be implemented by combining the example microprocessor 2400 of FIG. 24 and the example FPGA circuitry 2500 of FIG. 25. In some such hybrid examples, a first portion of the machine readable instructions represented by the flowcharts of FIGS. 17, 18, and 19 may be executed by one or more of the cores 2402 of FIG. 24 and a second portion of the machine readable instructions represented by the flowcharts of FIGS. 17, 18, and 19 may be executed by the FPGA circuitry 2500 of FIG. 25.

In some examples, the processor circuitry 2012 of FIG. 20 may be in one or more packages. For example, the processor circuitry 2400 of FIG. 24 and/or the FPGA circuitry 2500 of FIG. 25 may be in one or more packages. In some examples, an XPU may be implemented by the processor circuitry 2012 of FIG. 20, which may be in one or more packages. For example, the XPU may include a CPU in one package, a DSP in another package, a GPU in yet another package, and an FPGA in still yet another package.

In some examples, the primary machine 402a and/or the one or more secondary machines 402b, 402c, 402d, 402e, 402f, 402g, 402h include means for causing performance of an operation according to a first configuration. For example, the means for causing performance of the operation may be implemented by the tool controller(s) 912 and/or the tool controller(s) 912 of the secondary machines 402b, 402c, 402d, 402e, 402f, 402g, 402h. In some examples, the tool controller(s) 912 may be implemented by machine executable instructions such as that implemented by at least blocks 1910 and 1912 of FIG. 19 executed by processor circuitry, which may be implemented by the example processor circuitry 2012 of FIG. 20, the example processor circuitry 2400 of FIG. 24 and/or the example FPGA circuitry 2500 of FIG. 25. In other examples, the tool controller(s) 912 is implemented by other hardware logic circuitry, hardware implemented state machines, and/or any other combination of hardware, software, and/or firmware. For example, the tool controller(s) 912 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the primary machine 402a and/or one or more of the secondary machines 402b, 402c, 402d, 402e, 402f, 402g, 402h include means for processing a performance metric of the performance of the operation by the primary machine 402a and/or the one or more secondary machines 402b, 402c, 402d, 402e, 402f, 402g, 402h to determine whether the performance metric is within a threshold range (e.g., satisfies a confidence level). For example, the means for processing the performance metric may be implemented by the performance processor 916 and/or the performance processor(s) 916 of the secondary machines 402b, 402c, 402d, 402e, 402f, 402g, 402h. In some examples, the performance processor 916 may be implemented by machine executable instructions such as that implemented by at least block 1914 of FIG. 19 executed by processor circuitry, which may be implemented by the example processor circuitry 2012 of FIG. 20, the example processor circuitry 2400 of FIG. 24 and/or the example FPGA circuitry 2500 of FIG. 25. In other examples, the performance processor 916 is implemented by other hardware logic circuitry, hardware implemented state machines, and/or any other combination of hardware, software, and/or firmware. For example, the performance processor 916 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware, but other structures are likewise appropriate.

In some examples, the primary machine 402a and/or one or more of the secondary machines 402b, 402c, 402d, 402e, 402f, 402g, 402h include means for causing performance of the operation according to a second configuration different from the first configuration in response to a determination that the performance metric is not within the threshold range (e.g., does not satisfy the confidence level). For example, the means for causing performance of the operation may be implemented by the tool controller(s) 912 of the secondary machine(s) 402b, 402c, 402d, 402e, 402f, 402g, 402h. In some examples, the tool controller(s) 912 of the secondary machine(s) 402b, 402c, 402d, 402e, 402f, 402g, 402h may be implemented by machine executable instructions such as that implemented by at least blocks 1910 and 1912 of FIG. 19 executed by processor circuitry, which may be implemented by the example processor circuitry 2012 of FIG. 20, the example processor circuitry 2400 of FIG. 24 and/or the example FPGA circuitry 2500 of FIG. 25. In other examples, the tool controller(s) 912 is implemented by other hardware logic circuitry, hardware implemented state machines, and/or any other combination of hardware, software, and/or firmware. For example, the tool controller(s) 912 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware, but other structures are likewise appropriate.

In some examples, the primary machine 402a and/or one or more of the secondary machines 402b, 402c, 402d, 402e, 402f, 402g, 402h include means for causing the primary machine 402a and respective ones of the secondary machines 402b, 402c, 402d, 402e, 402f, 402g, 402h to operate asynchronously. For example, the means for causing the primary machine 402a and respective ones of the secondary machines 402b, 402c, 402d, 402e, 402f, 402g, 402h to operate asynchronously may be implemented by the operation schedule controller 906. In some examples, the operation schedule controller 906 may be implemented by machine executable instructions such as that implemented by at least blocks 1708, 1802, 1804, 1806, 1808, 1810, 1902 of FIGS. 17, 18, and 19 executed by processor circuitry, which may be implemented by the example processor circuitry 2012 of FIG. 20, the example processor circuitry 2412 of FIG. 24, and/or the example FPGA circuitry 2500 of FIG. 25. In other examples, the operation schedule controller 906 may be implemented by other hardware logic circuitry, hardware implemented state machines, and/or any other combination of hardware, software, and/or firmware. For example, the operation schedule controller 906 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware, but other structures are likewise appropriate.

In some examples, the primary machine 402a and/or one or more of the secondary machines 402b, 402c, 402d, 402e, 402f, 402g, 402h include means for determining the second configuration based on the first configuration and the performance metric associated with the performance of the operation according to the first configuration. For example, the means for determining the second configuration may be implemented by the configuration processor 908 of the primary machine 402a and/or one or more of the secondary machines 402b, 402c, 402d, 402e, 402f, 402g, 402h. In some examples, the configuration processor 908 may be implemented by machine executable instructions such as that implemented by at least blocks 1906, 1908 of FIG. 19 executed by processor circuitry, which may be implemented by the example processor circuitry 2012 of FIG. 20, the example processor circuitry 2400 of FIG. 24, and/or the example FPGA circuitry 2500 of FIG. 25. In other examples, the configuration processor 908 is implemented by other hardware logic circuitry, hardware implemented state machines, and/or any other combination of hardware, software, and/or firmware. For example, the configuration processor 908 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware, but other structures are likewise appropriate.

In some examples, the primary machine 402a and/or one or more of the secondary machines 402b, 402c, 402d, 402e, 402f, 402g, 402h include means for communicatively coupling the primary machine 402a and one or more of the secondary machines 402b, 402c, 402d, 402e, 402f, 402g, 402h in response to the primary machine 402a encountering a first ambient condition and one or more of the secondary machines 402b, 402c, 402d, 402e, 402f, 402g, 402h encountering a second ambient condition within a threshold range of the first ambient condition. For example, the means for communicatively coupling may be implemented by the cluster controller 904 of the primary machine 402a and/or the cluster controller 904 of one or more of the secondary machines 402b, 402c, 402d, 402e, 402f, 402g, 402h. In some examples, the cluster controller 904 may be implemented by machine executable instructions such as that implemented by at least blocks 1702, 1704, 1706 of FIG. 17 executed by processor circuitry, which may be implemented by the example processor circuitry 2012 of FIG. 20, the example processor circuitry 2400 of FIG. 24, and/or the example FPGA circuitry 2500 of FIG. 25. In other examples, the cluster controller 904 is implemented by other hardware logic circuitry, hardware implemented state machines, and/or any other combination of hardware, software, and/or firmware. For example, the cluster controller 904 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware, but other structures are likewise appropriate.

In some examples, the primary machine 402a and/or one or more of the secondary machines 402b, 402c, 402d, 402e, 402f, 402g, 402h include means for communicatively coupling the primary machine 402a and one or more of the secondary machines 402b, 402c, 402d, 402e, 402f, 402g, 402h in response to one or more of the secondary machines 402b, 402c, 402d, 402e, 402f, 402g, 402h being initially configured to perform operations according to the first configuration or a third configuration similar to the first configuration. For example, the means for communicatively coupling may be implemented by the cluster controller 904 of the primary machine 402a and/or the cluster controller 904 of one or more of the secondary machines 402b, 402c, 402d, 402e, 402f, 402g, 402h.

In some examples, the primary machine 402a and/or one or more of the secondary machines 402b, 402c, 402d, 402e, 402f, 402g, 402h include means for learning from the operations performed by the primary machine 402a and one or more of the secondary machines 402b, 402c, 402d, 402e, 402f, 402g, 402h. For example, the means for learning may be implemented by the configuration processor 908 of the primary machine 402a and/or the configuration processor 908 of one or more of the secondary machines 402b, 402c, 402d, 402e, 402f, 402g, 402h. In some examples, the configuration processor 908 may be implemented by machine executable instructions such as that implemented by at least blocks 1906 and 1908 of FIG. 19 executed by processor circuitry, which may be implemented by the example processor circuitry 2012 of FIG. 20, the example processor circuitry 2400 of FIG. 24, and/or the example FPGA circuitry 2500 of FIG. 25. In other examples, the configuration processor 908 is implemented by other hardware logic circuitry, hardware implemented state machines, and/or any other combination of hardware, software, and/or firmware. For example, the configuration processor 908 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware, but other structures are likewise appropriate.

From the foregoing, it will be appreciated that example methods, apparatus and articles of manufacture have been disclosed that cause agents to asynchronously operate, allowing agents to share configuration tweaks and enabling dynamic calibrations across entire facilities. Additionally, by communicating configuration changes to other agents as well as an edge control node, machine learning models are able to be fine-tuned to account for variations in order to generate better configurations. The disclosed methods, apparatus and articles of manufacture improve the efficiency of using a computing device by communicating needed configuration changes in real-time, which enables improved generation of configurations and prevents redundant faults in production. The disclosed methods, apparatus and articles of manufacture are accordingly directed to one or more improvement(s) in the functioning of a computer.

Example methods, apparatus, systems, and articles of manufacture for time sensitive networking coordinated transfer learning in industrial settings are disclosed herein. Further examples and combinations thereof include the following:

Example 1 includes an apparatus for coordinated transfer learning, the apparatus comprising at least one memory, instructions in the apparatus, and processor circuitry to execute the instructions to cause performance of an operation by a first machine according to a first configuration, process a performance metric of the performance of the operation by the first machine to determine whether the performance metric is within a threshold range, and in response to a determination that the performance metric is not within the threshold range, cause performance of the operation by a second machine according to a second configuration different from the first configuration.

Example 2 includes the apparatus of example 1, wherein the operation is a manufacturing operation, the first machine is a first manufacturing machine, and the second machine is a second manufacturing machine.

Example 3 includes the apparatus of example 1, wherein the performance metric is associated with a drive signal that causes the performance of the operation by the first machine.

Example 4 includes the apparatus of example 3, wherein the performance metric is associated with a deviation of the drive signal from a predetermined drive signal associated with the first configuration.

Example 5 includes the apparatus of example 1, wherein the processor circuitry is to cause the first machine and the second machine to operate asynchronously.

Example 6 includes the apparatus of example 1, wherein the threshold range is a first threshold range, and wherein the at least one processor is to communicatively couple the first machine and the second machine in response to the first machine encountering a first ambient condition and the second machine encountering a second ambient condition, the first ambient condition within a second threshold range of the second ambient condition.

Example 7 includes the apparatus of example 1, wherein the processor circuitry is to determine the second configuration based on the first configuration and the performance metric associated with the performance of the operation according to the first configuration.

Example 8 includes the apparatus of example 1, wherein the performance metric is a first performance metric, and the processor circuitry is to process a second performance metric of the performance of the operation by the second machine to determine whether the second performance metric is within the threshold range, and in response to a determination that the second performance metric is within the threshold range, cause performance of the operation by the first machine or a third machine according to the second configuration.

Example 9 includes the apparatus of example 1, wherein the processor circuitry is to cause the first machine to be communicatively coupled to the second machine and one or more other machines in response to the second machine and the one or more other machines being initially configured to perform operations according to the first configuration or a third configuration similar to the first configuration, and cause the first machine, the second machine, and the one or more other machines to learn from operations performed by the first machine, the second machine, and the one or more other machines.

Example 10 includes a non-transitory machine executable medium comprising instructions which, when executed, cause one or more processors to cause performance of an operation by a first machine according to a first configuration, process a performance metric of the performance of the operation by the first machine to determine whether the performance metric is within a threshold range, and in response to a determination that the performance metric is not within the threshold range, cause performance of the operation by a second machine according to a second configuration different from the first configuration.

Example 11 includes the non-transitory machine executable medium of example 10, wherein the operation is a manufacturing operation, the first machine is a first manufacturing machine, and the second machine is a second manufacturing machine.

Example 12 includes the non-transitory machine executable medium of example 10, wherein the performance metric is associated with a drive signal that causes the performance of the operation by the first machine.

Example 13 includes the non-transitory machine executable medium of example 12, wherein the performance metric is associated with a deviation of the drive signal from a predetermined drive signal associated with the first configuration.

Example 14 includes the non-transitory machine executable medium of example 10, wherein the instructions, when executed, cause the one or more processors to cause the first machine and the second machine to operate asynchronously.

Example 15 includes the non-transitory machine executable medium of example 10, wherein the threshold range is a first threshold range, and wherein the instructions, when executed, cause the one or more processors to communicatively couple the first machine and the second machine in response to the first machine encountering a first ambient condition and the second machine encountering a second ambient condition, the first ambient condition within a second threshold range of the second ambient condition.

Example 16 includes the non-transitory machine executable medium of example 10, wherein the instructions, when executed, cause the one or more processors to determine the second configuration based on the first configuration and the performance metric associated with the performance of the operation according to the first configuration.

Example 17 includes the non-transitory machine executable medium of example 10, wherein the performance metric is a first performance metric, and wherein the instructions, when executed, cause the one or more processors to process a second performance metric of the performance of the operation by the second machine to determine whether the second performance metric is within the threshold range, and in response to a determination that the second performance metric is within the threshold range, cause the first machine or a third machine to perform the operation according to the second configuration.

Example 18 includes the non-transitory machine executable medium of example 10, wherein the instructions, when executed, cause the one or more processors to cause the first machine to be communicatively coupled to the second machine and one or more other machines in response to the second machine and the one or more other machines being initially configured to perform operations according to the first configuration or a third configuration similar to the first configuration, and cause the first machine, the second machine, and the one or more other machines to learn from operations performed by the first machine, the second machine, and the one or more other machines.

Example 19 includes a method comprising causing performance of an operation by a first machine according to a first configuration, processing a performance metric of the performance of the operation by the first machine to determine whether the performance metric is within a threshold range, and in response to the determination that the performance metric is not within the threshold range, causing performance of the operation by a second machine according to a second configuration different from the first configuration.

Example 20 includes the method of example 19, wherein the operation is a manufacturing operation, the first machine is a first manufacturing machine, and the second machine is a second manufacturing machine.

Example 21 includes the method of example 19, wherein the performance metric is associated with a drive signal that causes the performance of the operation by the first machine.

Example 22 includes the method of example 21, wherein the performance metric is associated with a deviation of the drive signal from a predetermined drive signal associated with the first configuration.

Example 23 includes the method of example 19, further including causing the first machine and the second machine to operate asynchronously.

Example 24 includes the method of example 19, wherein the threshold range is a first threshold range, further including communicatively coupling the first machine and the second machine in response to the first machine encountering a first ambient condition and the second machine encountering a second ambient condition, the first ambient condition within a second threshold range of the second ambient condition.

Example 25 includes the method of example 19, further including determining the second configuration based on the first configuration and the performance metric associated with the performance of the operation according to the first configuration.

Example 26 includes the method of example 19, wherein the performance metric is a first performance metric, and further including processing a second performance metric of the performance of the operation by the second machine to determine whether the second performance metric is within the threshold range, and in response to a determination that the second performance metric is within the threshold range, causing performance of the operation by the first machine or a third machine according to the second configuration.

Example 27 includes the method of example 19, further including causing the first machine to be communicatively coupled to the second machine and one or more other machines in response to the second machine and the one or more other machines being initially configured to perform operations according to the first configuration or a third configuration similar to the first configuration, and causing the first machine, the second machine, and the one or more other machines to learn from operations performed by the first machine, the second machine, and the one or more other machines.

Example 28 includes an apparatus comprising first means for causing performance of an operation by a first machine according to a first configuration, means for processing a performance metric of the performance of the operation by the first machine to determine whether the performance metric is within a threshold range, and second means for causing performance of the operation by a second machine according to a second configuration different from the first configuration in response to a determination that the performance metric is not within the threshold range.

Example 29 includes the apparatus of example 28, wherein the operation is a manufacturing operation, the first machine is a first manufacturing machine, and the second machine is a second manufacturing machine.

Example 30 includes the apparatus of example 28, wherein the performance metric is associated with a drive signal that causes the performance of the operation by the first machine.

Example 31 includes the apparatus of example 30, wherein the performance metric is associated with a deviation of the drive signal from a predetermined drive signal associated with the first configuration.

Example 32 includes the apparatus of example 28, further including third means for causing the first machine and the second machine to operate asynchronously.

Example 33 includes the apparatus of example 28, wherein the threshold range is a first threshold range, and further including means for communicatively coupling the first machine and the second machine in response to the first machine encountering a first ambient condition and the second machine encountering a second ambient condition, the first ambient condition within a second threshold range of the second ambient condition.

Example 34 includes the apparatus of example 28, further including means for determining the second configuration based on the first configuration and the performance metric associated with the performance of the operation according to the first configuration.

Example 35 includes the apparatus of example 28, wherein the means for processing is a first means for processing and the performance metric is a first performance metric, further including second means for processing a second performance metric of the performance of the operation by the second machine to determine whether the second performance metric is within the threshold range, and in response to a determination that the second performance metric is within the threshold range, at least one of the first means for causing to cause performance of the operation according to the second configuration or a third means for causing to cause performance of the operation according to the second configuration.

Example 36 includes the apparatus of example 28, further including means for communicatively coupling the first machine to the second machine and one or more other machines in response to the second machine and the one or more other machines being initially configured to perform operations according to the first configuration or a third configuration similar to the first configuration, and means for learning from the operations performed by the first machine, the second machine, and the one or more other machines.

Example 37 includes an apparatus comprising an operator to cause performance of an operation by a first machine according to a first configuration, a performance processor to process a performance metric of the performance of the operation by the first machine to determine whether the performance metric is within a threshold range, a configuration processor to cause performance of the operation by a second machine according to a second configuration different from the first configuration in response to a determination that the performance metric is not within the threshold range.

Example 38 includes the apparatus of example 37, wherein the operation is a manufacturing operation, the first machine is a first manufacturing machine, and the second machine is a second manufacturing machine.

Example 39 includes the apparatus of example 37, wherein the performance metric is associated with a drive signal that causes the performance of the operation by the first machine.

Example 40 includes the apparatus of example 39, wherein the performance metric is associated with a deviation of the drive signal from a predetermined drive signal associated with the first configuration.

Example 41 includes the apparatus of example 37, further including an operation schedule controller to cause the first machine and the second machine to operate asynchronously.

Example 42 includes the apparatus of example 37, wherein the threshold range is a first threshold range, and further including a cluster controller to cause the first machine and the second machine to be communicatively coupled in response to the first machine encountering a first ambient condition and the second machine encountering a second ambient condition, the first ambient condition within a second threshold range of the second ambient condition.

Example 43 includes the apparatus of example 37, wherein the configuration processor determines the second configuration based on the first configuration and the performance metric associated with the performance of the operation according to the first configuration.

Example 44 includes the apparatus of example 37, wherein the performance processor is a first performance processor, the configuration processor is a first configuration processor, and the performance metric is a first performance metric, further including a second performance processor to process a second performance metric of the performance of the operation by the second machine to determine whether the second performance metric is within the threshold range, and a second configuration processor to cause performance of the operation by the first machine or a third machine according to the second configuration in response to a determination that the second performance metric is within the threshold range.

Example 45 includes the apparatus of example 37, wherein the configuration processor is a first configuration processor, further including a cluster controller to cause the first machine to be communicatively coupled to the second machine and one or more other machines in response the second machine and the one or more other machines being initially configured to perform operations according to the first configuration or a third configuration similar to the first configuration, and a second configuration processor, at least one of the first configuration processor or the second configuration processor to cause the first machine, the second machine, and the one or more other machines to learn from operations performed by the first machine, the second machine, and the one or more other machines.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for coordinated transfer learning, the apparatus comprising:
   at least one memory;
   instructions in the apparatus; and
   processor circuitry to execute the instructions to:
   cause performance of an operation by a first machine according to a first configuration, the first configuration including at least one of a first temporal setting or a first electrical setting to be utilized during the performance of the operation;
   process a performance metric of the performance of the operation by the first machine to determine whether the performance metric is within a threshold range; and
   in response to a determination that the performance metric is not within the threshold range, cause performance of the operation by a second machine according to a second configuration different from the first configuration, the second configuration including at least one of a second temporal setting or a second electrical setting to be utilized during the performance of the operation.

2. The apparatus of claim 1, wherein the operation is a manufacturing operation, the first machine is a first manufacturing machine, and the second machine is a second manufacturing machine.

3. The apparatus of claim 1, wherein the performance metric is associated with a drive signal that causes the performance of the operation by the first machine.

4. The apparatus of claim 3, wherein the performance metric is associated with a deviation of the drive signal from a predetermined drive signal associated with the first configuration.

5. The apparatus of claim 1, wherein the processor circuitry is to cause the first machine and the second machine to operate asynchronously.

6. The apparatus of claim 1, wherein the threshold range is a first threshold range, and wherein the processor circuitry is to communicatively couple the first machine and the second machine in response to the first machine encountering a first ambient condition and the second machine encountering a second ambient condition, the first ambient condition within a second threshold range of the second ambient condition.

7. The apparatus of claim 1, wherein the processor circuitry is to determine the second configuration based on the first configuration and the performance metric associated with the performance of the operation according to the first configuration.

8. The apparatus of claim 1, wherein the performance metric is a first performance metric, and the processor circuitry is to:
   process a second performance metric of the performance of the operation by the second machine to determine whether the second performance metric is within the threshold range; and
   in response to a determination that the second performance metric is within the threshold range, cause performance of the operation by the first machine or a third machine according to the second configuration.

9. The apparatus of claim 1, wherein the processor circuitry is to:
   cause the first machine to be communicatively coupled to the second machine and one or more other machines in response to the second machine and the one or more other machines being initially configured to perform operations according to the first configuration or a third configuration similar to the first configuration; and
   cause the first machine, the second machine, and the one or more other machines to learn from operations performed by the first machine, the second machine, and the one or more other machines.

10. A non-transitory machine executable medium comprising instructions to cause processor circuitry to at least:

determine a schedule for a first machine to perform an operation at a first time and a second machine to perform the operation at a second time after performance of the operation by the first machine is at least partially complete;

after determination of the schedule, cause performance of the operation by the first machine according to a first configuration;

process a performance metric of the performance of the operation by the first machine to determine whether the performance metric is within a threshold range; and in response to a determination that the performance metric is not within the threshold range, cause performance of the operation by a second machine according to a second configuration different from the first configuration.

11. The non-transitory machine executable medium of claim 10, wherein the operation is a manufacturing operation, the first machine is a first manufacturing machine, and the second machine is a second manufacturing machine.

12. The non-transitory machine executable medium of claim 10, wherein the performance metric is associated with a drive signal that causes the performance of the operation by the first machine.

13. The non-transitory machine executable medium of claim 12, wherein the performance metric is associated with a deviation of the drive signal from a predetermined drive signal associated with the first configuration.

14. The non-transitory machine executable medium of claim 10, wherein the instructions cause the processor circuitry to cause the first machine and the second machine to operate asynchronously.

15. The non-transitory machine executable medium of claim 10, wherein the threshold range is a first threshold range, and wherein the instructions cause the processor circuitry to communicatively couple the first machine and the second machine in response to the first machine encountering a first ambient condition and the second machine encountering a second ambient condition, the first ambient condition within a second threshold range of the second ambient condition.

16. The non-transitory machine executable medium of claim 10, wherein the instructions cause the processor circuitry to determine the second configuration based on the first configuration and the performance metric associated with the performance of the operation according to the first configuration.

17. The non-transitory machine executable medium of claim 10, wherein the performance metric is a first performance metric, and wherein the instructions cause the processor circuitry to:

process a second performance metric of the performance of the operation by the second machine to determine whether the second performance metric is within the threshold range; and in response to a determination that the second performance metric is within the threshold range, cause the first machine or a third machine to perform the operation according to the second configuration.

18. The non-transitory machine executable medium of claim 10, wherein the instructions cause the processor circuitry to:

cause the first machine to be communicatively coupled to the second machine and one or more other machines in response to the second machine and the one or more other machines being initially configured to perform operations according to the first configuration or a third configuration similar to the first configuration; and cause the first machine, the second machine, and the one or more other machines to learn from operations performed by the first machine, the second machine, and the one or more other machines.

19. An apparatus comprising:

first means for causing performance of an operation by a first machine according to a first configuration;

means for processing a performance metric of the performance of the operation by the first machine to determine whether the performance metric is within a threshold range; and second means for causing performance of the operation by a second machine according to (i) a second configuration different from the first configuration in response to a determination that the performance metric is not within the threshold range or (ii) the first configuration in response to a determination that the performance metric is within the threshold range.

20. The apparatus of claim 19, wherein the operation is a manufacturing operation, the first machine is a first manufacturing machine, and the second machine is a second manufacturing machine.

21. The apparatus of claim 19, wherein the performance metric is associated with a drive signal that causes the performance of the operation by the first machine.

22. The apparatus of claim 21, wherein the performance metric is associated with a deviation of the drive signal from a predetermined drive signal associated with the first configuration.

23. The apparatus of claim 19, further including third means for causing the first machine and the second machine to operate asynchronously.

24. The apparatus of claim 19, wherein the threshold range is a first threshold range, and further including means for communicatively coupling the first machine and the second machine in response to the first machine encountering a first ambient condition and the second machine encountering a second ambient condition, the first ambient condition within a second threshold range of the second ambient condition.

25. The apparatus of claim 19, further including means for determining the second configuration based on the first configuration and the performance metric associated with the performance of the operation according to the first configuration.

* * * * *